US012161266B2

(12) United States Patent
Gellman et al.

(10) Patent No.: US 12,161,266 B2
(45) Date of Patent: Dec. 10, 2024

(54) HYGIENE IMPLEMENT HOLDER WITH SHIELD

(71) Applicant: NOOKOLOGY LLC, Hoboken, NJ (US)

(72) Inventors: Brian J. Gellman, Hoboken, NJ (US); Marc Gellman, Miami Beach, FL (US)

(73) Assignee: NOOKOLOGY LLC, Hoboken, NJ (US)

( * ) Notice: Subject to any disclaimer, the term of this patent is extended or adjusted under 35 U.S.C. 154(b) by 0 days.

(21) Appl. No.: 18/403,618

(22) Filed: Jan. 3, 2024

(65) Prior Publication Data

US 2024/0130573 A1  Apr. 25, 2024

Related U.S. Application Data

(63) Continuation-in-part of application No. 29/897,500, filed on Jul. 14, 2023, now Pat. No. Des. 1,013,410, and a continuation-in-part of application No. 29/897,503, filed on Jul. 14, 2023, and a continuation-in-part of application No. 29/897,501, filed on Jul. 14, 2023, now Pat. No. Des. 1,015,013, and a continuation of application No. 18/184,522,
(Continued)

(51) Int. Cl.
*A47K 1/09* (2006.01)
*F16M 13/02* (2006.01)

(52) U.S. Cl.
CPC ............. *A47K 1/09* (2013.01); *F16M 13/022* (2013.01)

(58) Field of Classification Search
None
See application file for complete search history.

(56) References Cited

U.S. PATENT DOCUMENTS

| D22,773 S | 9/1893 | McNeil |
| D59,647 S | 11/1921 | Frost et al. |

(Continued)

FOREIGN PATENT DOCUMENTS

| JP | 2001120355 A | * | 5/2001 | ............. A46B 17/04 |
| WO | WO-2013029144 A1 | * | 3/2013 | ............. A46B 17/02 |

OTHER PUBLICATIONS

Jollychic, Suction Cup Toothbrush Holder Cute Cartoon Animal Shape Tooth Brush Dispenser, printed Sep. 8, 2020, 2 pages, https://www.jollychic.com/p/suction-cup-toothbrush-holder-cute-cartoon-animal-shape-tooth-brush-dispenser-g0xdx0xz-ic7g9io-24-wrt-o-qoo-73.html.

(Continued)

*Primary Examiner* — Monica E Millner
(74) *Attorney, Agent, or Firm* — Sarah J. Rhoades

(57) ABSTRACT

The holder rests or attaches to the ledge of a sink and stores a tool such as a toothbrush in an inverted position to drain into the sink basin. The holder includes a base cooperating with a suction cup, a post with at least one notch, and an arm with slots to hold the tool handle. In most cases, a three-walled shield protects the stored tool from splashes or debris created in the sink during regular use. The angle of the tool holder advantageously encourages any liquid debris on the tool to drain away from the tool as it dries during storage. In one example, a toothbrush handle rests in the notch and contacts the arm extending over the sink. The cleaning head, bristles, razor, or other working end of the tool will desirably hang to enhance the hygienic storage of the tool. A cover protects the tool from splashes.

20 Claims, 53 Drawing Sheets

Related U.S. Application Data filed on Mar. 15, 2023, now Pat. No. 11,896,166, which is a continuation-in-part of application No. 29/884,570, filed on Feb. 13, 2023, now Pat. No. Des. 999,552.

(60) Provisional application No. 63/321,489, filed on Mar. 18, 2022.

(56) References Cited

U.S. PATENT DOCUMENTS

| | | | |
|---|---|---|---|
| 1,657,968 A | 1/1928 | Linsemeyer | |
| 1,864,874 A * | 6/1932 | Voight | A47K 1/09 248/110 |
| 2,051,847 A * | 8/1936 | Halstead | A47K 1/09 248/206.4 |
| 2,177,504 A * | 10/1939 | Thompson | A47K 1/09 248/205.5 |
| D130,579 S | 12/1941 | Dreyfuss | |
| 2,626,199 A * | 1/1953 | Knowles | A47K 1/09 312/207 |
| 2,673,641 A * | 3/1954 | Estrada Carrillo | A45D 44/18 206/362.2 |
| 2,797,886 A * | 7/1957 | Pinckney | A47K 1/09 248/113 |
| 3,109,619 A * | 11/1963 | Krug | A47K 1/09 248/690 |
| 3,124,399 A * | 3/1964 | Seta | A45D 44/18 206/362.2 |
| 3,325,847 A * | 6/1967 | Meranto | A46B 17/04 15/184 |
| 3,977,743 A * | 8/1976 | Harris | A47K 5/18 312/207 |
| 4,369,946 A * | 1/1983 | Palmer | F16L 3/13 24/561 |
| 4,396,238 A * | 8/1983 | Torruella | A46B 17/04 312/207 |
| 4,527,760 A * | 7/1985 | Salacuse | F16B 21/02 248/108 |
| 4,854,457 A * | 8/1989 | Perler | A47K 1/09 248/113 |
| 4,986,759 A * | 1/1991 | Duncan | A47K 1/09 211/DIG. 1 |
| 5,361,915 A | 11/1994 | Cohen et al. | |
| 5,645,252 A * | 7/1997 | Fisher | F16L 3/22 24/297 |
| 5,678,790 A * | 10/1997 | Dwyer | A47J 43/287 248/37.3 |
| D393,098 S | 3/1998 | Adams | |
| 5,806,669 A | 9/1998 | Kim | |
| 6,027,081 A * | 2/2000 | Rosenberg | A47K 1/09 248/300 |
| 6,502,794 B1 | 1/2003 | Ting | |
| 6,622,978 B1 * | 9/2003 | Ghiz | A46B 15/0097 248/153 |
| 6,758,446 B2 * | 7/2004 | Bjornrud | A46B 17/02 248/351 |
| 6,786,342 B2 | 9/2004 | Tayebi | |
| 6,869,053 B2 | 3/2005 | Adams, IV | |
| 6,991,200 B2 * | 1/2006 | Stillman | A47L 13/51 248/205.5 |
| D642,002 S | 7/2011 | Rosenfeld | |
| 7,975,972 B1 | 7/2011 | Hajianpour | |
| 8,517,187 B1 * | 8/2013 | Westphal | A47K 1/09 248/110 |
| D698,581 S | 2/2014 | Arboleda et al. | |
| 8,651,290 B1 | 2/2014 | Fonseca | |
| D729,542 S | 5/2015 | Dontfraid | |
| 9,291,301 B2 * | 3/2016 | Brinkmann | A47J 47/16 |
| 9,687,116 B1 * | 6/2017 | Fonseca | A47F 7/0035 |
| 10,058,219 B2 * | 8/2018 | Collins | A47K 1/09 |
| D886,489 S | 6/2020 | Prommel et al. | |
| 11,470,963 B2 * | 10/2022 | Taylor | A47B 81/02 |
| 11,523,712 B1 * | 12/2022 | Hurwicz | A47L 17/08 |
| 2002/0121449 A1 * | 9/2002 | Bowie | A61L 2/26 206/362 |
| 2004/0238701 A1 * | 12/2004 | Nanda | A47K 1/09 248/206.4 |
| 2006/0011209 A1 * | 1/2006 | Mehes | A46B 17/00 132/310 |
| 2009/0242442 A1 | 10/2009 | Kaddissi | |
| 2010/0051565 A1 | 3/2010 | Fonseca | |
| 2016/0100682 A1 | 4/2016 | Lee | |
| 2017/0208934 A1 | 7/2017 | Harlan | |
| 2022/0395142 A1 | 12/2022 | Tanel | |

OTHER PUBLICATIONS

Trolir—Amazon Store, Fun Colorful Toothbrush Holder Set for Kids, printed Sep. 23, 2020, 2 pages, https://www.amazon.com/stores/TROLIR/ToothbrushHolderSetforKids/page/EF84CEB0-3705-495D-9DC7-90178C875C71.

Leily Kaddissi, Product Demonstration by Leily Kaddissi, posted Nov. 7, 2008, 6 pages of screenshots from video, https://vimeo.com/2181957.

Aliexpress, Niceyard Plastic Sppon Chopstick Holder Soup Spoon Rack Sink Suction Cup Holder Spoon Shelf Sucker Sink Cutlery Shelf, printed Sep. 8, 2020, 4 pages, https://www.aliexpress.com/i/33055707670.html.

Thingiverse, Inverted Draining Toothbrush Holder, printed Sep. 8, 2020, 3 pages, https://www.thingiverse.com/thing:3300144.

Johnson Hand Controls, Handicap Sink Toothbrush Holder, printed Sep. 8, 2020, 2 pages, https://www.johnsonhandcontrols.com/handicap-sink-toothbrush-holder.html.

Living Better Homes, Self-Draining Toothbrush Holder, printed Oct. 15, 2021, 5 pages, https://www.amazon.com/Living-Better-Homes-Innovative-SELF-DRAINING/dp/B083XQTVCR/ref=sr_1_2?dchild=1&keywords=self+draining+toothbrush+holder&qid=1634109268&s=home-garden&sr=1-2.

Lifancy, Self-Adhesive Electric Toothbrush Holder Wall Mounted, printed Oct. 15, 2021, 5 pages, https://www.amazon.com/gp/product/B09BVMSMQG?pf_rd_r=8NR47R7W1SV2CKZWAQM8&pf_rd_p=8fe9b1d0-f378-4356-8bb8-cada7525eadd&pd_rd_r=e80fdeed-6e5c-4623-b0ae-29ff9e7eea73&pd_rd_w=GBrZH&pd_rd_wg=MTHHI&ref_=pd_gw_unk.

* cited by examiner

HYGIENE IMPLEMENT HOLDER WITH SHIELD

CROSS-REFERENCE TO RELATED APPLICATIONS

This patent application claims priority under 35 U.S.C. § 120 to U.S. patent application Ser. No. 18/184,522, entitled Hygiene Implement Holder with Shield, filed on Mar. 15, 2023 which application is now pending. The parent application claimed priority under 35 U.S.C. § 119(e) to U.S. Patent Application Ser. No. 63/321,489, entitled "Hygiene Implement Holder with Shield", and filed on Mar. 18, 2022. The parent application further claimed priority under 35 U.S.C. § 120 to U.S. patent application Ser. No. 29/884,570, entitled "Hygiene Implements Holder with Shield", and filed on Feb. 13, 2023 which was granted on Sep. 26, 2023 as U.S. D999,552 S. This application claims priority under 35 U.S.C. § 120 to U.S. patent application Ser. Nos. 29/897,500, 29/897,501 and 29/897,503, which applications are now pending. The entire disclosures of those patent applications are hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to holders for the hygienic storage of bathroom or kitchen tools typically used around a sink area, and more particularly to such a hygiene implement holder with a protective shield.

2. Description of the Related Art

Humans often groom themselves around a sink. Toothbrushing occurs over or near a sink which is commonly used to spit out water, debris, and toothpaste. After brushing, toothbrushes are stored until their next use. It is generally recommended to store a toothbrush with the "head up" and exposed to open air in order to allow the toothbrush and bristles to dry fully and discourage the growth of bacteria. Among many issues with storing a toothbrush in this manner, one drawback is that liquid from the toothbrush drains down and soils the handle of the toothbrush which leads to unsanitary build up around the base of the toothbrush handle.

Other attempts to offer alternative toothbrush storage have provided bathroom attachment points for head-up storage. Still other attempts have been made to provide devices for resting the toothbrush over the sink in a slightly downward angle, sometimes over a sink to encourage drainage. These devices have many drawbacks, one of which is that there is extensive contact with the handle of the toothbrush which will foster bacterial growth.

Meanwhile, other hygiene maintenance rituals for personal and oral health care may also be occurring around the sink area. Activities such as washing hands or other body parts, shaving, hair trimming, tongue scraping, flossing, or hair brushing commonly occur over or near the sink. Toothbrushes stored by known techniques are exposed to the debris from such activities. Additionally, these other hygiene implements are exposed to harmful bacteria discharged from the mouth during tooth brushing. The prior devices for storing toothbrushes or similar implements often further encourage cross-contamination of spray and debris from use of those devices due to exposure to the sink area.

There exists a need for sanitary toothbrush and other hygiene tools and implements storage around a sink where the tools can be protected from splashes but also permitted sufficient air flow to fully dry between uses.

BRIEF SUMMARY OF THE INVENTION

The hygiene implement holder comprises a base, a post, at least one notch, and an arm. The holder desirably incorporates a splash shield for the area below the arm, protecting the hygiene implement during storage. The holder preferably attaches to or may sit on the edge of a sink. The holder is formed to receive a hygiene implement such as a toothbrush, razor, or any similar tool used for hygiene. An openable cover protects the implement from splashes above the arm. Some embodiments will also employ a hanger stemming from the rear for receiving a toothbrush accessory such as a bristle travel cover.

The base is substantially flat on the bottom to rest on a flat surface and desirably adapted to form a circle stand structure that permits the holder to sit on the counter, edge, or rim of the sink. In the preferred embodiment, the circular base cooperates with or receives a suction cup that clings to a surface. Examples of surfaces that may receive the suction cup so that it is attachable but is also removable include: the sink ledge, sink basin, shower, bathtub, countertop or shelf located near these fixtures. The base, with or without a suction cup keeps, holds, and balances the device in place.

The base transitions to a vertically projecting post. The vertical post preferably extends straight up from the base. Particularly when used in conjunction with a suction cup, the post will extend from the central area of the base to distribute the load on the suction cup. The post may be integrated with the base or may be attached. In the preferred embodiment, the post is a round tube with a flat top. The flat top is designed to enable the ability to push down on the post to engage the suction cup of the base to adhere to a flat surface. The post is a vertical shaft designed to support the handle of the toothbrush with a notch feature acting to cradle the handle. The notch is preferably formed to the shape of a curve that is carved out of the side and near the top of the post. The curve of the notch serves to enable the support of the handle of the tool, keeping it in the position of leaning against the post.

An arm extends from the post or may be formed to attach to the side of the post. In the preferred embodiment, the arm extends out from the post at a substantially ninety-degree angle in an arrangement nearly parallel to the countertop and forms a tool receiving structure. The arm comprises at least one slot which acts as the second point of contact for receiving the handle of the tool. In the preferred embodiment, the arm comprises a receiving structure with three unique characteristics. The arm includes a first tool receiving section, a second tool receiving section, and an enlarged opening between the first receiving section and the second receiving section. The first receiving section, preferably formed by an inlet creating a slot, serves as the second point of contact for a tool having an elongated handle. The second receiving section, preferably formed by another inlet creating a slot, serves as an independent tool engaging component for additional tools. The holder will accommodate tools having long handles, short handles, or virtually no handle. The enlarged opening serves as an access to the first receiving section, the second receiving section, or both.

More specifically, and in one embodiment, a hygiene implement defined by a work end, and a handle portion, the handle portion having a length, is held by the present invention. The hygiene implement holder comprises a base member, a first handle receiving structure, an arm with additional receiving structures, a shield, and a cover. The first handle receiving structure is located above the base and formed by a notch in an upper most portion of a vertical post and the vertical post is configured for attachment to the base member. At least one additional receiving structure is located on an arm projecting from the base. An articulating cover with at least one living hinge covers the arm receiving structure area. The arm is formed by a horizontal wall extending axially from the vertical post and the horizontal wall has a first inlet abutting an enlarged opening. The enlarged opening abuts a second inlet forming a second tool receiving structure. The shield is a vertical wall descending from the arm toward a draining area of a sink and at least partially encloses an area below the horizontal arm. The hygiene implement projects at a downward angle with the work end resting below the horizontal arm so that it is protected from splashes but exposed to airflow.

In another embodiment, by way of example and not necessarily by way of limitation, the toothbrush head and bristles may pass easily through the enlarged opening before the narrower portion of the toothbrush handle enters the handle receiving section. As one illustration, the head of a traditional toothbrush will be lowered through the enlarged opening and once the head of the brush is clear of the opening, the handle may be leaned against the post notch and rest within a first inlet of the arm. When the user wishes to again use the toothbrush, the process is reversed. The handle is grasped to lift it from the post notch and as the brush continues to a substantially vertical position, the head and bristles may again pass through the enlarged opening.

With continuing reference to the toothbrush example, the first tool receiving section of the arm may be referred to as the traditional slot, for use with a tool such as a traditional, manual toothbrush but many various hygiene implements with an elongated handle and a work end may use the holder in a similar manner. For a traditional toothbrush, the narrowest part of the handle is often the part closest to the head. The first tool receiving section of the arm, also called a brush slot in this embodiment is designed with a dimension to allow the narrowest part of the handle to be slid into the slot. When provided with the specified brush slot features, the first tool receiving section is dimensioned for the wider part of the toothbrush handle to rest at or near the edge of the slot on the arm. This feature offers additional assurance that the entire toothbrush will not slip through the receiving structure and fall into the sink.

The second tool receiving section of the arm is preferably located in the portion of the arm further from the post. It is also provided in the form of a slot which is intended to cooperate with the standard ergonomic features employed in hygiene tools. For example, when the second tool receiving section is used for an electric toothbrush head, it may be referred to as the mechanical slot. These electric toothbrush heads are typically removable from the electric toothbrush body. The heads are desirably removed and stored so that more than one person can use the electric toothbrush body. When stored, electrical toothbrush heads have similar drying and draining concerns to that of manual toothbrushes. While these types of hygiene implements tend to have a shorter handle, they also have a work end that is larger in circumference than the narrowest part of the mechanical toothbrush near the brush head. The second tool receiving section, also called the second brush slot, in this embodiment is designed with a dimension to allow the narrowest part of the handle to be slid into the slot. Similar to the use of the first slot the second slot is also desirably accessed through the enlarged opening which serves as a passageway for the bristles and head. When provided with the specified brush slot features, the second receiving section is dimensioned for the wider part of the toothbrush handle to rest on the arm at or near the slot, preventing the entire toothbrush from slipping through the slot. Also, the slot is designed with a nob or flange to prevent the toothbrush from slipping back into the enlarged opening.

The enlarged opening may also serve as the passageway for a tool to enter the receiving structures of the arm. In one aspect of the invention, a cover is provided to partially cover the enlarged opening.

The present invention incorporates a shielding wall extending in a downward direction from the horizontal arm. In one embodiment, the shield extends at an angle slightly more than perpendicular from the arm. As traditional toothbrushes rest against the post notch and within the slot or when a mechanical toothbrush rests on the second slot, the splash shield is designed to surround the work end (for example the toothbrush bristles) of the stored tool on three sides. The shield will protect and guard the working end of the brush from splashes occurring around the sink. The configuration of the shield desirably incorporates a height and varied width that maximizes cover from regular sink usage but also allows air flow around the tool. Many configurations can meet these objectives, but the ideal shield configuration will enclose various sizes of toothbrushes and cooperate with various sink styles.

Attached to the side or rear of the post, at approximately a forty-five-degree angle, may be a hanger or stein in the form of a round peg. The hanger serves to store products, such as: dental floss or a cover for the bristles of the toothbrush when traveling.

For traditional toothbrushes, the product has at least two points of contact to hold the toothbrush in position. One point of contact is the first, tool handle receiving section in the form of a notch at the top of the post. The notch in the post supports the handle along the middle section of the length of the handle. A second point of contact is the second tool handle receiving section which occurs within the first slot in the arm and that slot supports the handle at or near the narrow part of the handle, just above the bristles.

The hygiene implement such as a toothbrush rests in the holder in an inverted, tilted position with the bristles hanging below the handle of the toothbrush. After cleaning, the entire toothbrush drips directly into the sink to air dry without any bacterial exposure from the countertop or the sink.

For tools having an elongated handle, the inverted, tilt of the toothbrush is accomplished by unique features which call for a minimum of two-points of contact. The first point of contact is at the top of the holder where the middle of the toothbrush handle leans against a notch formed by an indent in the holder. The second point of contact occurs along the length of the handle closer to the work end of the handle, just above the bristles, so that it rests within a clamp-shaped receiving wall of the slot. The interaction of the first point of contact and the second point of contact holds the toothbrush in position.

The holder is easy to clean and enables a simple hygienic way to store a toothbrush after use. The holder is further sized to permit easy packing for traveling and when in use does not require a lot of counterspace. The features of the preferred embodiment permit full use of the holder when located on almost all sinks on the market and desirably does not adversely impact or restrict regular use of the sink space. While in the holder, the working end of the tool is protected from sink use and debris by a shield. In the preferred embodiment the attachment is removably provided by the use of a suction cup. Any other mechanisms for permanent or semi-permanent attachment around a sink will meet the objectives of the invention.

The holder has particular utility for human grooming tools used in the bathroom; however, some bottle brushes and kitchen utensils or cleaning implements may have storage requirements similar to those required by a toothbrush. Therefore, the present invention may find utility around a kitchen sink.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

DETAILED DESCRIPTION OF THE INVENTION

Figure 1:
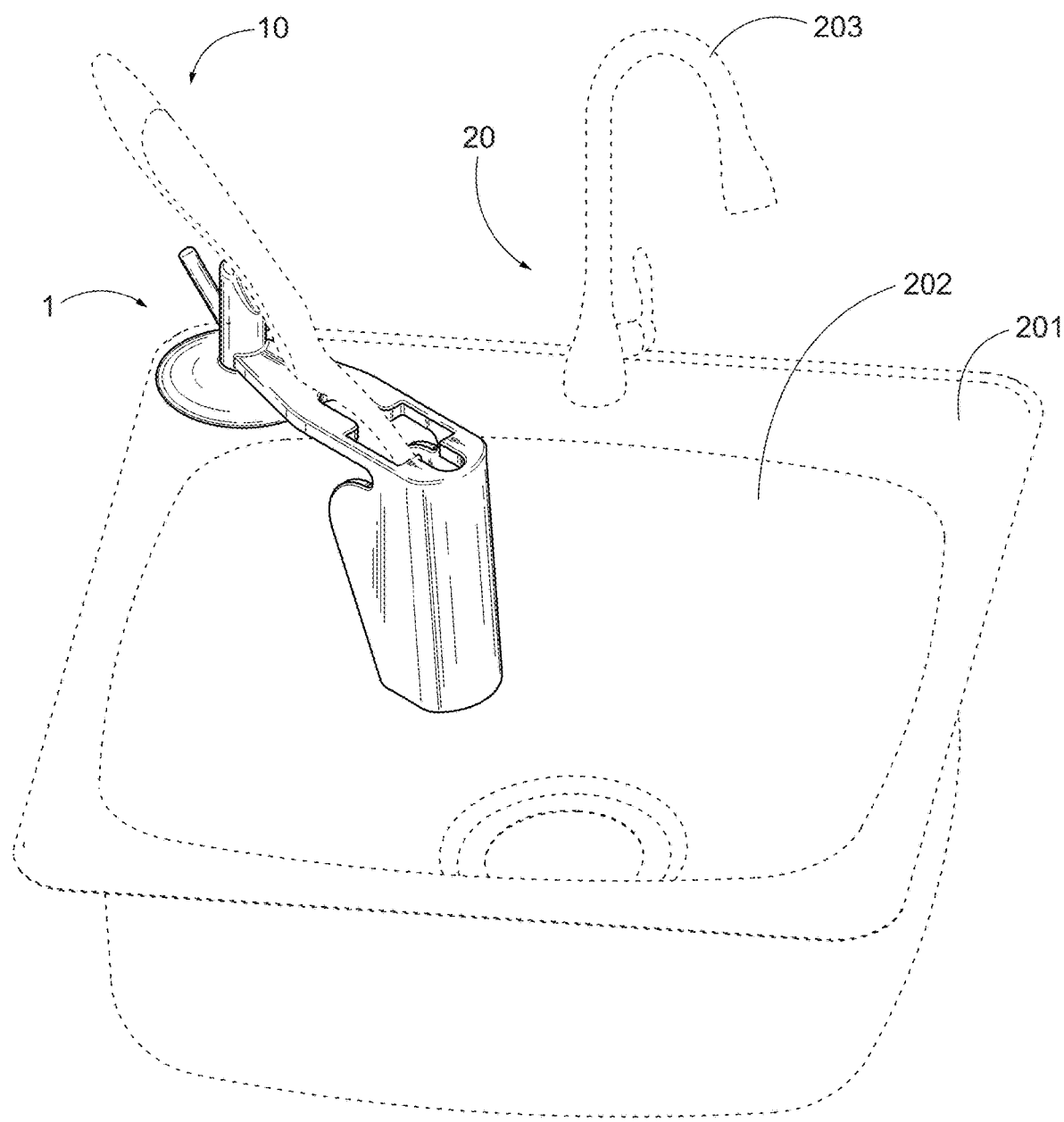
FIG. 1 is a top front perspective view of a first embodiment of a hygiene implement holder having a manual toothbrush inserted and shown installed on a sink ledge.

The hygiene implement holder 1 is configured to hold tools 10 used for cleaning and grooming around a sink 20. In this discussion, the tool 10 may be primarily referred to as a manual toothbrush 101, but the holder 1 will receive various tools including electric toothbrush heads 102, razors 103, tongue cleaners (not shown), or other hygiene implements (see, e.g., FIGS. 10, 12-17, 27-35 and 45-48). FIG. 1 shows a single notch embodiment of the holder 1 where the holder 1 includes a set of tool receiving slots. In FIG. 1, the holder 1 is located on a sink ledge 201 and projects over the sink basin 202 away from the faucet 203 to hold an inverted tool 10 in a draining position over the edge of the basin 202 and below the sink's rim. The angle of the toothbrush allows it to rest against the holder rather than needing to be clenched.

Figure 2:
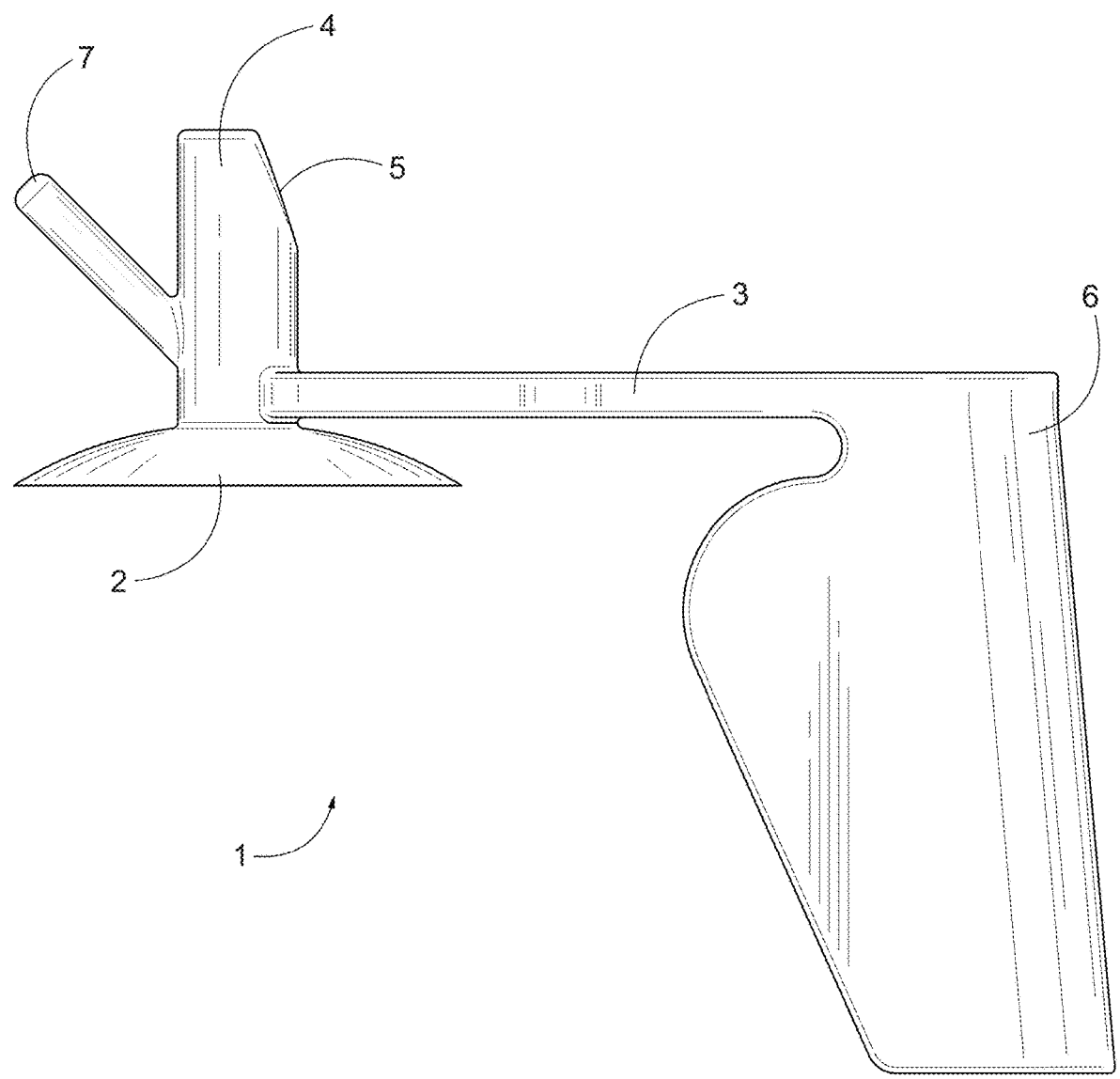
FIG. 2 is a first side view of the embodiment illustrated in FIG. 1.
Figure 3:
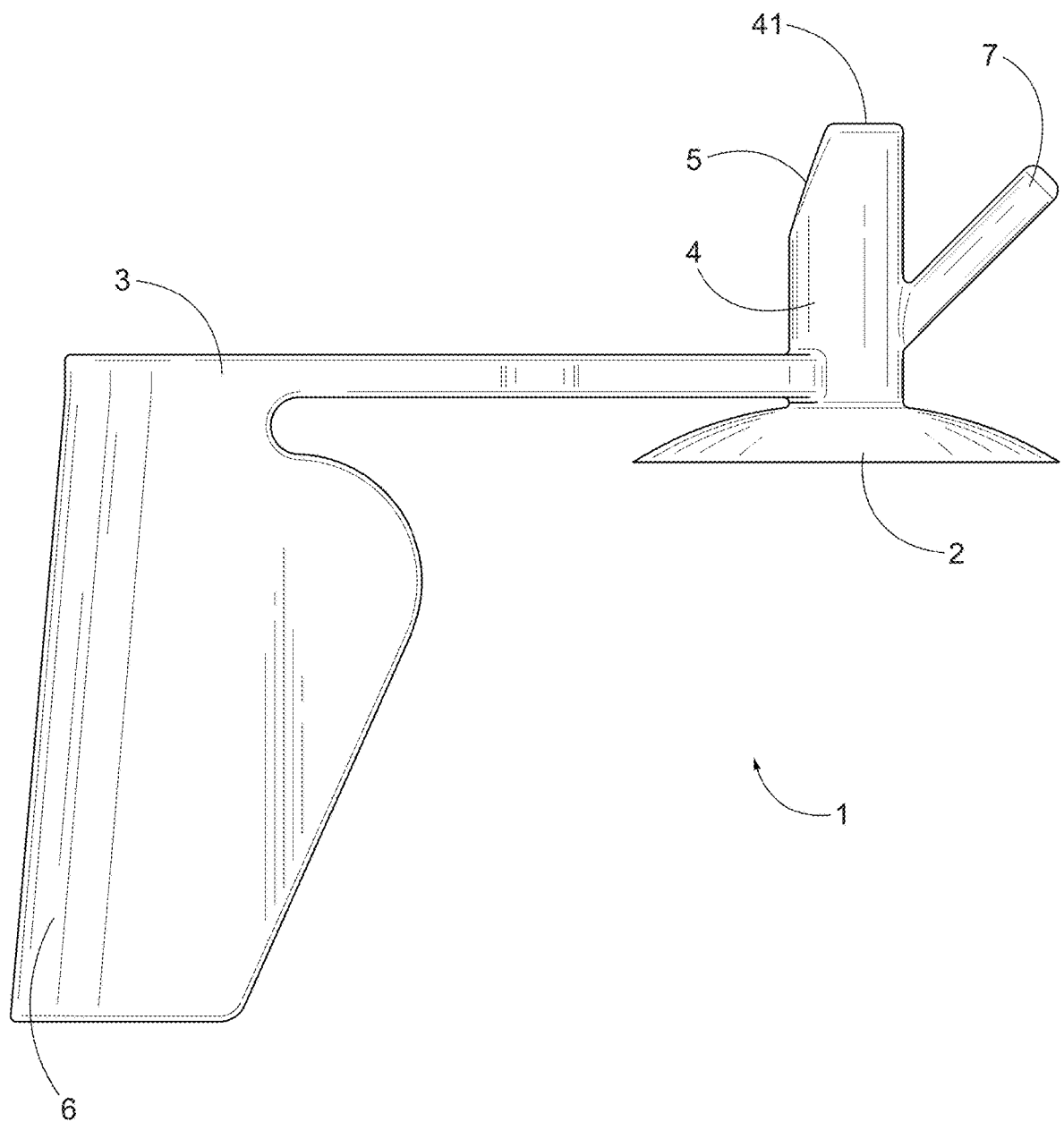
FIG. 3 is a second side view of the embodiment illustrated in FIG. 1.

As shown in more detail in FIGS. 1-13, the holder 1 includes a base 2 configured to join with the sink ledge 201 while the arm 3 projects to hold the toothbrush 101 for draining over the sink basin 202. With reference to FIGS. 2-3, a post 4 extends in a substantially vertical direction from the base 2. In the preferred embodiment, the post 4 incorporates a recess or notch 5 for receiving a portion of the tool 10. At a minimum the post, with or without a notch, will create a first handle receiving structure at a first height. The arm 3 projects orthogonally in one direction from the post 4 while an accessory hanger 7 extends in another direction from the post 4. The arm 3 and notch 5 occur on the same side of the post 4. The arm 3 extends horizontally at a second height, below the first height, and terminates in a vertically descending, slightly angled wall forming a shield 6 around the held tool 10.

With particular reference to FIGS. 2-3, the illustrated embodiment employs a hanger 7 from which accessories may be hooked and stored. The hanger 7 projects in a slightly upward direction to offer clearance from the counter and a narrow stein to receive accessories and for locating those items. Some examples of such toothbrush accessories include travel covers or spools of floss (see FIG. 29).

Figure 4:
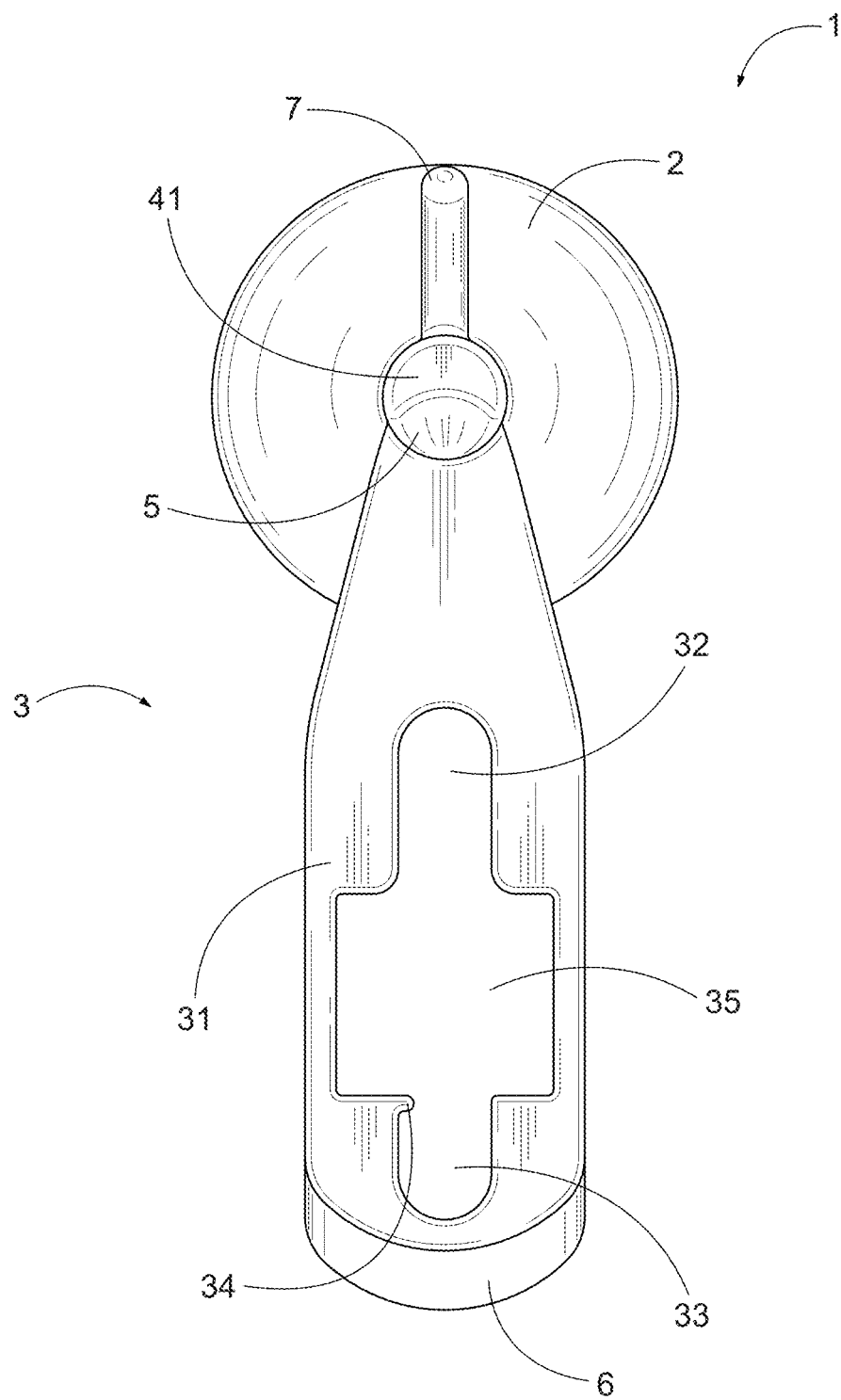
FIG. 4 is a top view of the embodiment illustrated in FIG. 1.
Figure 5:
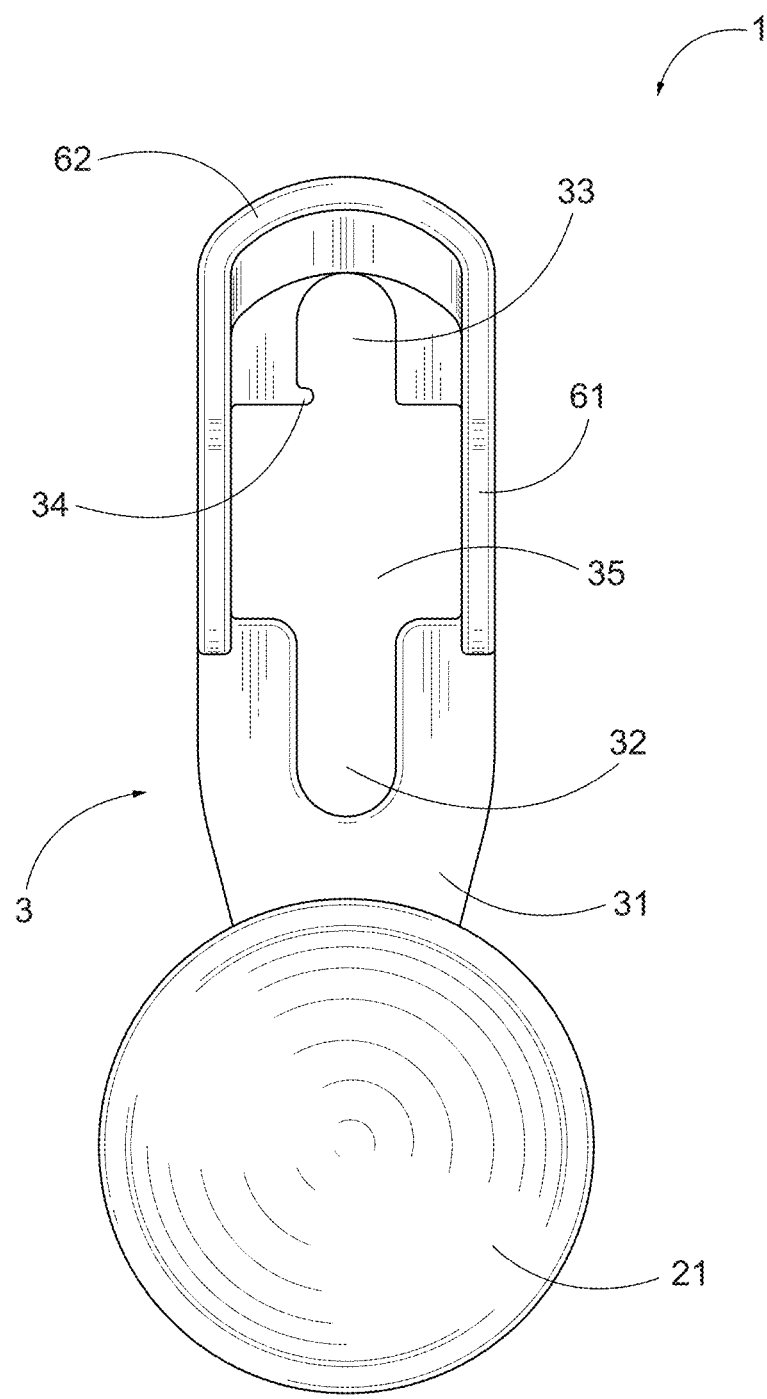
FIG. 5 is a bottom view of the embodiment illustrated in FIG. 1.
Figure 6:
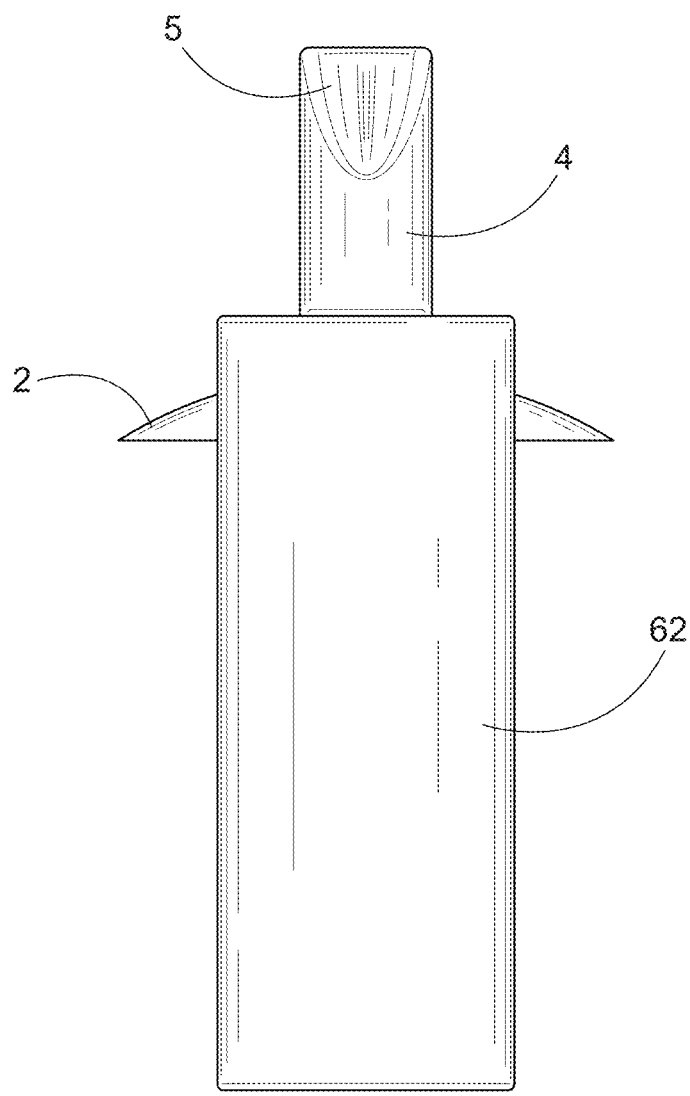
FIG. 6 is a front view of the embodiment illustrated in FIG. 1.

In FIG. 4-5, additional features of various aspects of the holder 1 as well as the cooperating structures of the arm 3, the notch 5, and the shield 6 can be better appreciated. The base 2 offers a substantially flat bottom to sit on a counter. When used with a suction cup, a circular stand structure desirably receives the concave shape of the cup and allows the holder to be removably joined or sit on the counter, edge, or rim of the sink. In the preferred embodiment, the base 2 and suction cup 21 are contiguous portions of the same structure and adhere the holder to a flat surface. More permanent coupling options such as hardware may be used to affix the holder to a sink or counter. The base, with or without a suction cup, keeps, holds, and balances the device in place.

In the embodiment shown in FIGS. 4-5, tool receiving structure of the arm 3 is comprised of two tool-receiving sections, specifically slots or inlets, on either side of an enlarged opening. In this embodiment, the horizontal wall 31 of the arm 3 comprises a receiving structure with three unique characteristics. The arm 3 includes a first tool receiving section 32, a second tool receiving section 33, and an enlarged opening 35 disposed between the first receiving section 32 and the second receiving section 33. The first receiving section 32 serves as the second point of contact for a tool 10 having an elongated handle. The second receiving section 33 serves as an independent tool engaging component for additional hygiene implements. Tools having short or virtually no handle will be best stored in the second receiving section 33. As shown in FIGS. 4-5 and FIGS. 42-43, the second receiving section 33 also comprises a narrower section 34 that aids in the retention of the tool in the second slot and away from the enlarged opening. The enlarged opening 35 serves as an access to the first receiving section 32, the second receiving section 33, or both. While the illustrated embodiment includes all of these features, at a minimum, the horizontal wall 31 of the arm 3 includes any receiving structure to provide a second point of contact for the tool, also referred to as a second handle receiving structure. This second point of contact may be in the form of a bar or a single slot which sufficiently cooperates with the notch 5. In yet another embodiment, the arm 3 is comprised of an opening and one slot without the need for a second slot (not shown).

Figure 52:
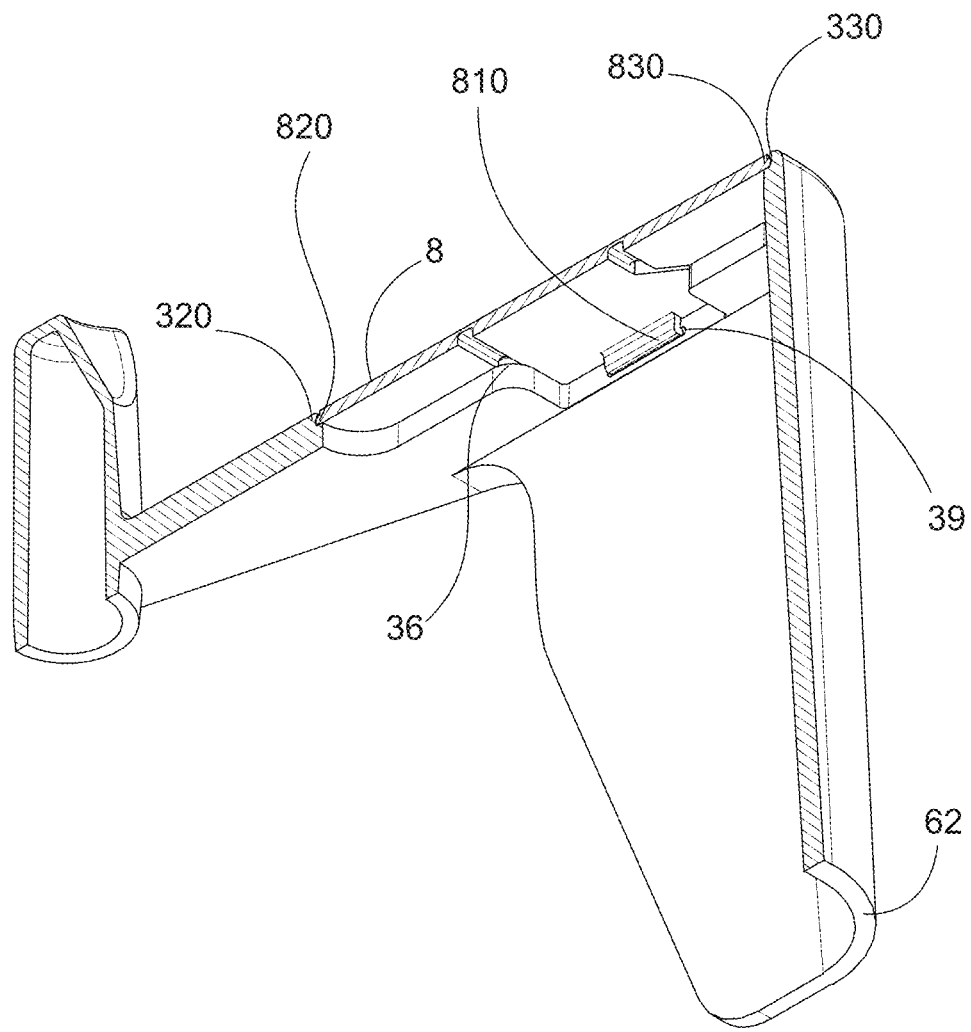
FIG. 52 is a sectional bottom perspective view of the exemplary embodiment showing the additional aspects of the cover in the closed position.
Figure 53:
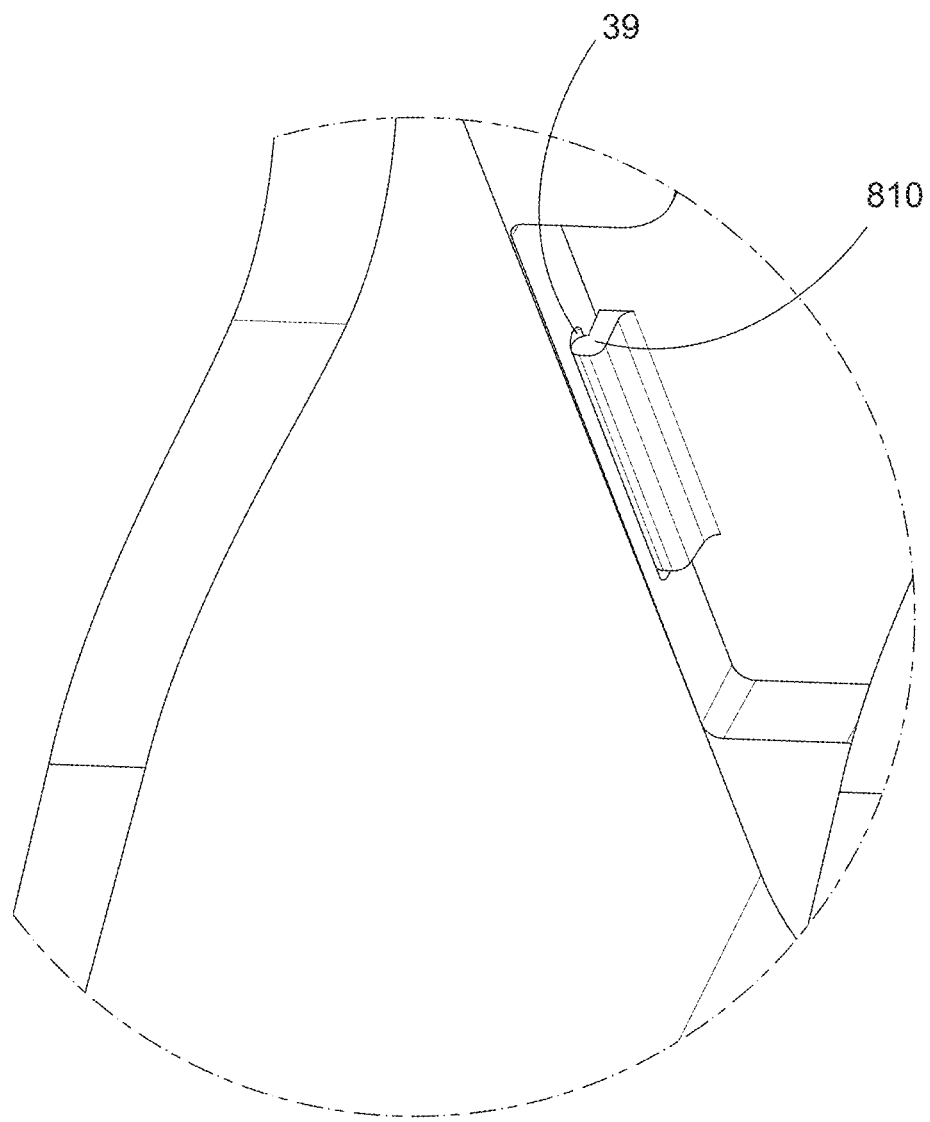
FIG. 53 is a bottom rear close-up view of the cover latch.

The accompanying figures demonstrate the depth and wall thickness of the shielding wall extending in a downward direction from the horizontal arm 3 for this embodiment. The shield 6 supplements the function of the present invention and, therefore, while beneficial, it is optional. In addition, the shield 6 may be employed in many various configurations. In this embodiment, a thin wall 61 (FIGS. 7 and 39) with a curve 62 (FIGS. 5, 43, and 52) and side cut-outs 63 (FIGS. 8-9 and 24) is illustrated. As traditional toothbrushes rest against the post notch 5 and within the first inlet 32 or when a mechanical toothbrush rests on the second inlet 33, the shield is designed to surround the work end (for example the toothbrush bristles) of the stored tool on three sides (see, e.g., FIGS. 10, 12, and 13 and FIGS. 27-30, and FIGS. 45-48). When installed on a sink as shown in FIGS. 1, 14, 27, 33-35, and 47-48, the sink basin 202 creates a fourth wall to fully surround the working end of the stored tool. The function of shielding the stored tool could be performed by another wall design such as a separate front wall with two side walls having various shapes. The configuration of the shield desirably incorporates a height and varied width that maximizes cover from regular sink usage but also allows air flow around the tool. Many configurations can meet these objectives, but the ideal shield configuration will enclose various sizes of toothbrushes and cooperate with various sink styles. Some uses of the device may call for a bottom wall (not shown) with or without drain holes to be added to the shield 6.

Figure 7:
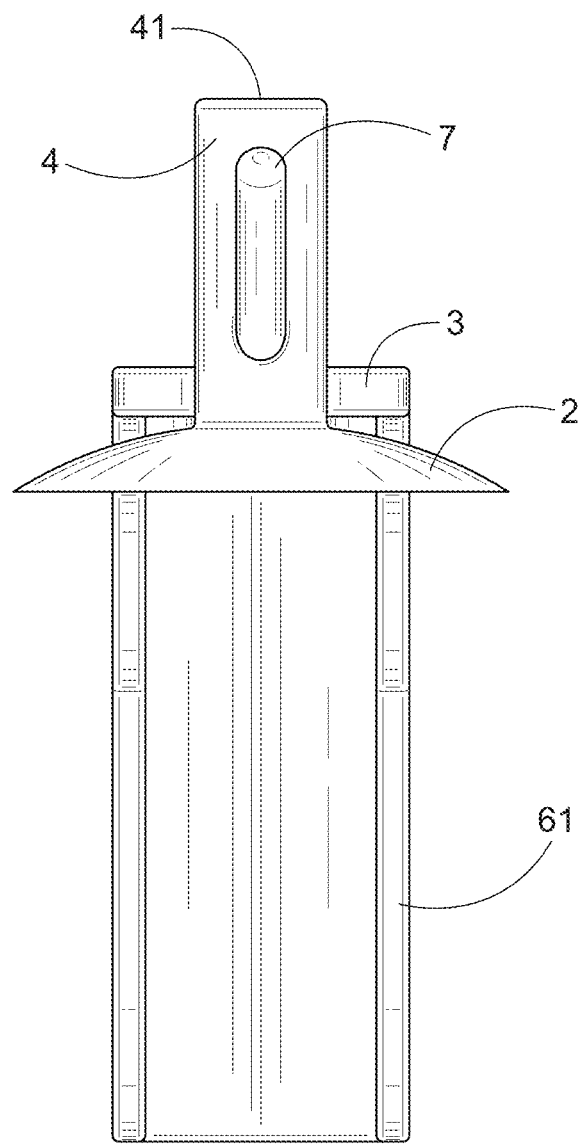
FIG. 7 is a rear view of the embodiment illustrated in FIG. 1.

With continuing reference to FIG. 7, the base 2 transitions to a vertically projecting post 4. The vertical post preferably extends straight up from the base 2. Particularly when used in conjunction with a suction cup 21 (see FIG. 5), the post 2 will extend from the center of the base 2 to evenly distribute the load on the suction cup 21. The post 4 may be integrated with the base 2 or may be attached. In the preferred embodiment, the post 4 is a round tube with a flat top 41. The flat top 41 is designed to foster the application of downward force on the post to engage the suction cup 21 (when present) of the base 2 and to aid in its adherence to a flat surface. The post 4 may alternatively cooperate with a screw or other mounting hardware. The post 4 is designed to support the handle of the toothbrush 101 by the notch 5 feature (see, e.g., FIGS. 6 and 8-9). In an illustrated embodiment, the notch 5 is formed to the shape of a curved face that is carved out of the side and near the top of the post 4. The curve of the notch 5 serves to enable the support of the handle of the tool, cradling it in the position of leaning against the post 4.

Figure 8:
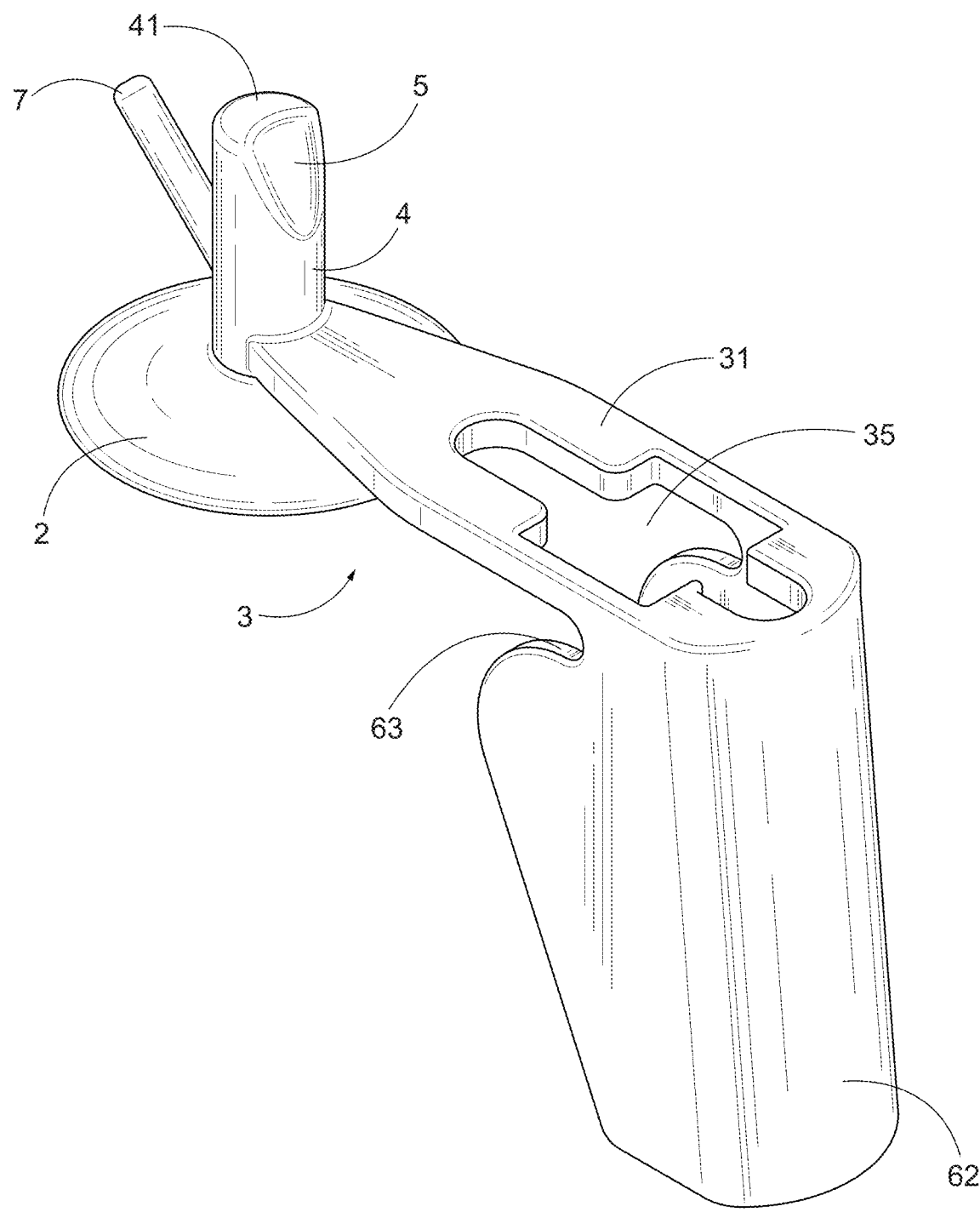
FIG. 8 is a top front perspective view of a first embodiment as illustrated in FIG. 1.

As shown in FIG. 8, an arm 3 extends from the post 4 or may otherwise be formed to attach to the side of the post 4. In the preferred embodiment, a horizontal wall 31 of the arm 3 extends out from the post 4 at approximately a ninety-degree angle. When attached to a level edge of a sink 20, the wall 31 may be substantially parallel to the countertop. The features of the holder will function whether the arm 3 is level or not.

Turning to FIGS. 9-13, when employed in a preferred manner, the draining position of the toothbrush 101 will result in the bristles 1013 being the lowest point of the held brush. The toothbrush head and bristles may pass easily through the enlarged opening 35 before the narrower portion of the toothbrush handle enters the first inlet 32. The enlarged opening 35 may also serve as the passageway for a tool to enter the second inlet 33. As one illustration, the head of a traditional toothbrush will be lowered through the enlarged opening and once the head of the brush is clear of the opening, the handle of the toothbrush 101 may be leaned against the post notch 5 and rest within slot 32 of the arm opening 35 (see FIGS. 10, 12, and 13). When the user wishes to again use the toothbrush, the process is reversed. The handle is grasped to lift it from the post notch 5 and as the brush continues to a substantially vertical position, the head and bristles may again pass through the enlarged opening 35.

Figure 9:
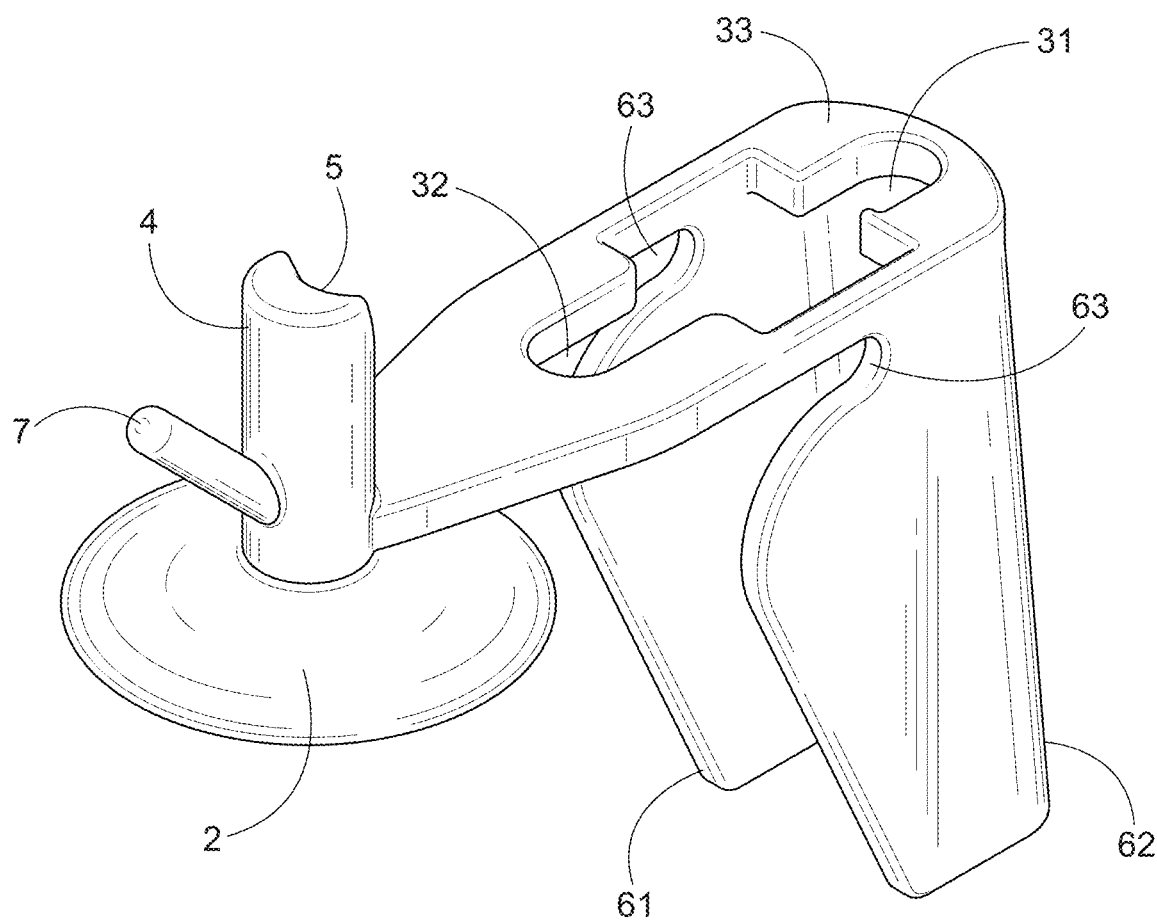
FIG. 9 is a top rear perspective view of a first embodiment as illustrated in FIG. 1.
Figure 10:
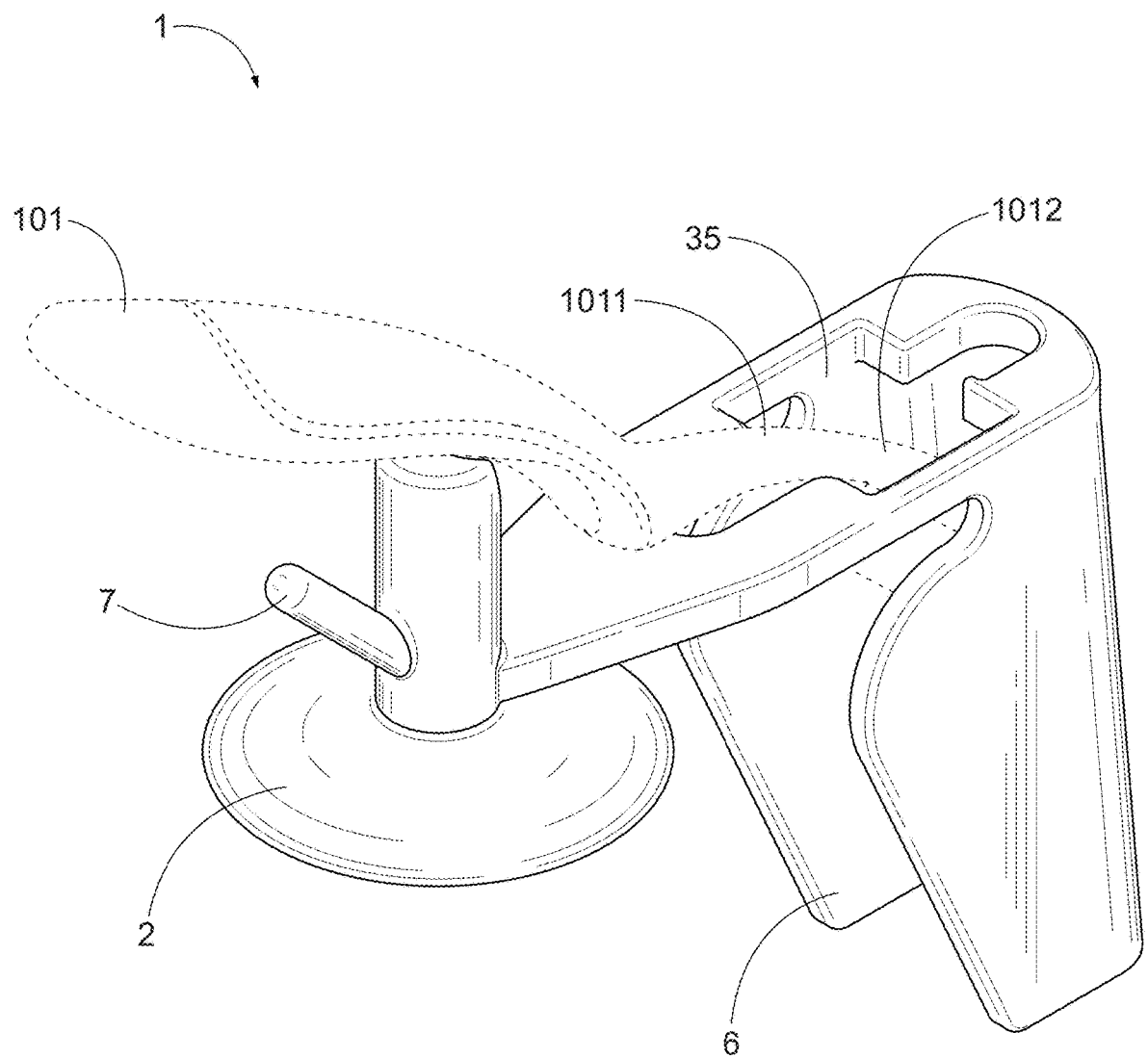
FIG. 10 is a top rear perspective view of a first embodiment of a hygiene implement holder having a manual toothbrush inserted.
Figure 11:
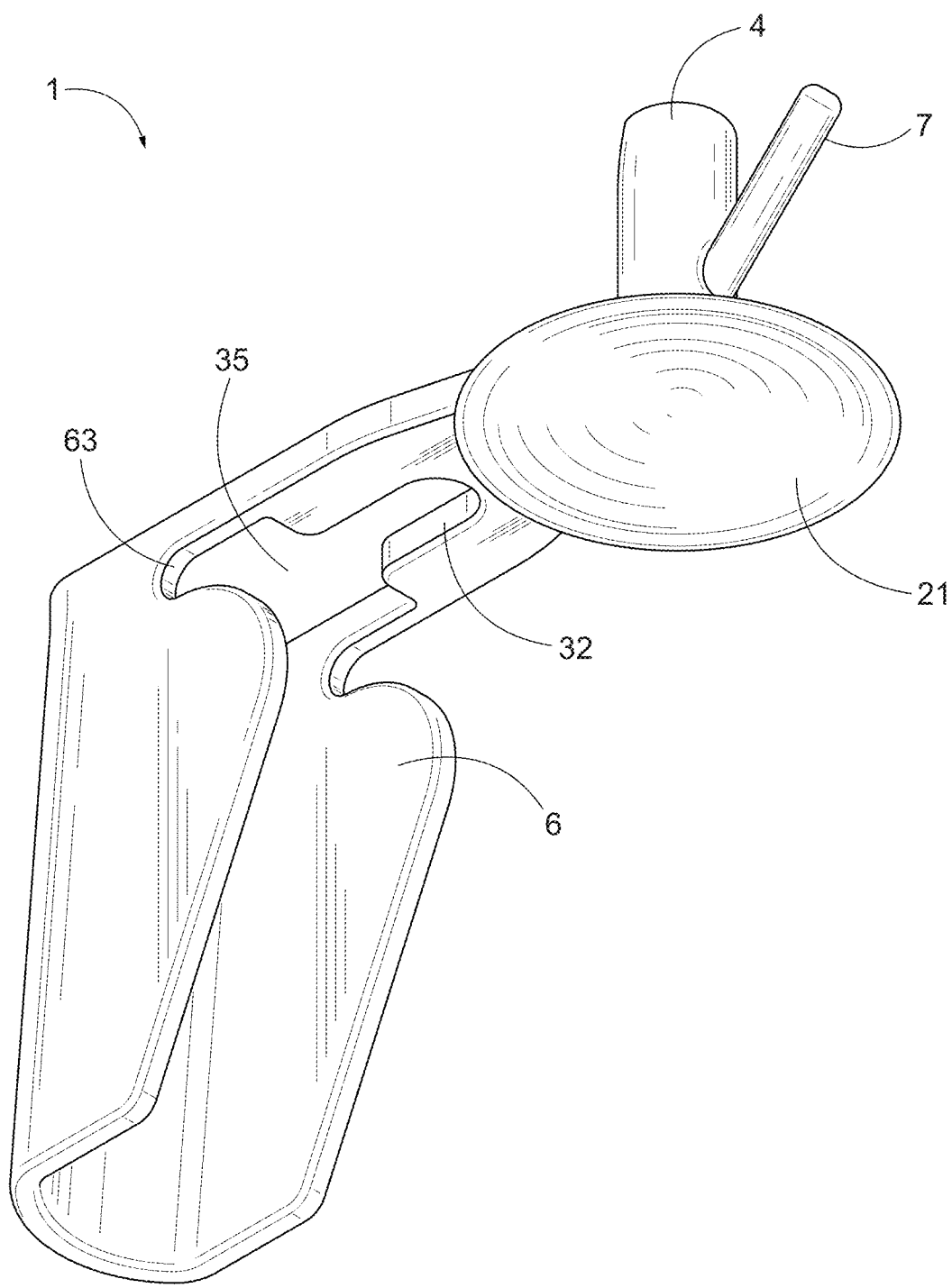
FIG. 11 is a bottom rear perspective view of a first embodiment as illustrated in FIG. 1.
Figure 12:
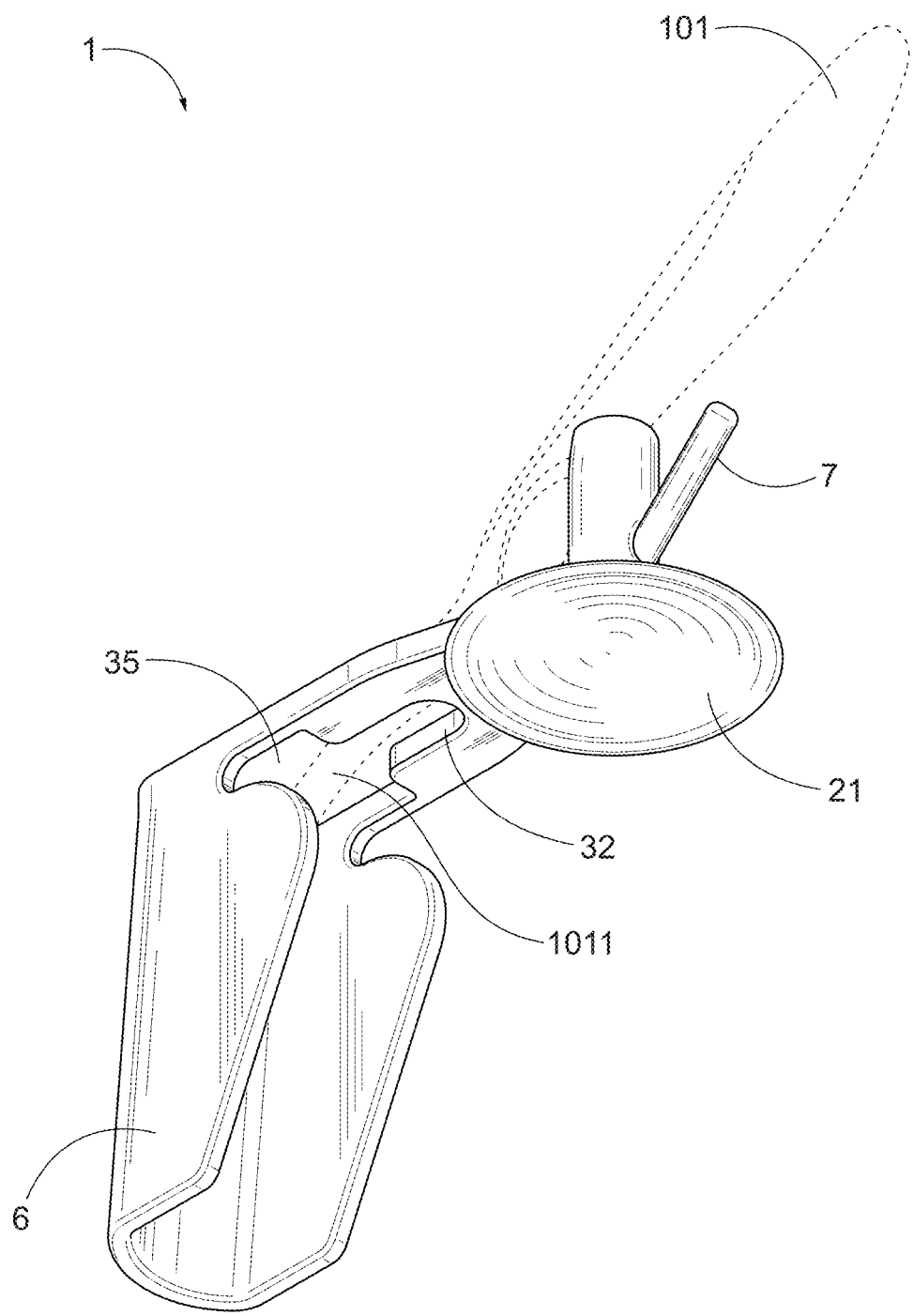
FIG. 12 is a bottom rear perspective view of a first embodiment of a hygiene implement holder having a manual toothbrush inserted.
Figure 13:
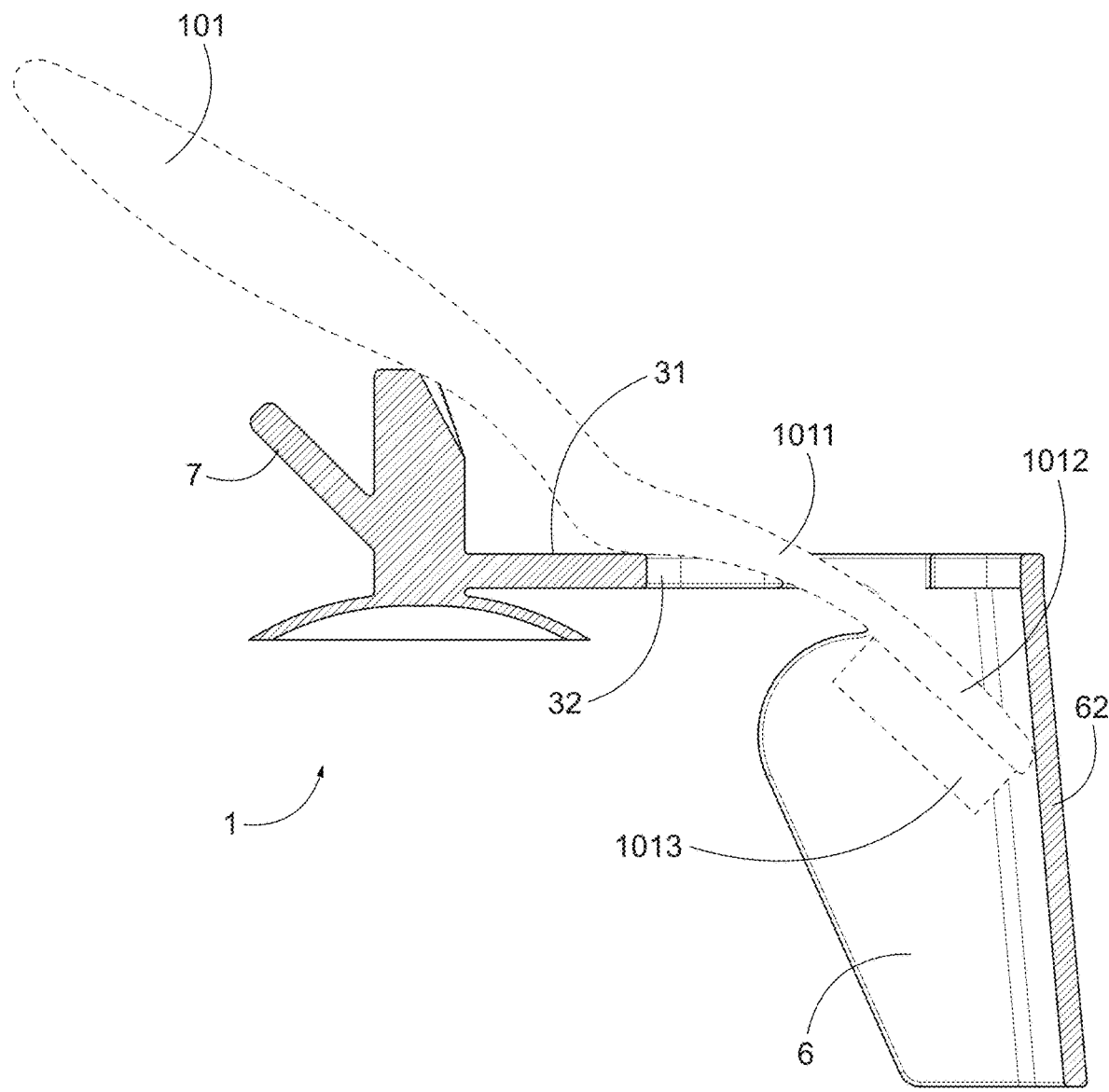
FIG. 13 is a sectional side view of an embodiment of a hygiene implement holder offering a sample schematic illustration of the insertion of a manual toothbrush.

With continuing reference to the toothbrush example in FIGS. 9-10, this first receiving section 32 may be referred to as the traditional slot, for use with a tool such as a traditional, manual toothbrush 101 but many various hygiene implements 10 with an elongated handle and a work end may use the holder 1 in a similar manner. As shown by example in FIG. 13, for a traditional toothbrush 101, the narrowest part of the handle 1011 is often the part closest to the head 1012.

The first receiving section 32, also called a brush slot in this embodiment, is designed with a dimension to allow the narrowest part of the handle 1011 to be slid into the slot 32. When provided with the specified brush slot features, the first receiving section 32 is dimensioned for the wider part of the toothbrush handle to rest along the upper edges of the slot, preventing the entire toothbrush from slipping through the slot. Additionally, the toothbrush head 1012 may optionally rest against the interior curved wall of the shield 62 for additional support. See FIG. 13.

Figure 14:
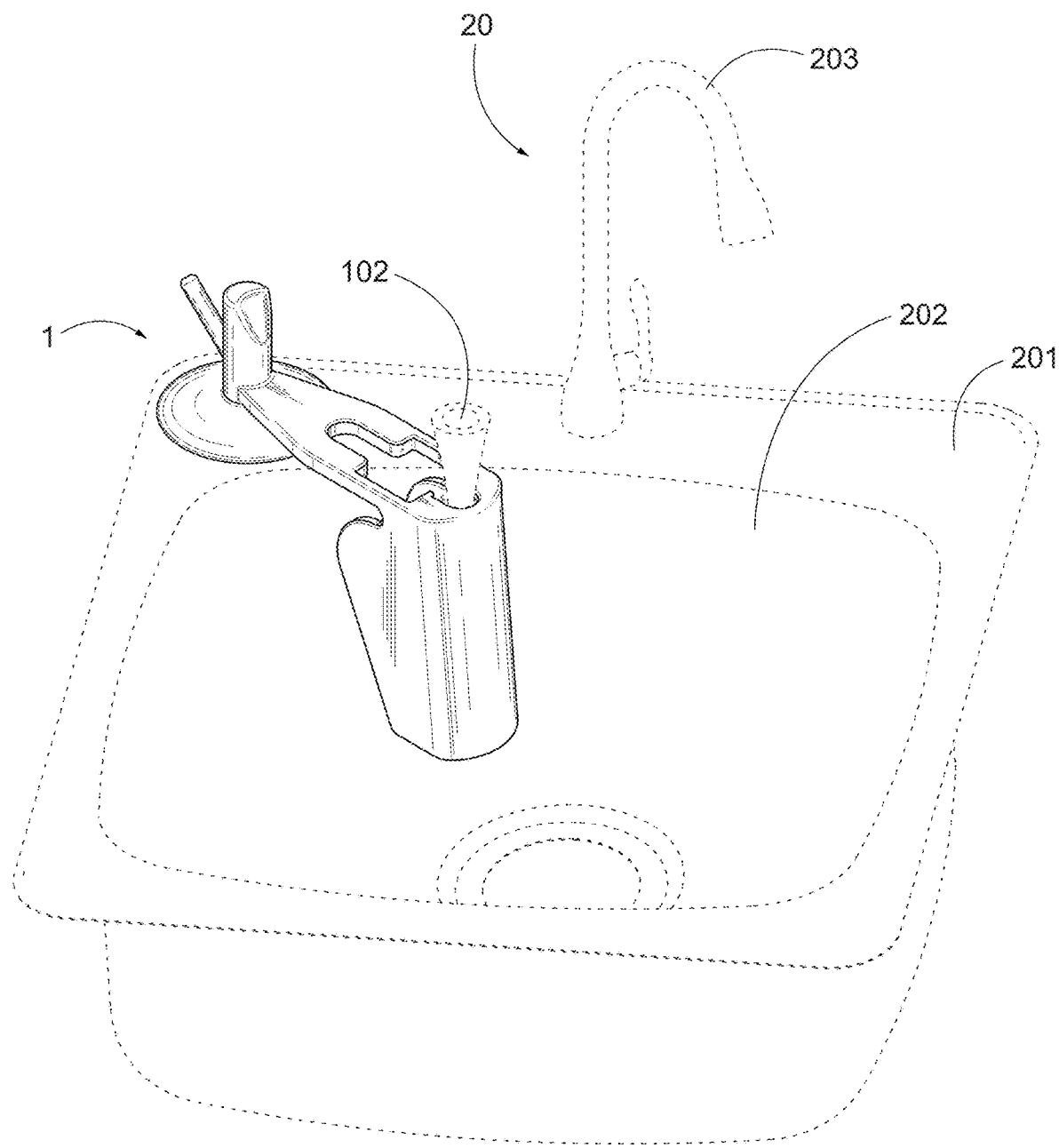
FIG. 14 is a top front perspective view of an embodiment of the hygiene implement holder installed on a sink ledge offering a sample schematic illustration of the insertion of an electric toothbrush head.
Figure 15:
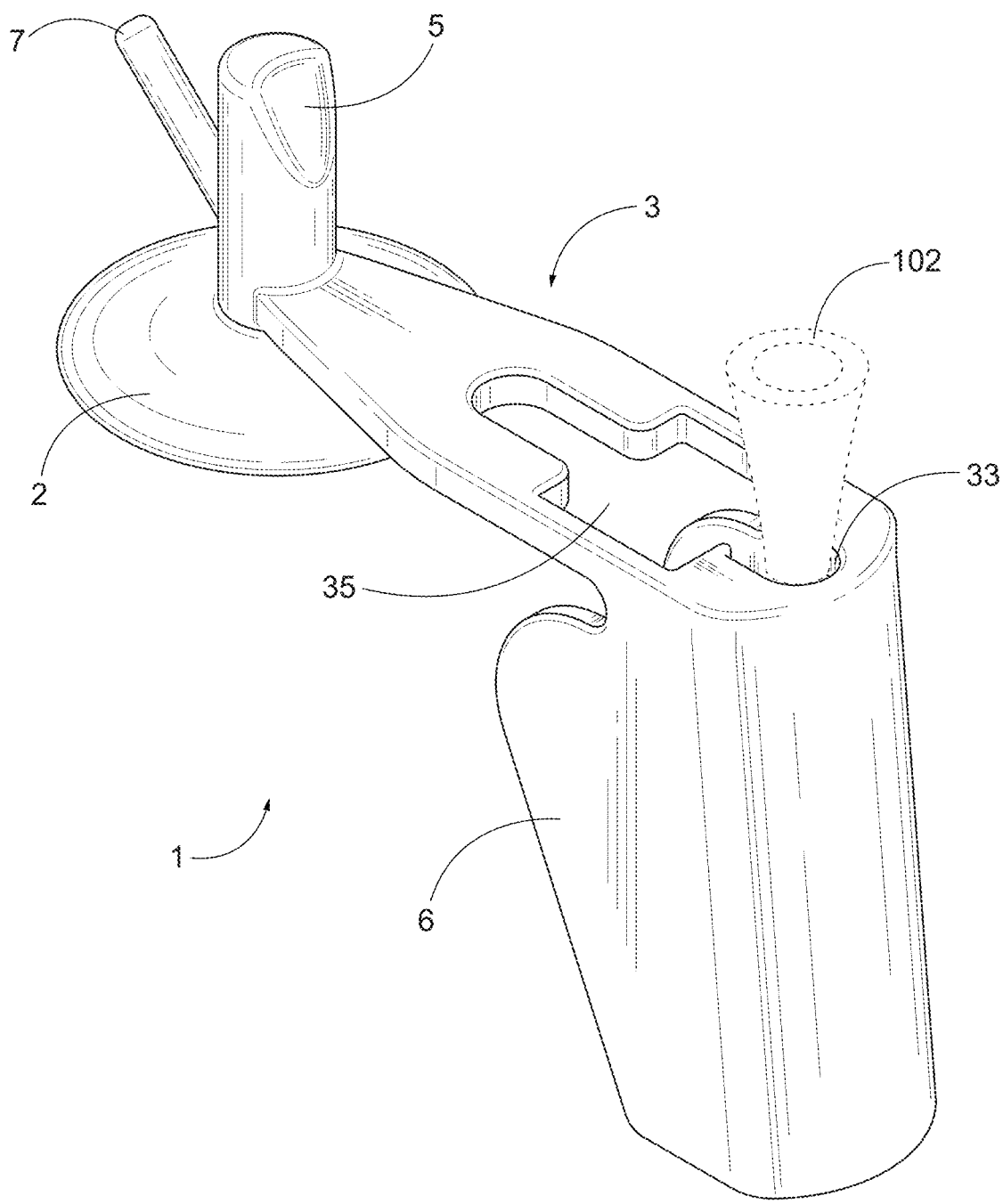
FIG. 15 is a top front perspective view of the sample electric toothbrush head inserted in the holder.
Figure 16:
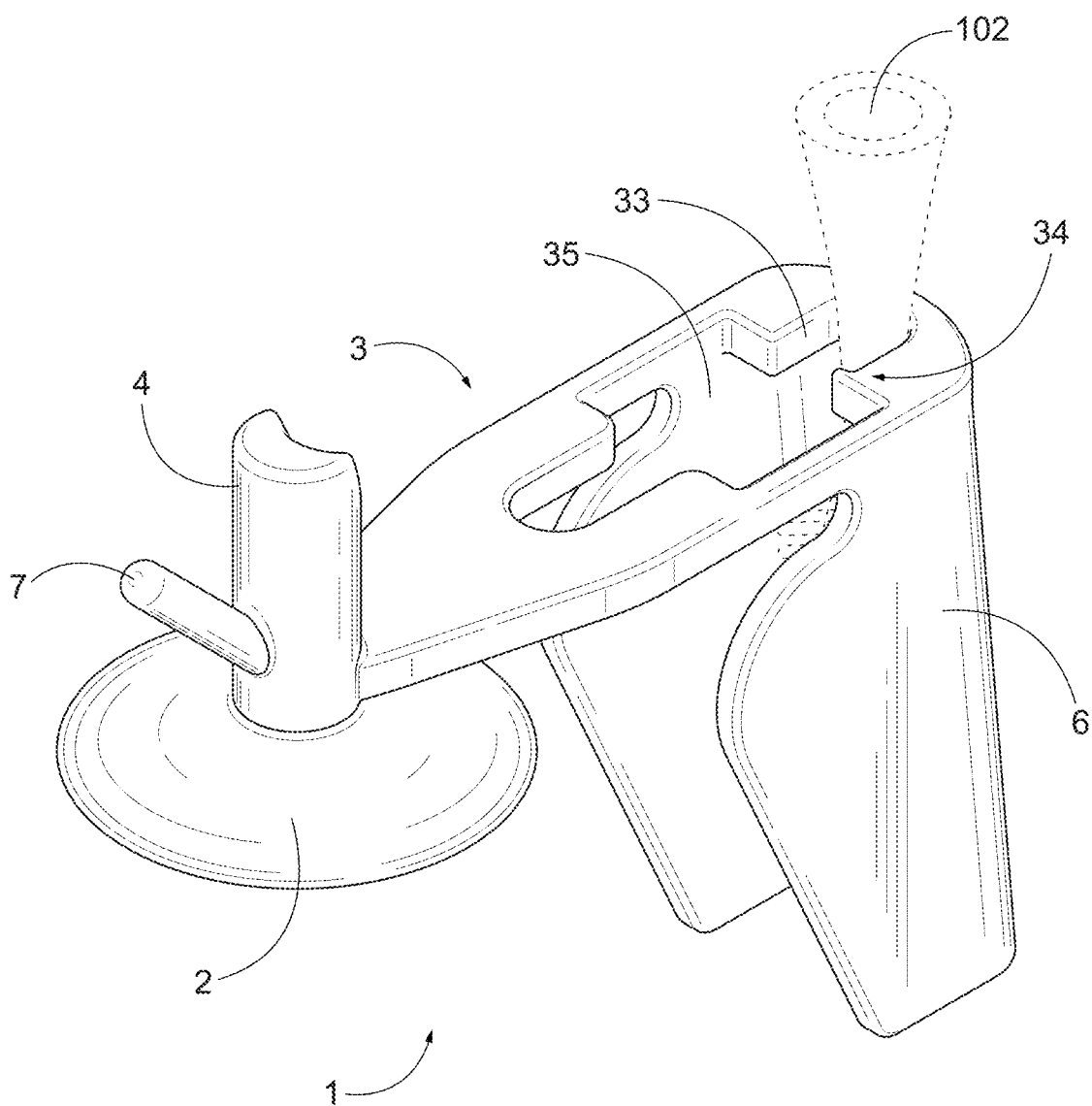
FIG. 16 is a top rear perspective view of FIG. 15.
Figure 17:
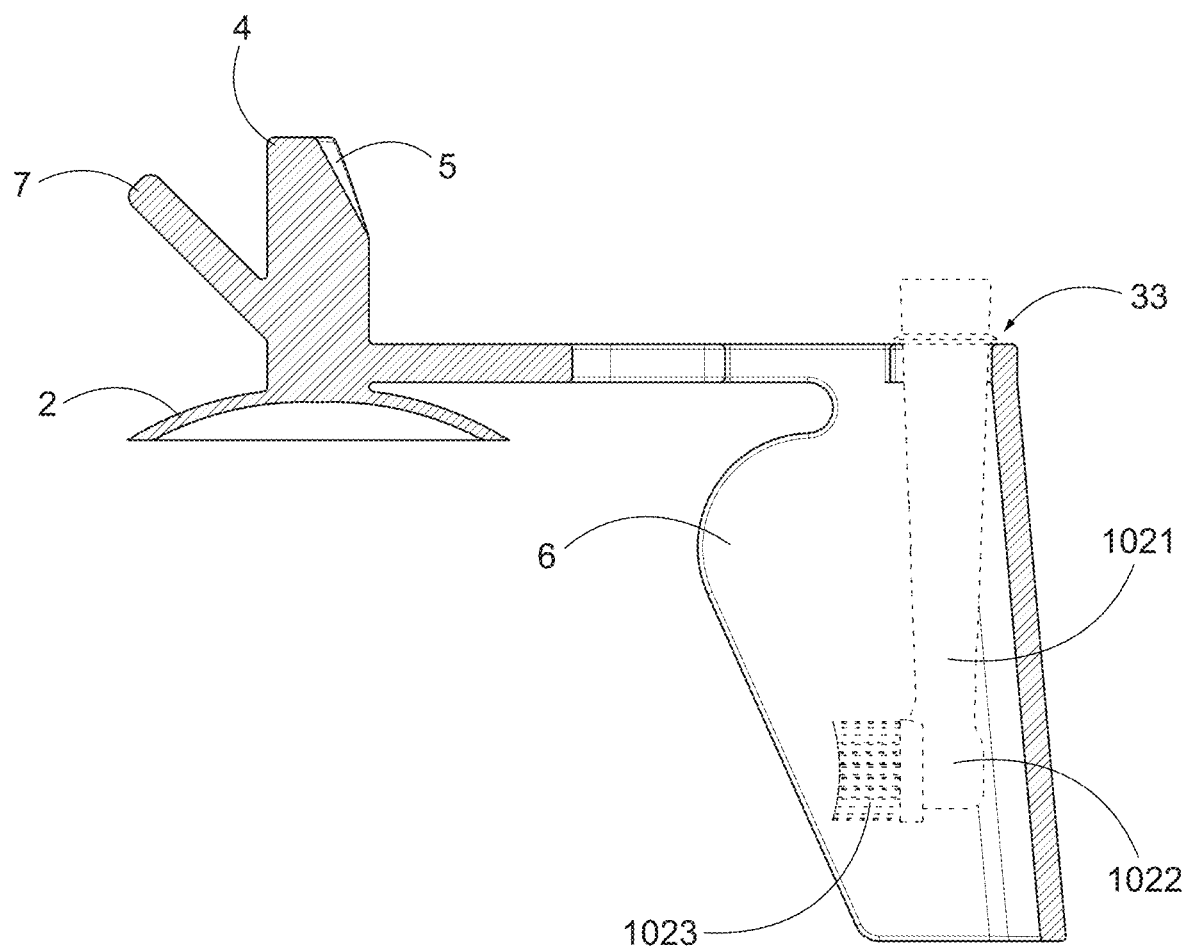
FIG. 17 is a sectional side view of an embodiment of a hygiene implement holder illustrating the insertion of a sample electric toothbrush head.
Figure 18:
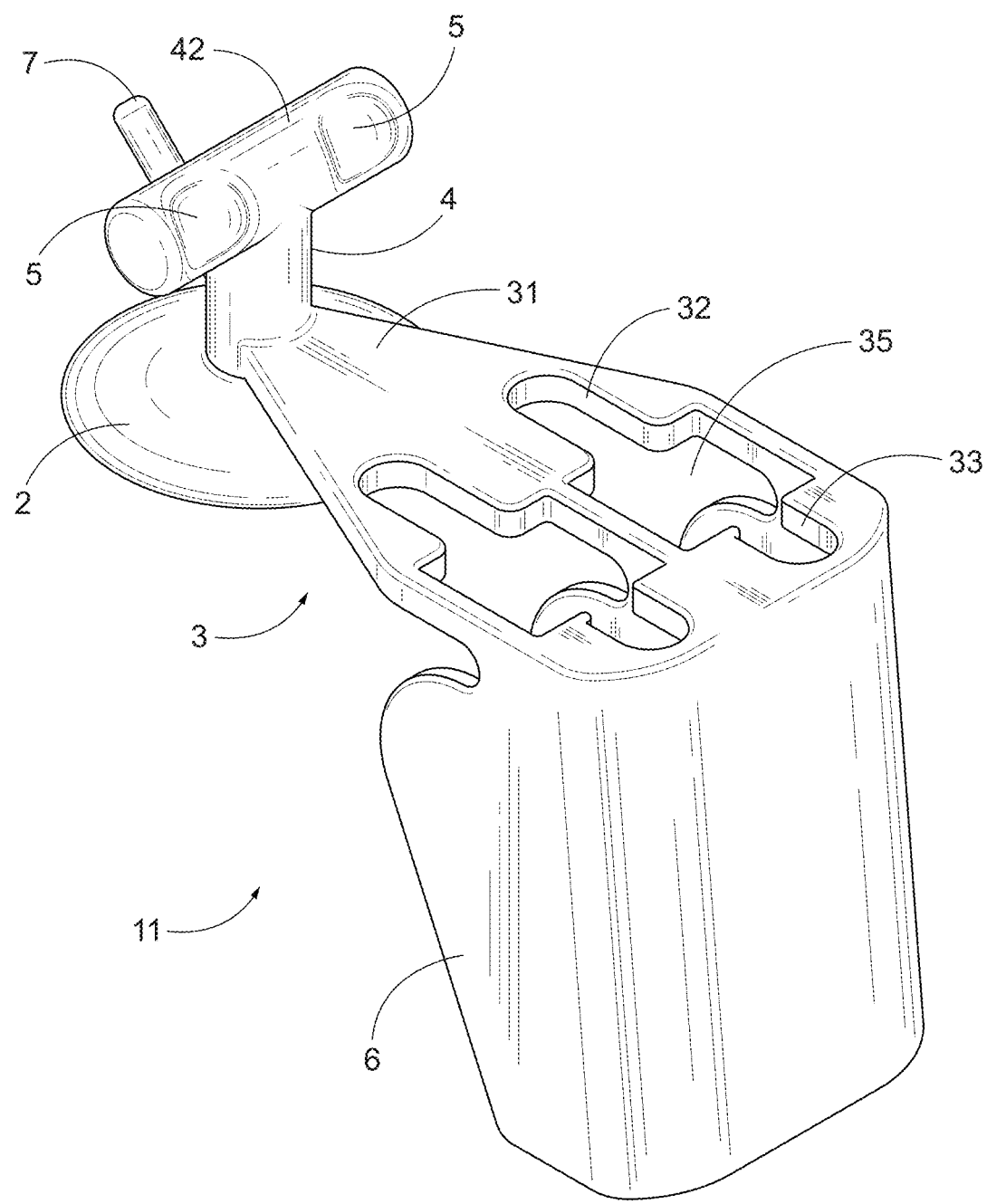
FIG. 18 is a top front perspective view of a multi-notch hygiene implement holder according to another embodiment of the present invention.
Figure 48:
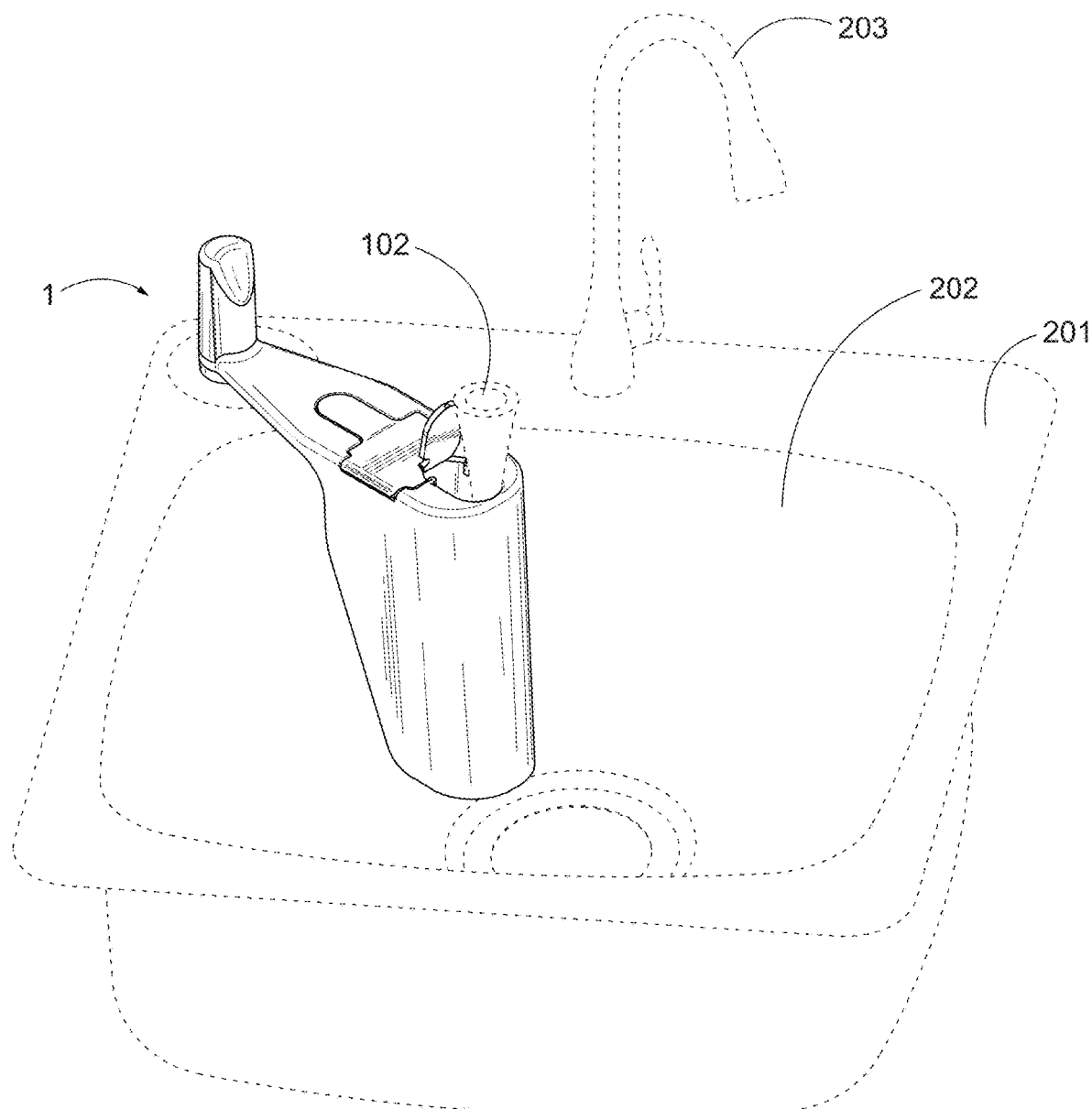
FIG. 48 is a top front perspective view of the holder shown in FIG. 46 with a sample electric toothbrush head inserted and shown installed on a sink ledge.
Figure 49:
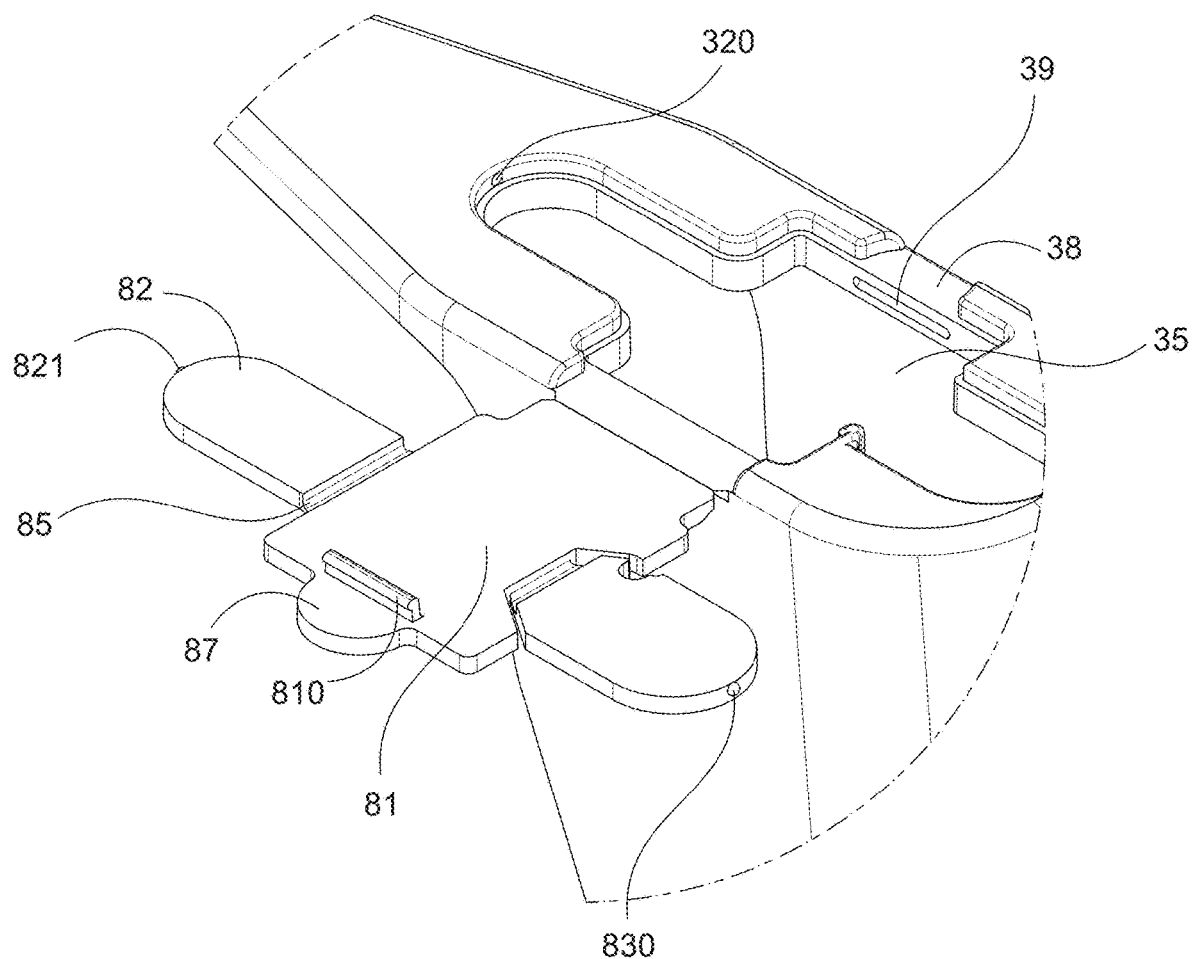
FIG. 49 is a close-up view of the cover and opening of the exemplary embodiment.
Figure 50:
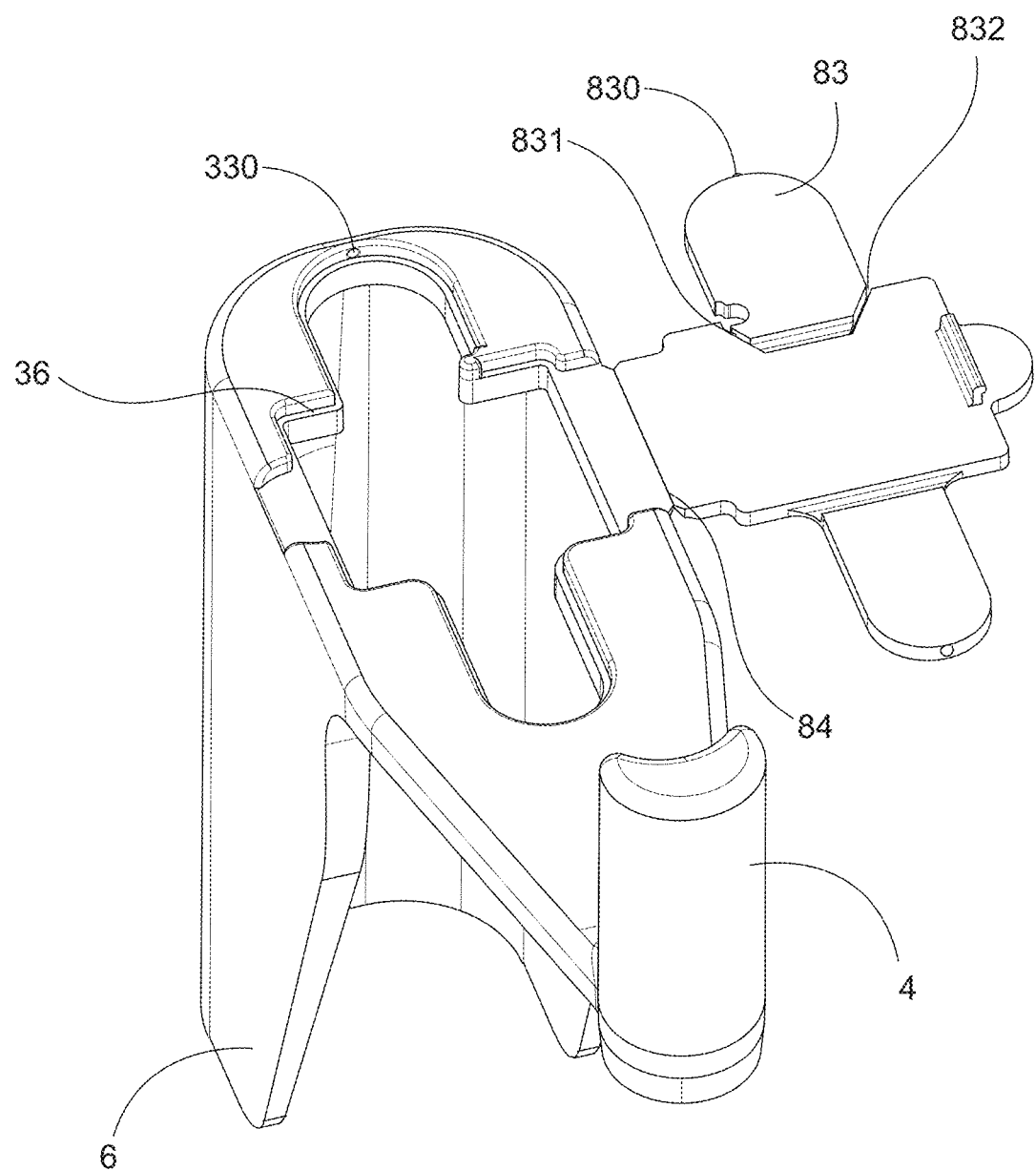
FIG. 50 is a top rear perspective view of the exemplary embodiment.
Figure 51:
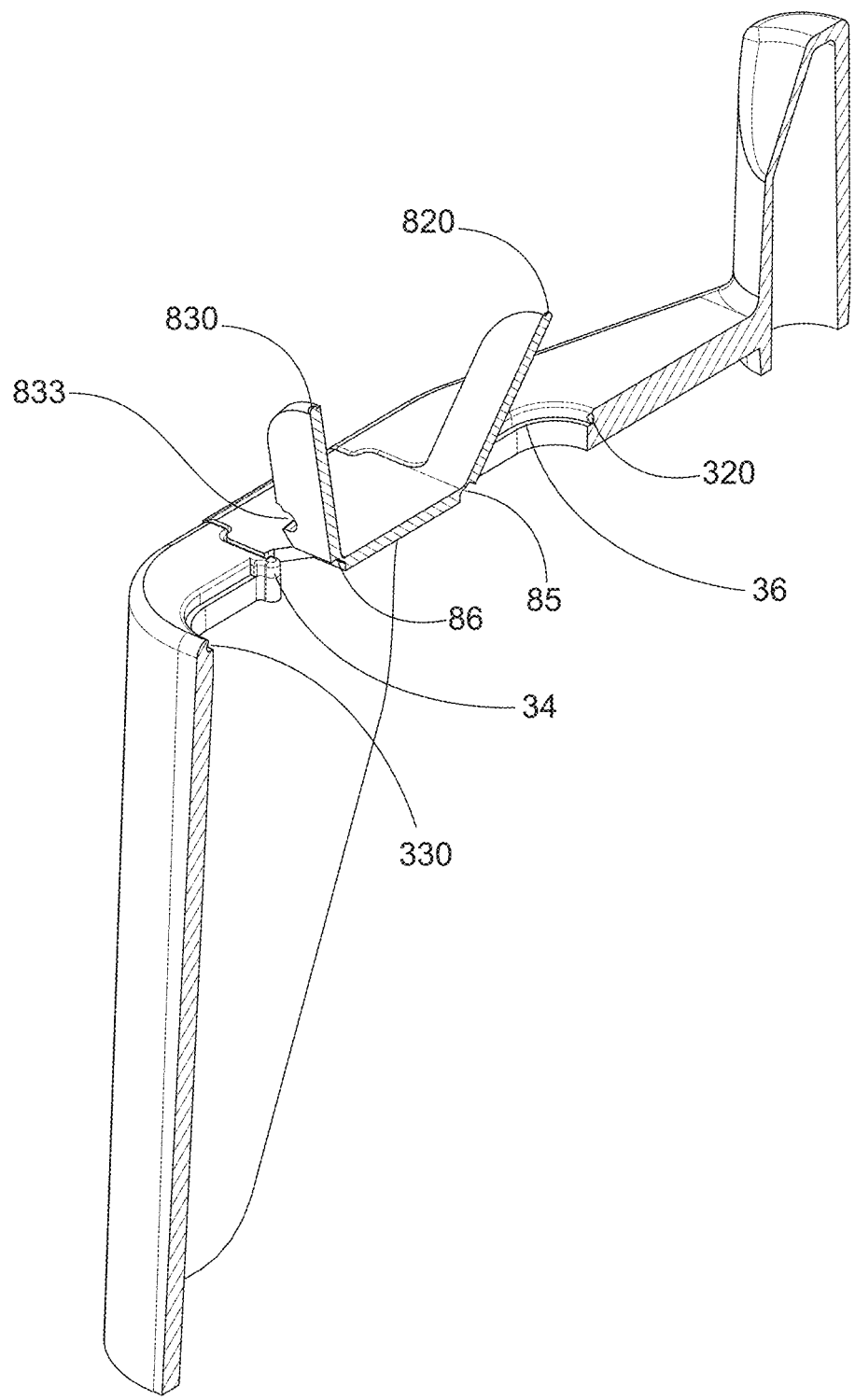
FIG. 51 is a sectional top front perspective view of the exemplary embodiment shown in FIG. 44 depicting aspects of the cover.

Turning to FIG. 14 and as also shown in FIG. 48, the holder 1 is located on a sink ledge 201 and projects over the sink basin 202 away from the faucet 203 to hold an inverted electrical toothbrush head 102 in a draining position over the edge of the basin 202. FIGS. 14-17 and FIGS. 46 and 48 further illustrate the electric toothbrush head 102 being held in the second receiving section 33 that is preferably located in the section of the arm 3 closest to the shield 6. It is also provided in the form of a slot which is intended to operate with the standard ergonomic features employed in hygiene tools. For example, when the second receiving section 33 is used for an electric toothbrush head 102, it may be referred to as the mechanical slot. These electric toothbrush heads are typically removable from the electric toothbrush body between uses. The heads are desirably removed and stored so that more than one person can use the electric toothbrush body. When stored, electrical toothbrush heads 102 have similar drying and draining concerns to that of manual toothbrushes. While these types of hygiene implements tend to have a shorter handle, they also have a work end that is larger in circumference than the narrowest part of the handle 1021 of the mechanical toothbrush near the brush head 1022 (see FIG. 17). The second receiving section 33, also called the second brush slot, in this embodiment is designed with a dimension to allow the narrowest part of the handle to be slid into the slot. Similar to the use of the first slot, the second slot is also desirably accessed through the enlarged opening which serves as a passageway for the bristles and head. When provided with the specified brush slot features, the second receiving section 33 is dimensioned for the wider part of the toothbrush handle to rest on each side of the slot in a vertically hanging fashion, preventing the entire toothbrush 102 from slipping into the sink 20 through the slot 33. As an additional aspect of the second receiving section 33, a flange 34 protrudes as a barrier to urge the brush handle in the slot and away from the enlarged opening 35. FIG. 16 illustrates the retaining aspects of the flange 34. The cross-sectional view of FIG. 17 demonstrates how the shield 6 protects the bristles 1023, head 1022 and handle 1021 of the electric toothbrush 102 when it is suspended from the second receiving section 33. While the electric toothbrush head 102 is demonstrated in the second receiving section 33, a manual toothbrush may also be suspended in a similar manner (see, e.g., FIG. 32).

With reference to FIGS. 18-32, another embodiment of the present invention is illustrated with more than one notch 5. Users may desire additional storage capacity such as when multiple tools are stored for one or more users. The larger, multi-notch embodiment 11 of the hygiene implement holder will accommodate those needs.

Figure 22:
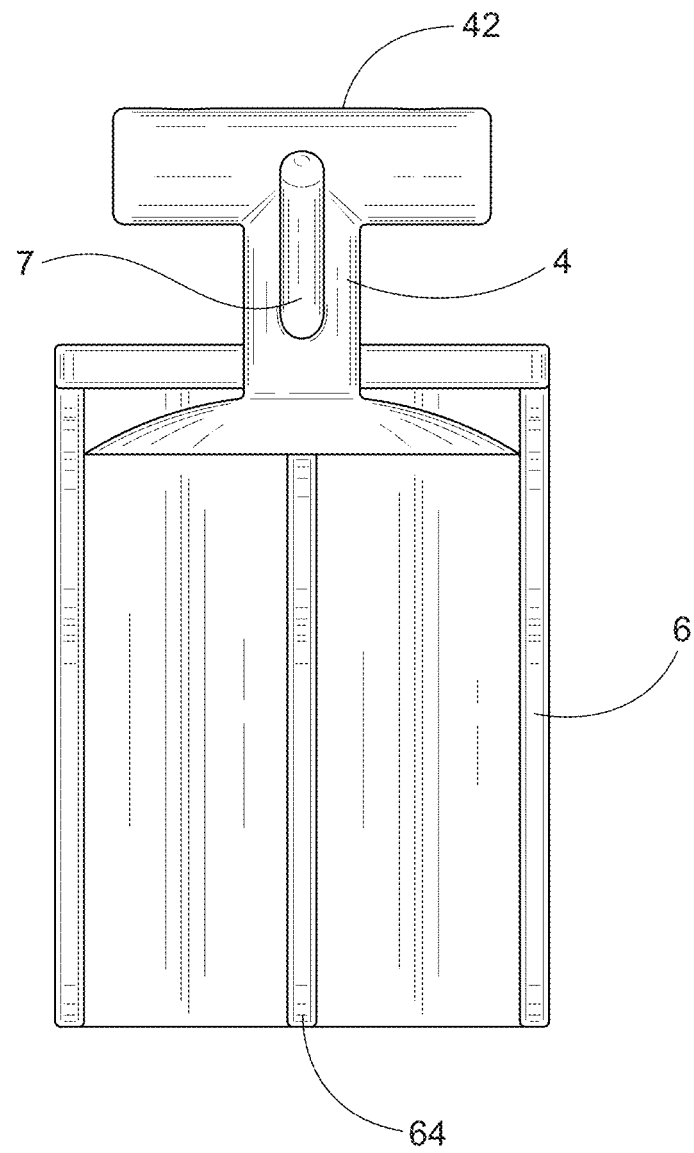
FIG. 22 is a rear view of the holder shown in FIG. 18.
Figure 23:
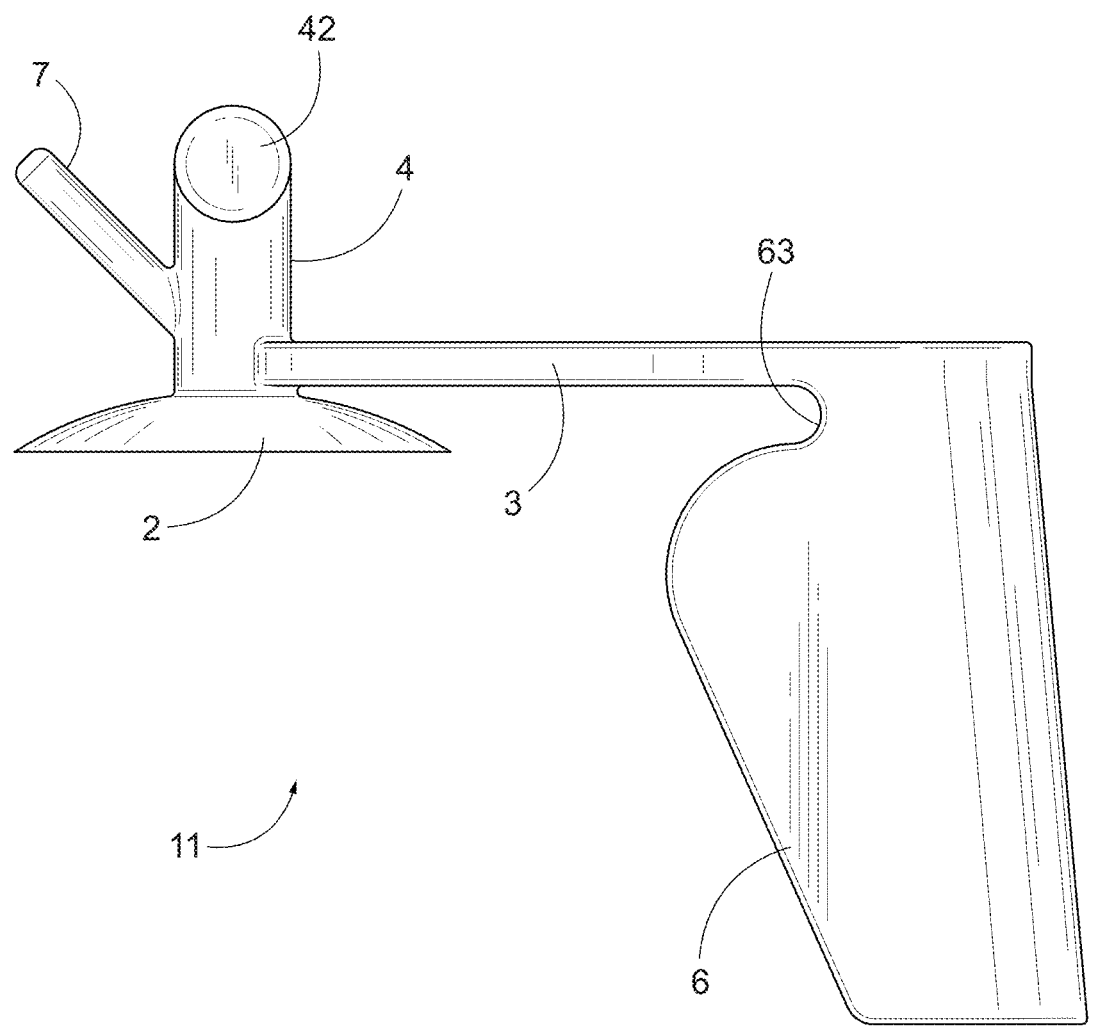
FIG. 23 is a first side view of the holder shown in FIG. 18.
Figure 24:
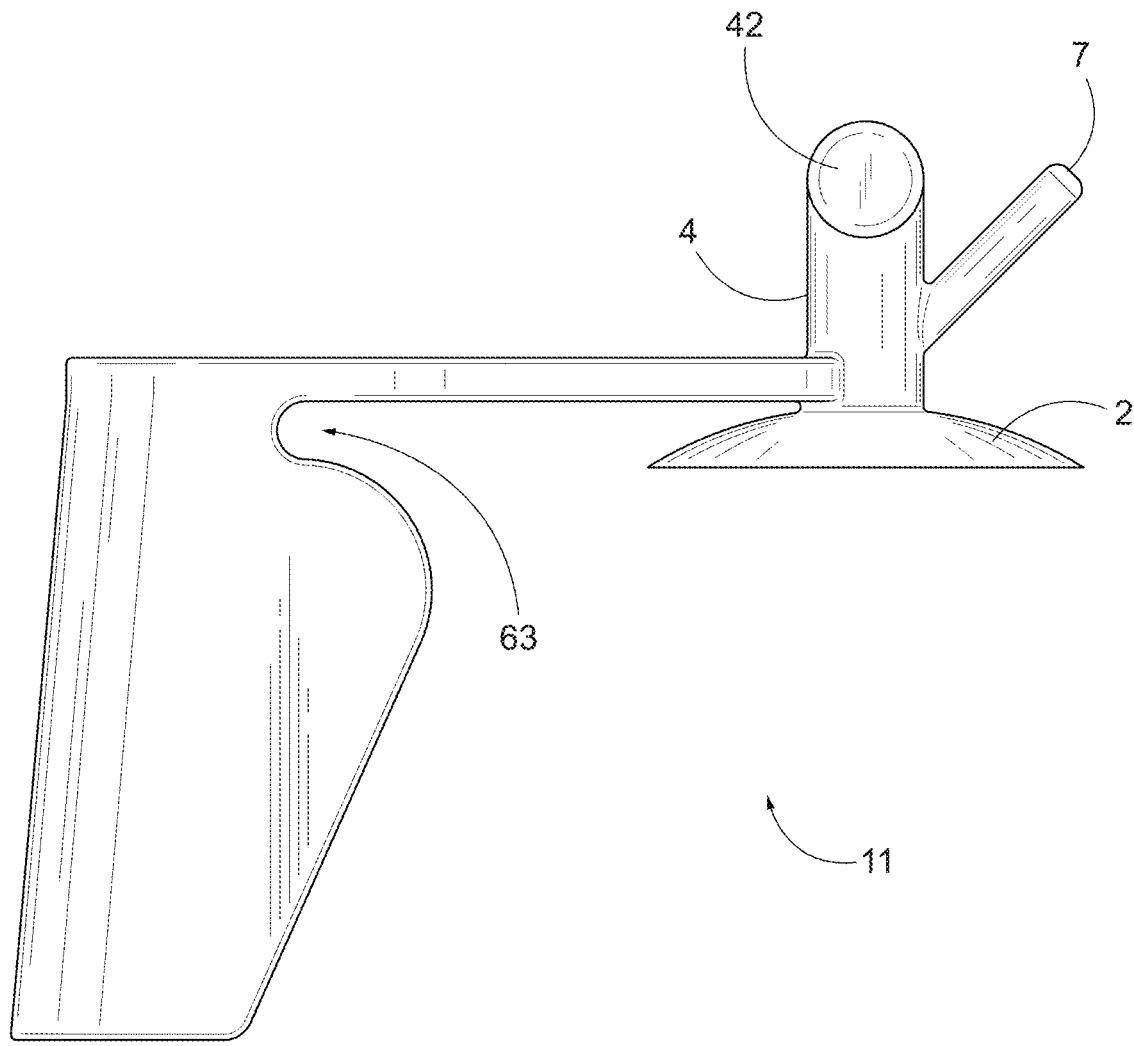
FIG. 24 is a second side view of the holder shown in FIG. 18.

In FIGS. 22-24, a base 2 transitions to a post 4 in a similar manner to that of other embodiments. Instead of a flat top post, however, this embodiment has a cross bar 42 atop the post 4. The cross bar 42 has more than one notch 5 for receiving the handle of a tool 10.

Figure 25:
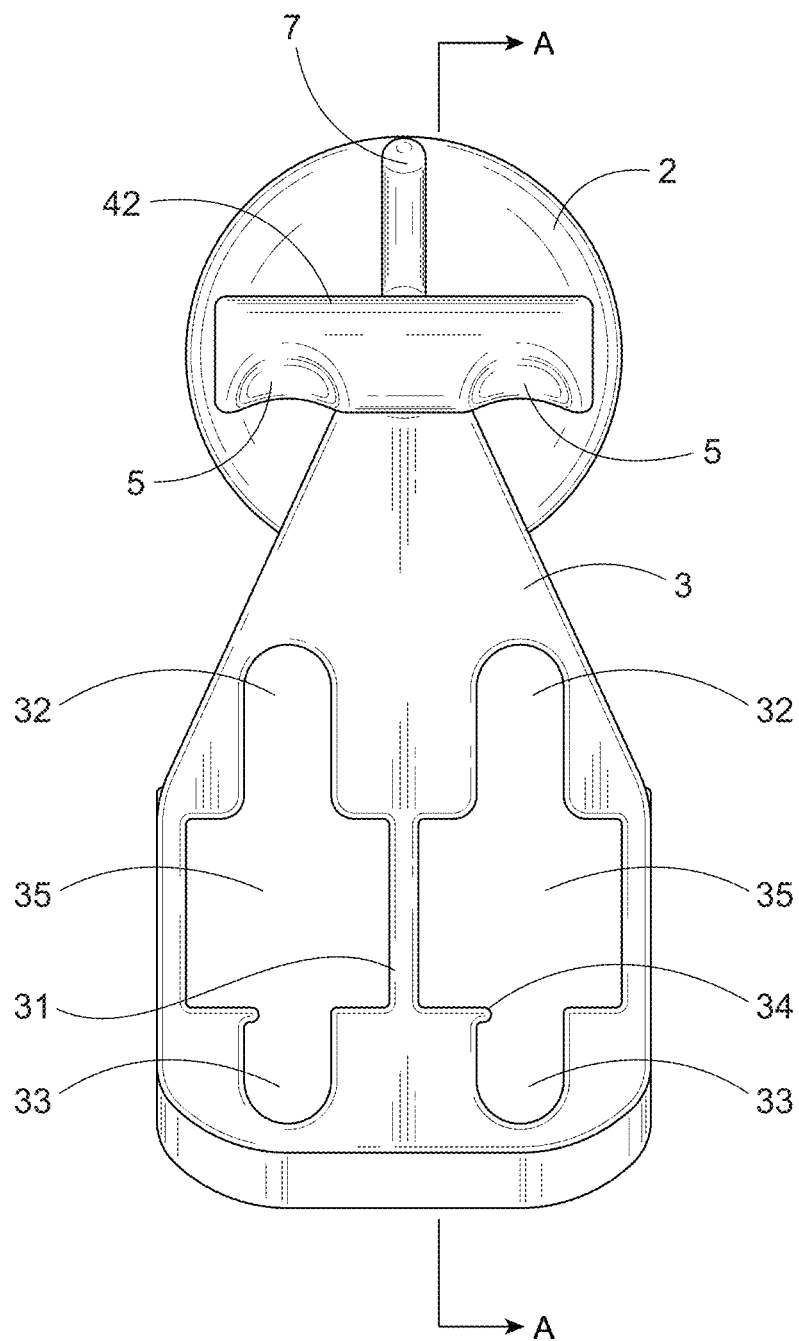
FIG. 25 is a top view of the holder shown in FIG. 18.
Figure 26:
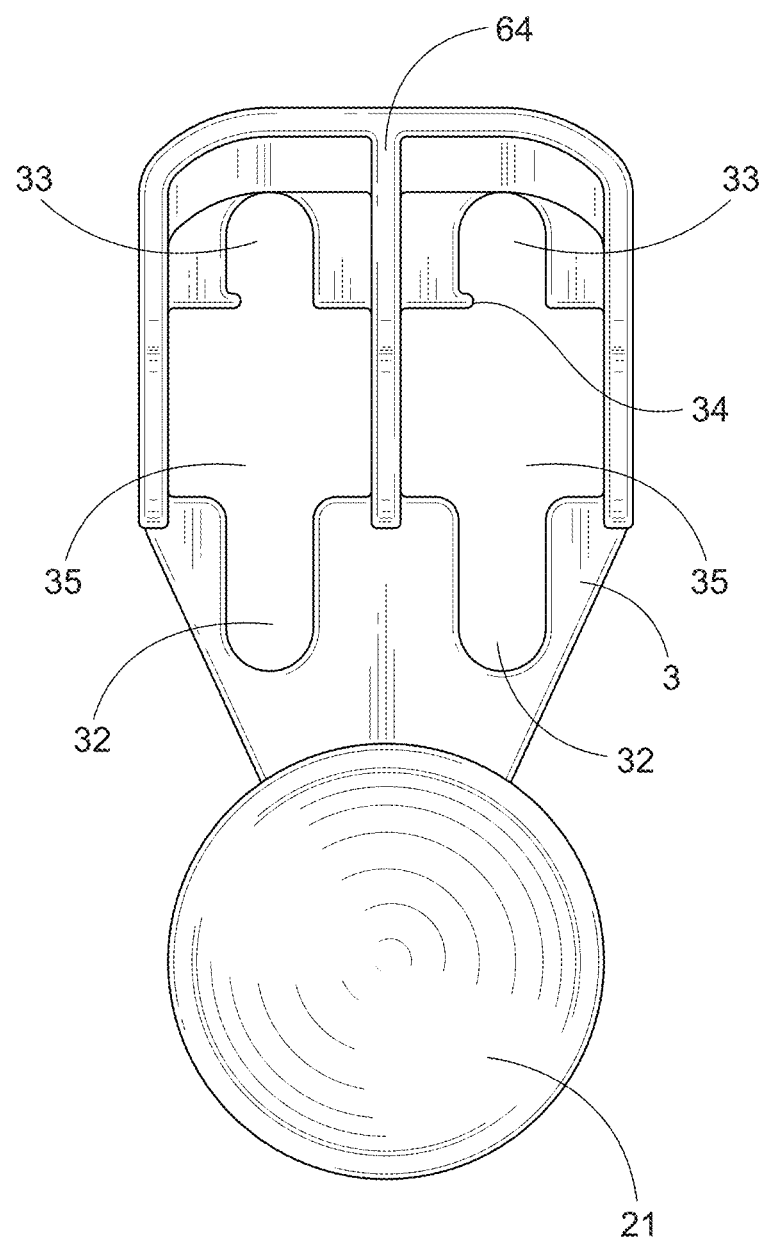
FIG. 26 is a bottom view of the holder shown in FIG. 18.

Next, with particular reference to FIGS. 25-26, to accommodate the additional notch 5, the arm 3 also has additional tool receiving sections. For each additional notch 5 added, the arm 3 modifications will need to complement the addition. In this embodiment, the expanded horizontal wall 31 of the arm 3 comprises two separate, tool receiving sections. As was the case for the other embodiments, the arm 3 comprises at least one receiving structure with unique characteristics. On the left, a first arm receiving structure includes a first tool receiving section 32, a second tool receiving section 33, and an enlarged opening 35 between the first receiving section and the second receiving section. The first tool receiving section 32 of the arm 3 serves as the second point of contact for a tool 10 having an elongated handle. The second tool receiving section 33 primarily serves as an independent tool engaging mechanism for tools having a short or virtually no handle. The second receiving section 33 once again includes a flange 34 to bias the tool hanging in the second slot. The enlarged opening 35 allows access to the first receiving section 32, the second receiving section 33, or both. On the right, a second arm receiving structure again includes a first tool receiving section 32, a second tool receiving section 33, and an enlarged opening 35 between the first receiving section 32 and the second receiving section 33. The first receiving section 32 serves as the second point of contact for a tool having an elongated handle. The second receiving section 33 serves primarily as an independent tool engaging component and the flange 34 encourages secure storage in the second receiving section 33. The flange 34 may occur on either side of the enlarged opening 35. The independent tool engagement options will provide advantages, particularly for storing tools having a short, or virtually no, handle. At a minimum, a second, complementary slot is provided to cooperate with each notch which acts as the second point of contact for receiving the handle of the stored tool. For the multi-notch embodiments, it is understood that as an alternative mode of construction, the two enlarged openings 35 illustrated in FIG. 25 could be joined by removing the intermediate arm wall 31.

Figure 29:
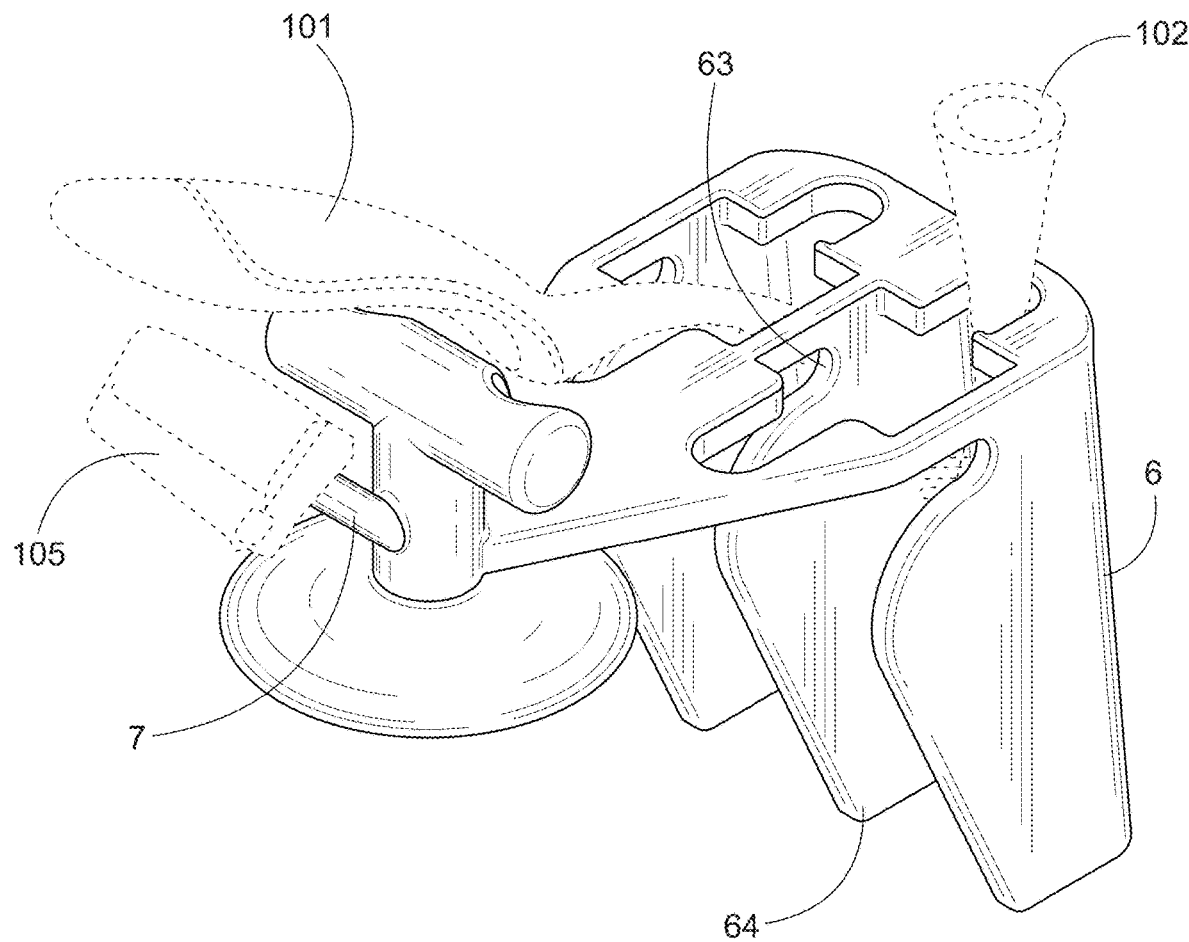
FIG. 29 is a top rear perspective view of the holder shown in FIG. 18 with a sample manual toothbrush and a sample electric toothbrush head inserted and a sample travel toothbrush cover suspended from the hanger.

In FIGS. 18-26, the suction cup 21 may again be employed to cooperate with the base 2 and the hanger 7 is also incorporated in a similar manner. With reference to FIGS. 23-25, attached to the side or rear of the post 4, at approximately a forty-five-degree angle, is the hanger 7 in the form of a round peg branching away from the post. The hanger 7 serves to store products, such as: dental floss or a cover for the bristles of the toothbrush. Referring to FIG. 29, the use of the hanger 7 is demonstrated in conjunction with an accessory, particularly a travel toothbrush cover 105. A hanger 7 with further suspension points may be adapted to accommodate additional users.

Figure 19:
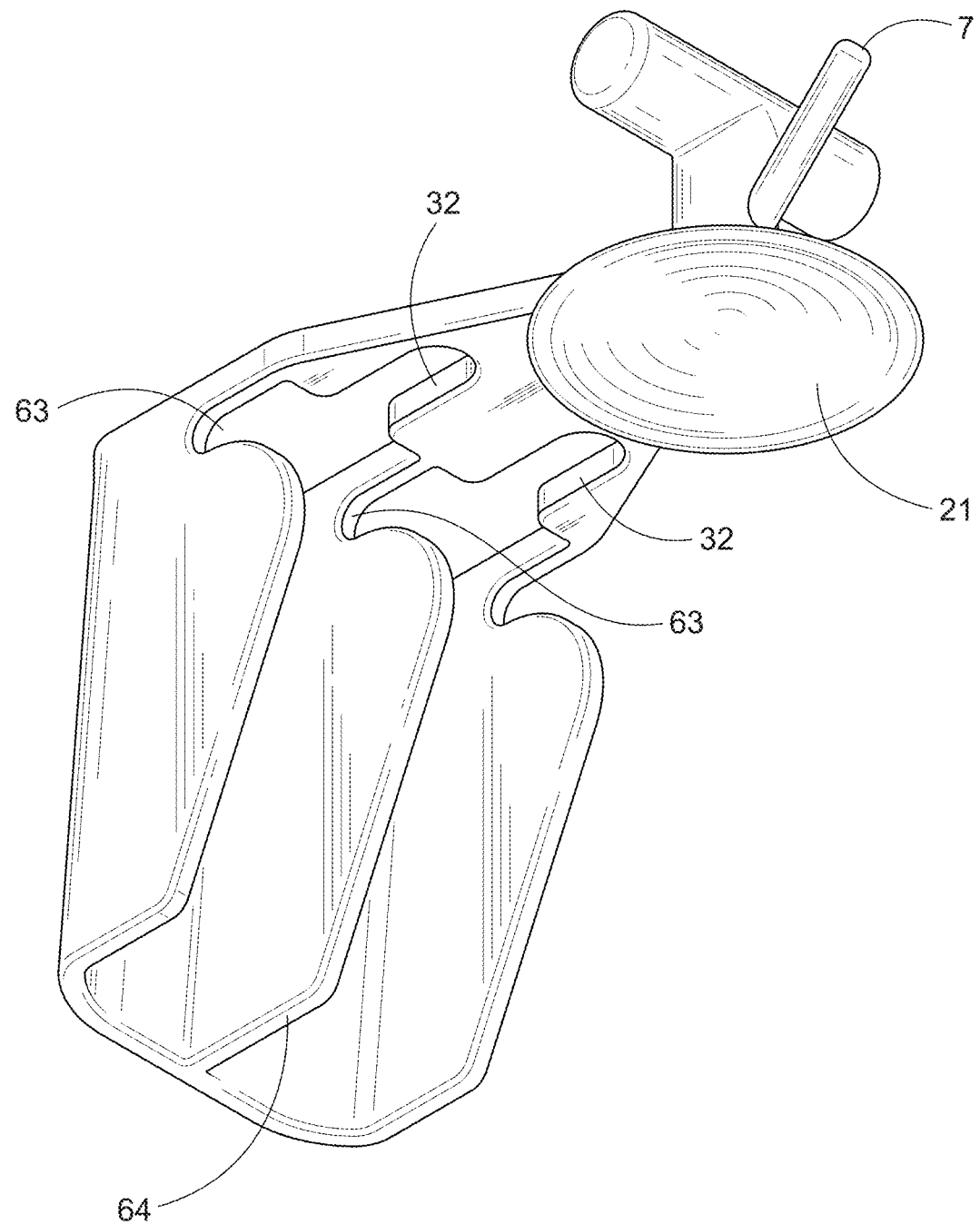
FIG. 19 is a bottom rear perspective view of the holder shown in FIG. 18.
Figure 20:
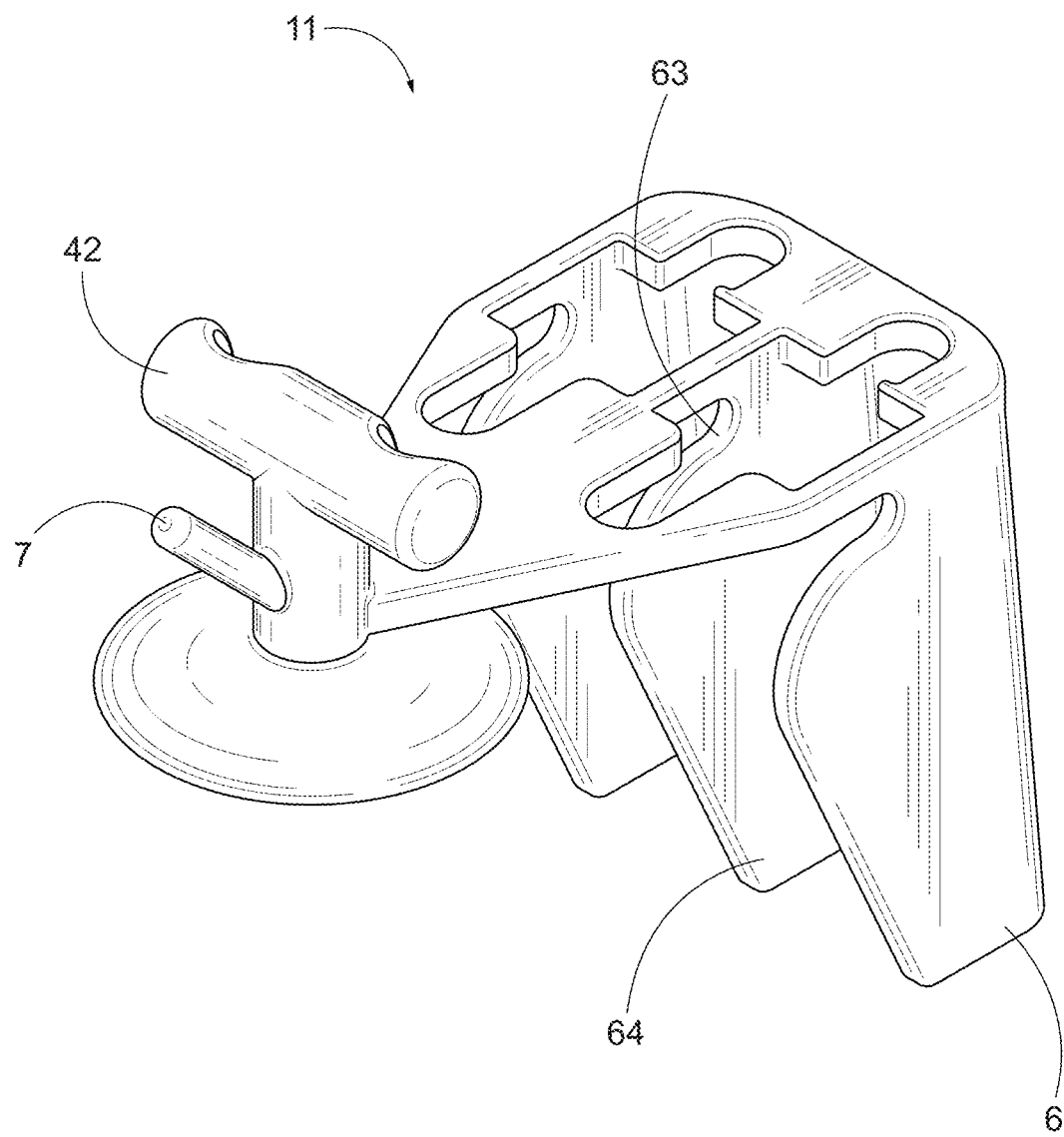
FIG. 20 is a top rear perspective view of the holder shown in FIG. 18.
Figure 21:
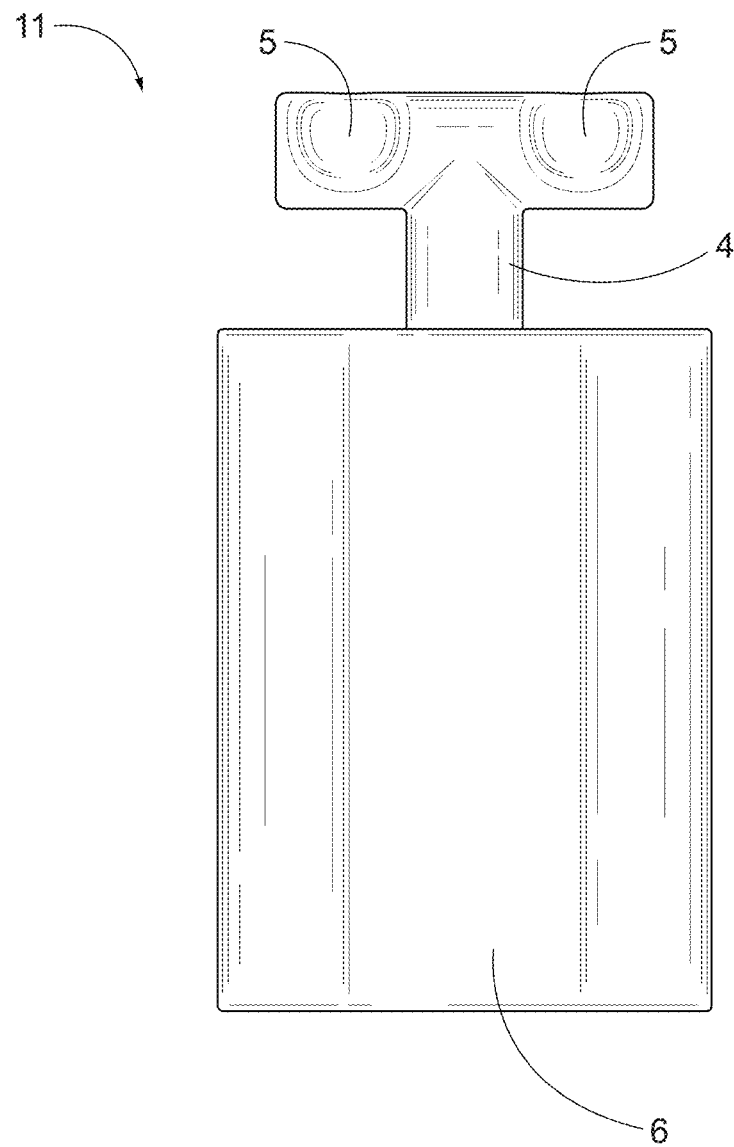
FIG. 21 is a front view of the holder shown in FIG. 18.

FIG. 26 further illustrates the modifications made to the shield 6 for this multi-notch version of the present invention. The multi-notch version contemplated in this embodiment provides for a divider 64 or physical barrier between the shielding sections below the arm wall 31. The shield 6 here has more than one chamber of protection. The front curve and shape of the shield wall is altered to accommodate the multiple chambers. FIGS. 19, 20, and 29 reveal the shape of the divider wall 64 which includes its own receiving area identified in the drawings as a cut-out 63. Alternative multi-tool embodiments may benefit from an alternative construction that uses a coextensive shielded chamber without a divider wall. FIGS. 21 and 26 illustrate the increased width of the shield relative to the place of the multi-notch 5 configuration in this embodiment.

Figure 27:
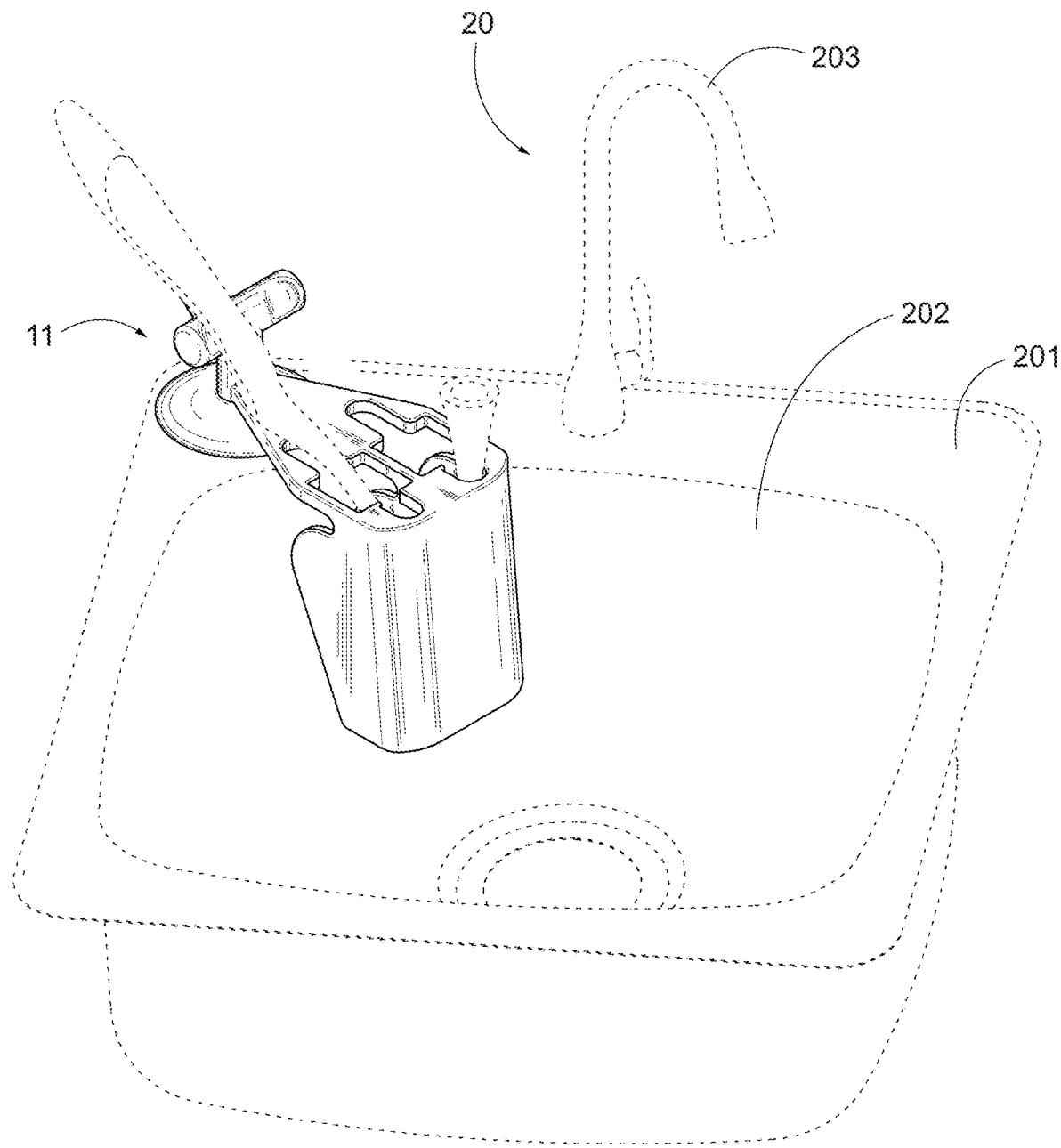
FIG. 27 is a top front perspective view of the holder shown in FIG. 18 with a sample manual toothbrush and a sample electric toothbrush head inserted and the holder is shown on a sink ledge.
Figure 28:
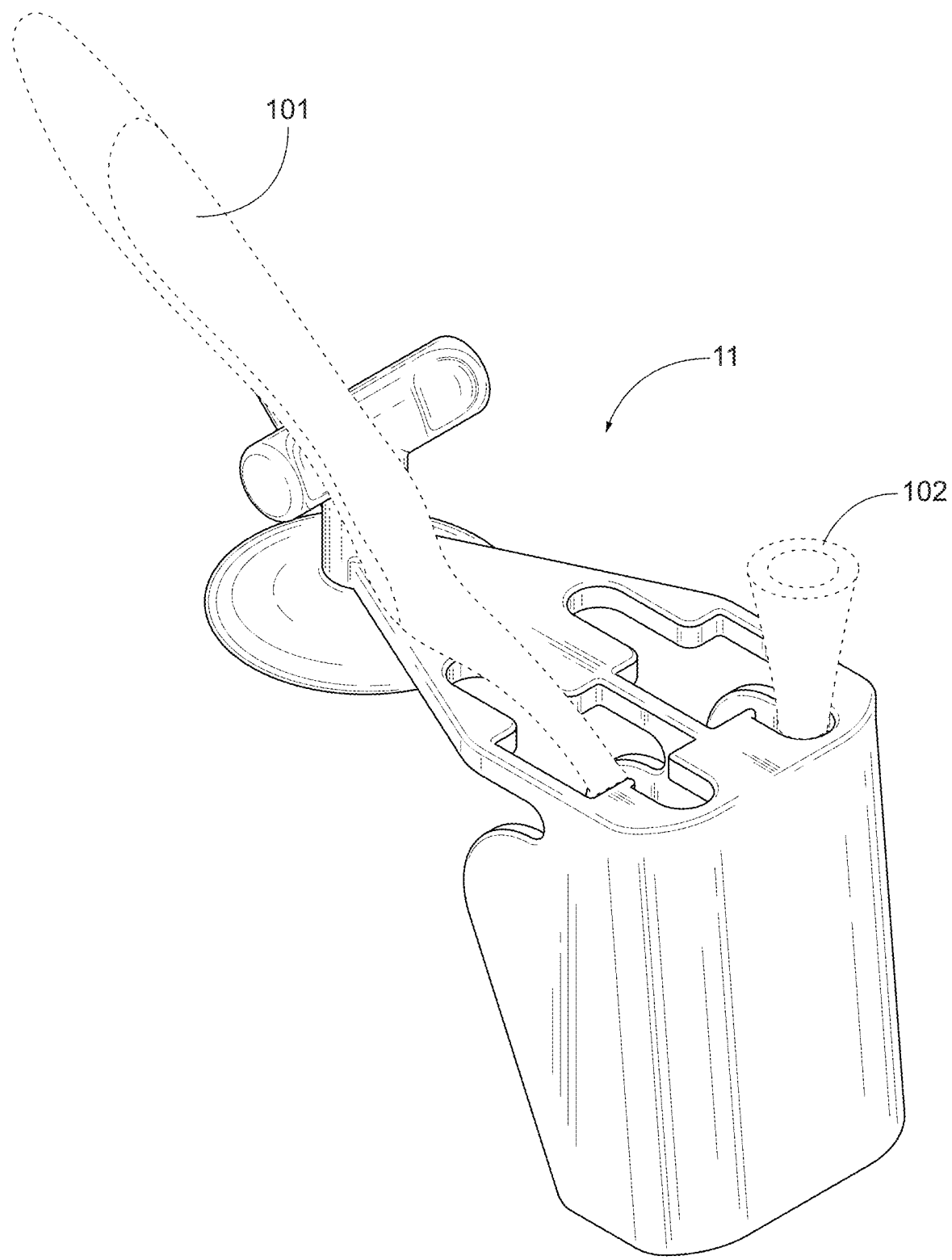
FIG. 28 is a top front perspective view of the holder shown in FIG. 18 with a sample manual toothbrush and a sample electric toothbrush head inserted.

FIG. 27 is a schematic demonstration of the multi-notch version of the holder joined on the ledge of a sink 20. The holder 11 is located on a sink ledge 201 and projects over the sink basin 202 away from the faucet 203 to hold one or more tools in a draining position over the edge of the basin 202. FIG. 28 shows the multi-notch version of the holder in isolation from the sink and securely storing a manual toothbrush 101 and electric toothbrush head 102.

In FIG. 29, the holder is shown in use with a manual toothbrush 101 and an electric toothbrush head 102 as well as a toothbrush cover 105 hanging from the hanger 7. This example illustrates the shape of a divider wall 64 which includes its own cut-out 63. Optionally, the divider wall may be a different shape or excluded completely.

Figure 30:
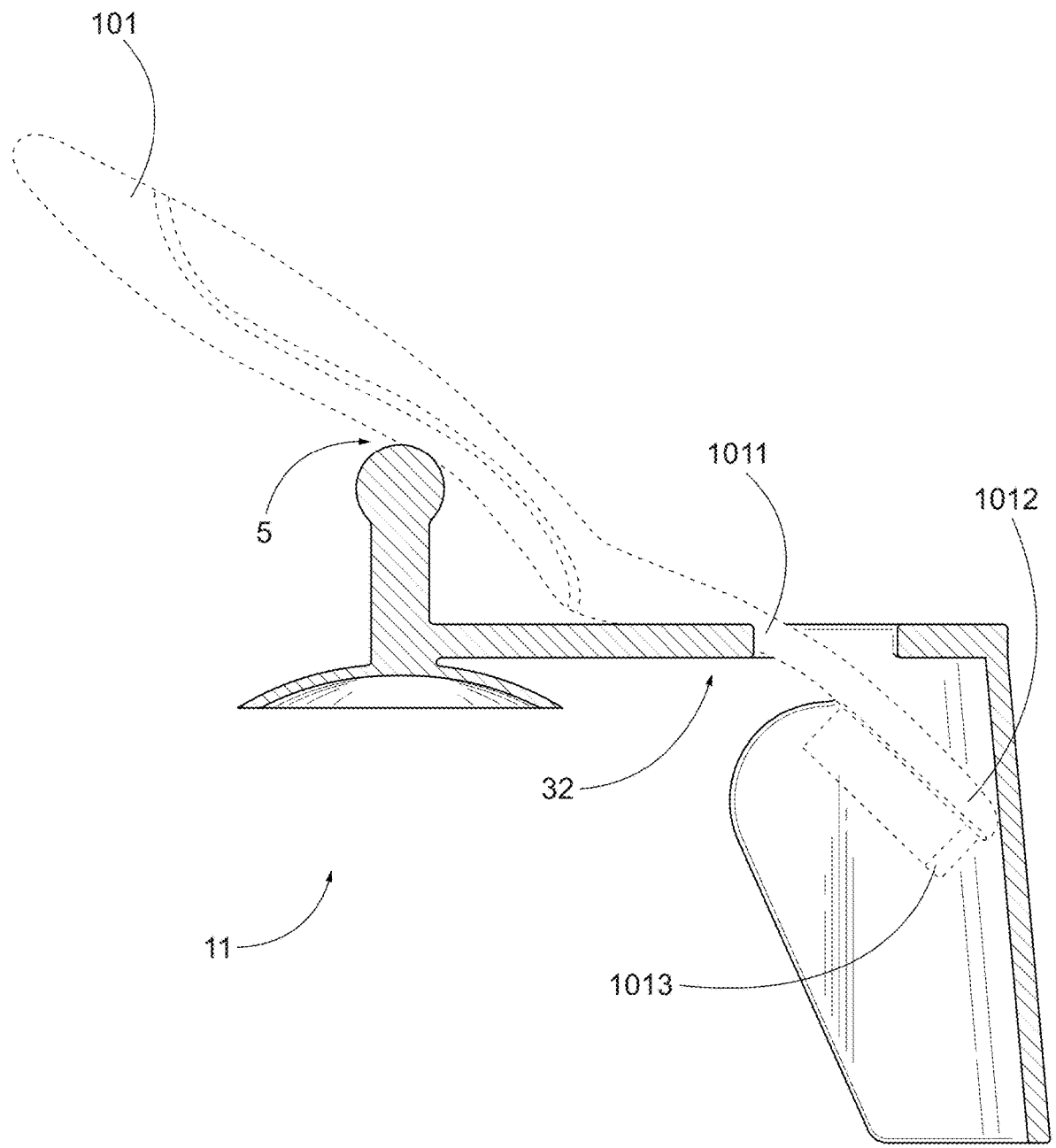
FIG. 30 is a section side view taken along line A-A from FIG. 25 and showing a manual toothbrush inserted.

FIG. 30 is a sectional view taken along line A-A in FIG. 25. A toothbrush is shown in schematic in order to demonstrate how the brush 101 will be suspended in the multi-notch embodiment. As shown in FIG. 30, for traditional toothbrushes, the holder has at least two points of contact to hold the toothbrush in position—one contact point on a notch 5 and one contact point on the arm 3 at the first receiving slot 32. The first point of contact is the notch 5 in the cross bar 42 on top of the post 4 at first height. The notch 5 in the post 4 supports the handle of the brush 101 at approximately the handle's mid-point. A second point of contact occurs at a second height within the "C", "U", or similar clamp-shaped, first slot in the arm and that slot 32 supports the handle 1011, just above the head 1012 and bristles 1013. The interaction of the first point of contact and the second point of contact holds the toothbrush in position. Depending on the particular toothbrush and particular shield angle, a third point of contact may be created against the shield interior wall for the head 1012 of the toothbrush 101. As illustrated in FIG. 30, a tool such as a toothbrush rests in the holder in an inverted position at approximately a 35-degree angle, with the bristles 1013 hanging below the handle 1011 of the toothbrush 101. The resting hygiene implement is desirably held between the notch and the second point of contact such that the hygiene implement rests at an angle in the range of between approximately 35 degrees and approximately 75 degrees. After cleaning, the entire toothbrush 101 drips directly into the sink to air dry without any bacteria exposure from the countertop or sink.

An alternative grooming tool such as a tongue scraper (not shown) would be stored in the holder between uses in a similar manner as shown in FIG. 30. In one example for storing a tongue scraper, the handle would interact with the first point of contact 5 and the second point of contact 32, allowing the working end of the tongue scraper to rest below the arm 3 and be surrounded by the shield 6.

Figure 31:
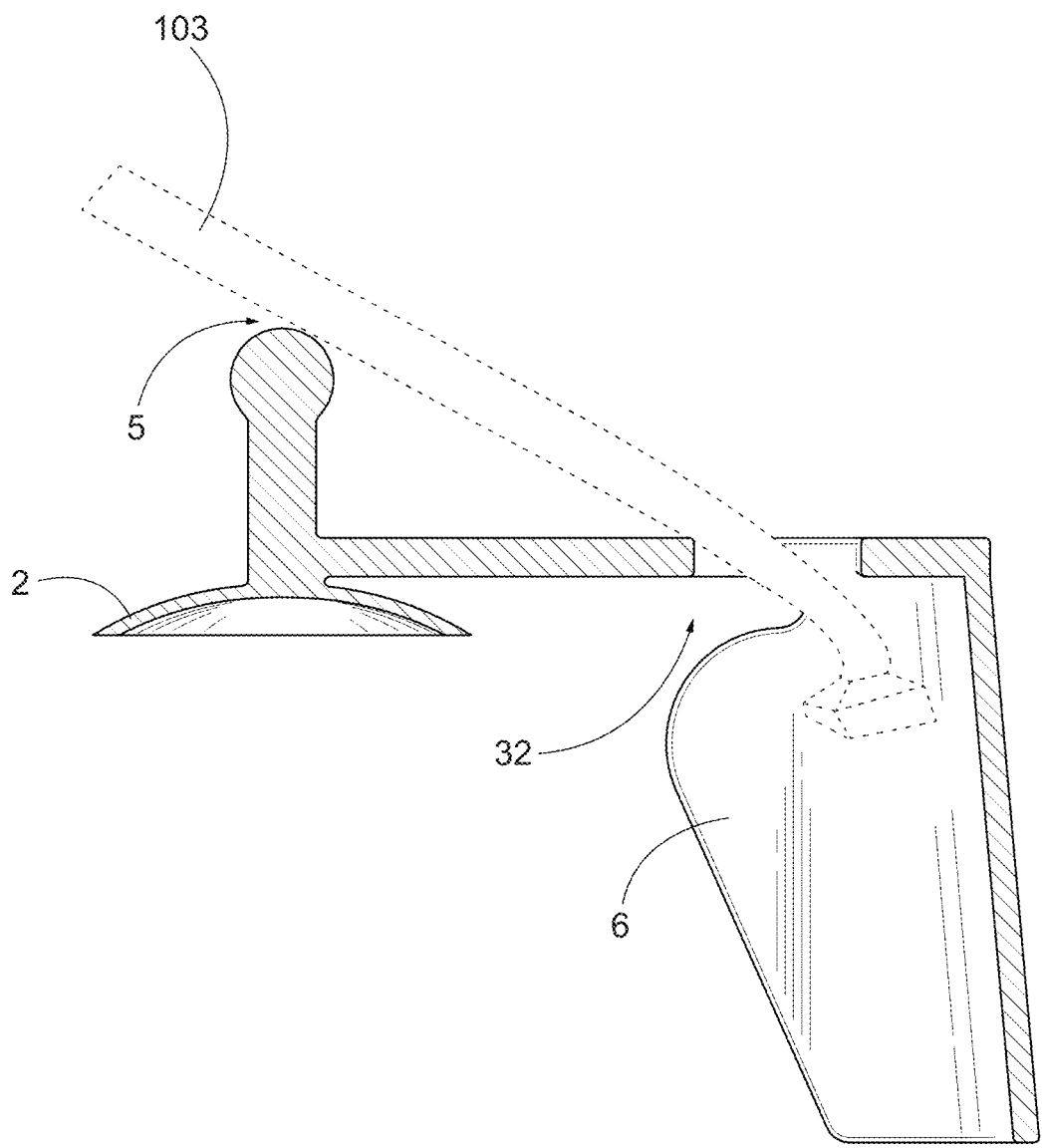
FIG. 31 is a sectional side view taken along line A-A from FIG. 25 and showing a razor inserted.

FIG. 31 demonstrates a manner of using the holder for storage of a razor. In FIG. 31, the enlarged opening 35 of the arm 3 (shown in FIG. 29) permits sufficient clearance for a razor to pass through and still be held and stored in a manner similar to a toothbrush—one contact point on a notch 5 and one contact point on the arm 3 at the first receiving slot 32. When the multi-notch embodiment is employed, the razor 103 may be stored next to the toothbrush 101 or other hygiene implement.

Figure 32:
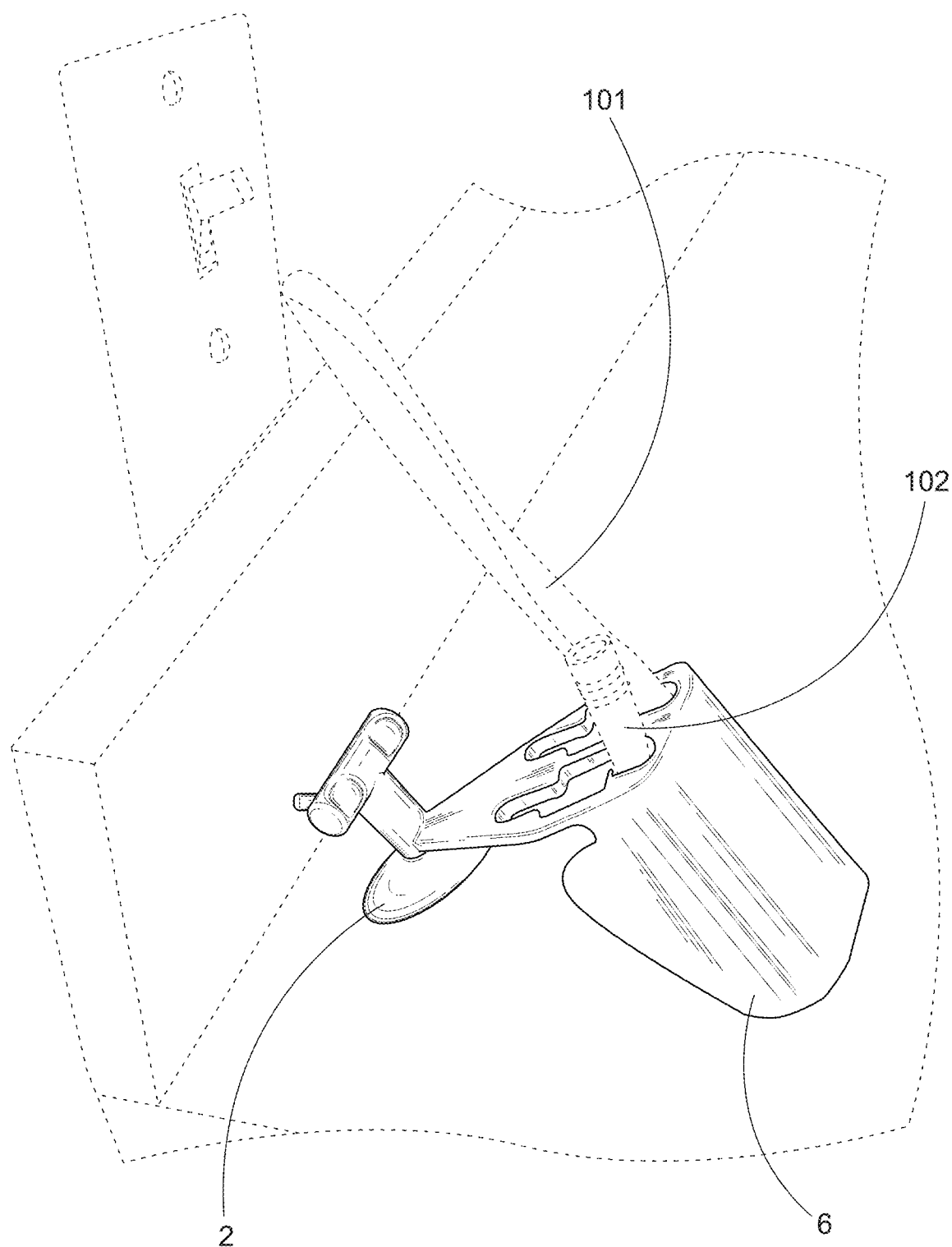
FIG. 32 is a side perspective view of the multi-notch hygiene implement holder having a manual toothbrush and electric toothbrush head inserted but being stored as the holder is used on a flat surface such as a countertop or vanity.

The unique features of the present invention permit yet another manner of use as shown in FIG. 32. In FIG. 32, the holder is demonstrated resting on a countertop where a portion of the base 2 and a portion of the shield 6 are in contact with the counter, but neither of the tools stored within the device touch the countertop. When used in this manner, the manual toothbrush 101 may optionally be stored in the second receiving section 33 of one receiving structure. The holder may also be used on a countertop in the manner shown in FIG. 32 while having the manual toothbrush resting within the two points of contact described and shown in the other illustrations such as FIG. 29, having the handle touching the notch and the working end installed in the first slot 32 rather than the second slot 33 shown here. The electric toothbrush head 102 is illustrated as being stored in the second receiving section 33 on the right side of the arm. Alternative base designs would enhance countertop uses.

Figure 33:
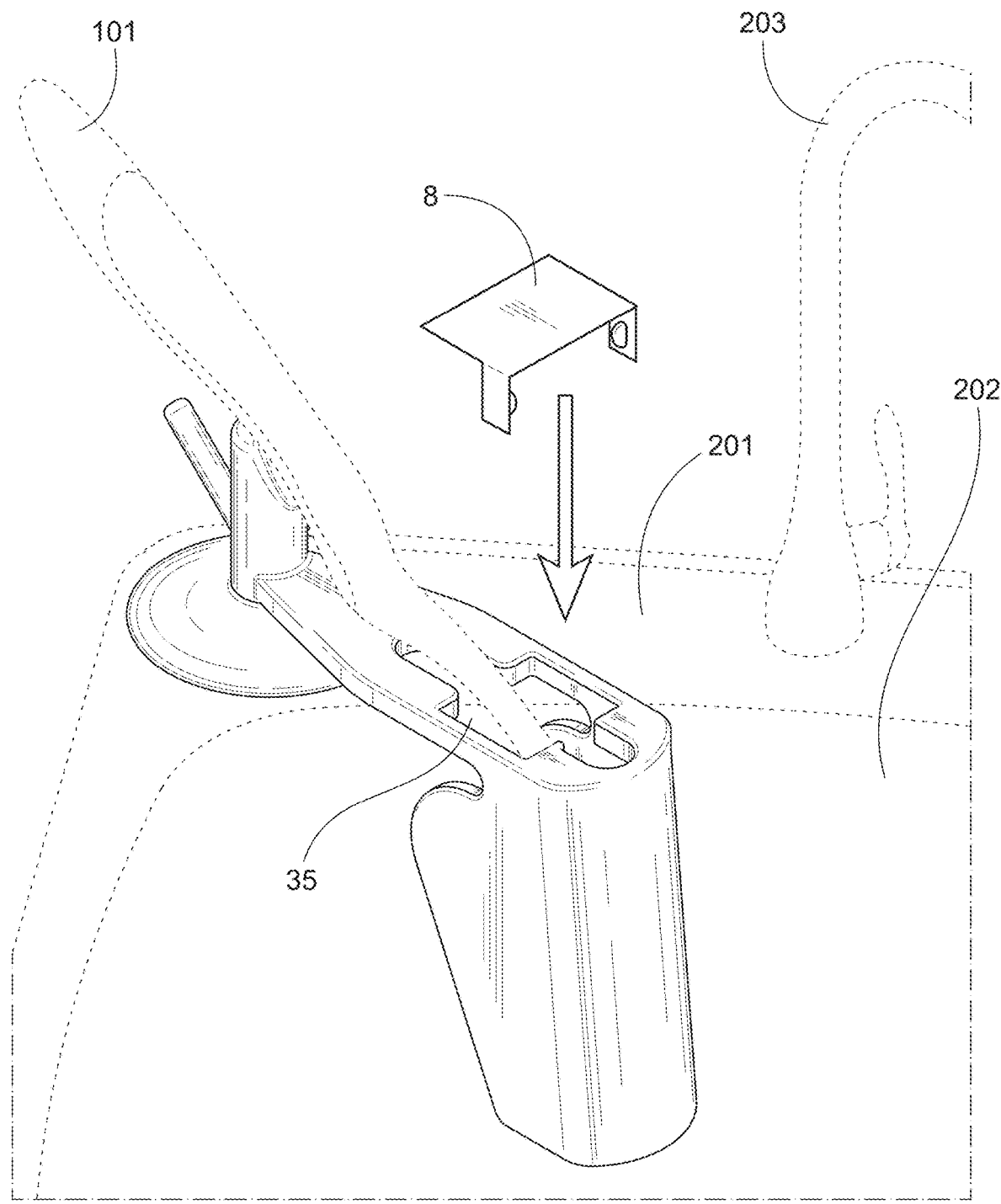
FIG. 33 is a front perspective view of another embodiment of the holder having a manual toothbrush inserted, shown on a sink ledge, and illustrating the installation of a protective cover.
Figure 34:
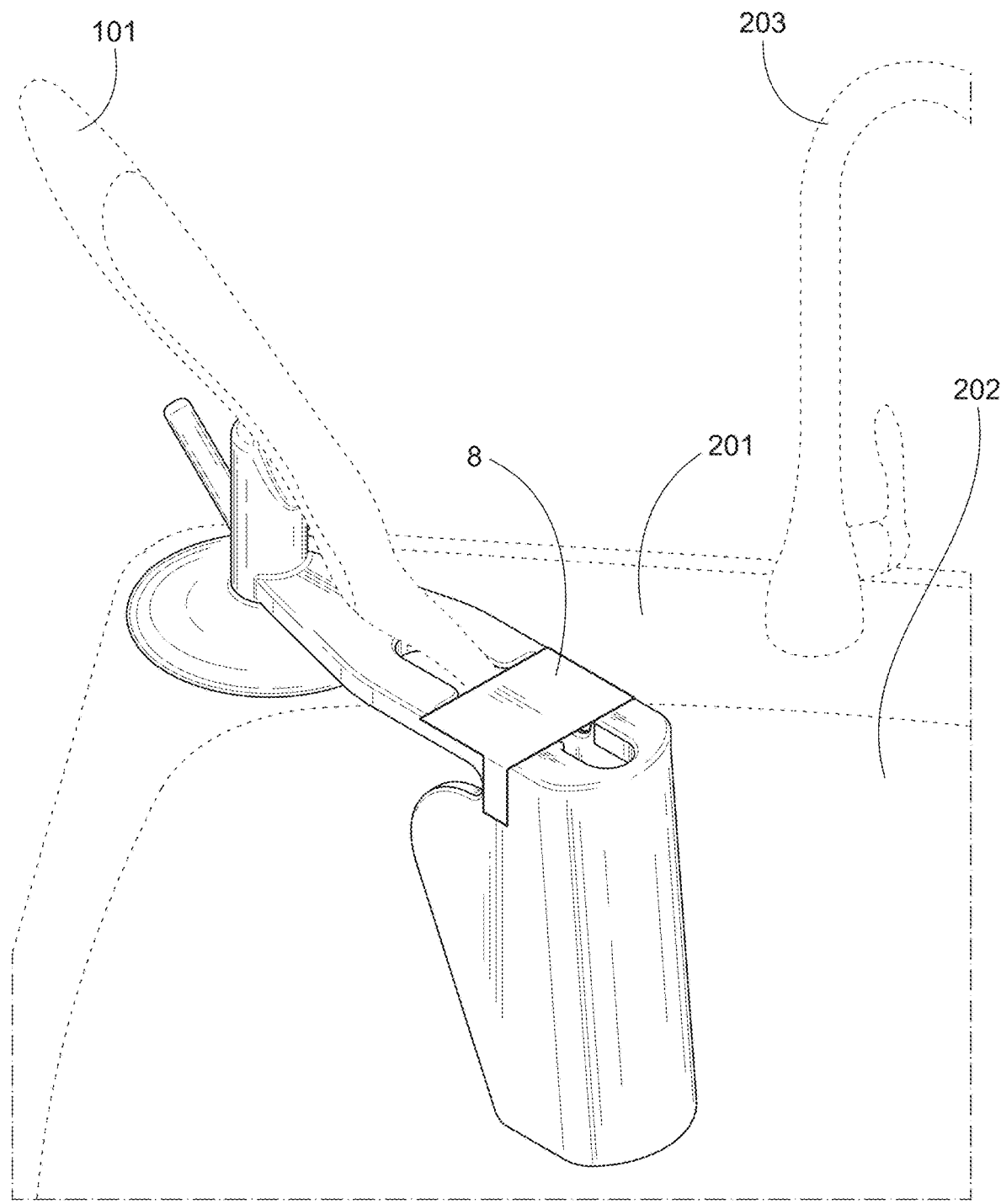
FIG. 34 is a front perspective view of another embodiment of the holder having a manual toothbrush inserted, shown on a sink ledge, and illustrating an alternative for a protective cover.
Figure 35:
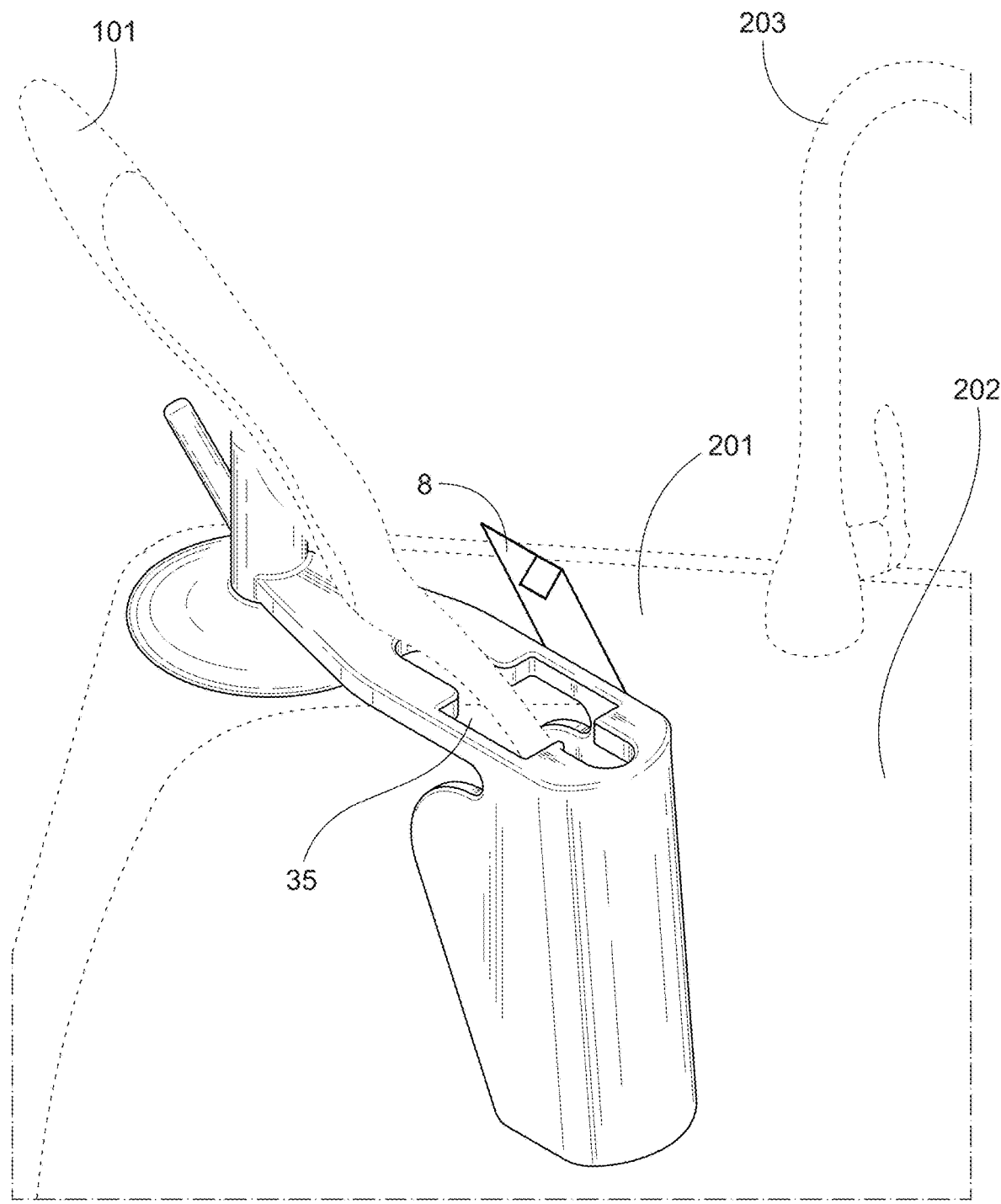
FIG. 35 is a front perspective view of another embodiment of the holder having a manual toothbrush inserted, shown on a sink ledge, and showing another mode of operation for a protective cover.

As schematically demonstrated in FIGS. 33-35, the holder 1 may be accompanied by a top cover 8. In one embodiment the top cover 8 may pop into place overtop of the enlarged opening 35 of the arm 3 by an interference fit. In some embodiments, the cover is provided with a dual hinge to allow for the cover to open like a door for easy removal of the toothbrush 101 from the enlarged opening 35 as suggested in FIGS. 33-34. In other embodiments, the cover may be malleable and for access to the toothbrush it can be opened from one side of the shield, or the other side of the shield as schematically demonstrated in FIG. 35. Additional covers such as a gasket that the toothbrush is pushed through could be implemented. The top cover 8 is intended to provide additional protection from contaminants that may enter through the enlarged opening 35 but air flow will still be permitted from below the shield and through the shield cut-outs 63.

Figure 36:
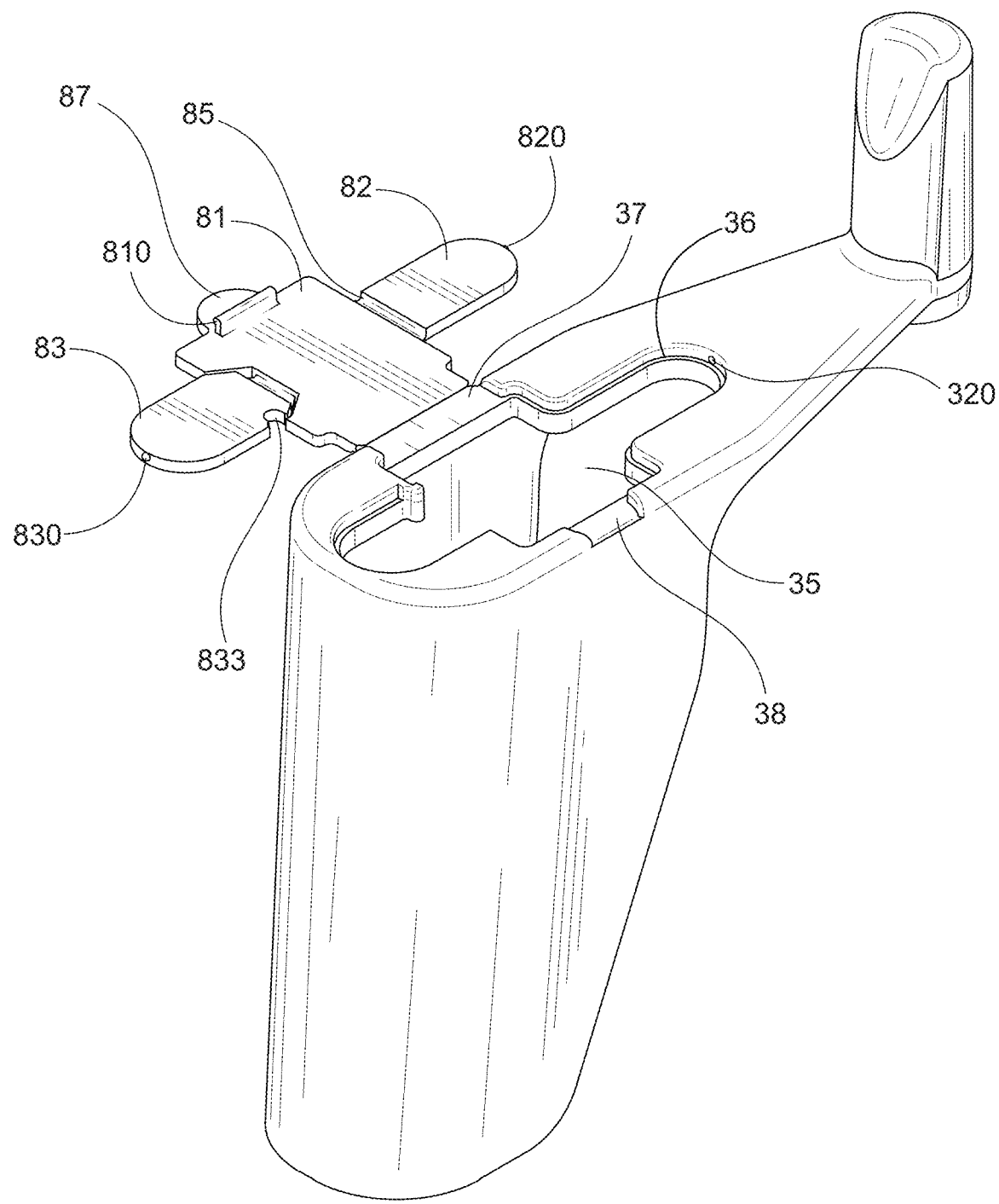
FIG. 36 is a top front perspective view of an exemplary embodiment of the hygiene implement holder with a hinged cover shown in the open position.

Turning to FIGS. 36-53, an exemplary embodiment of the holder 1 particularly having a preferred implementation of a hinged cover 8 is illustrated in more detail. FIGS. 36-43 show the cover in an open position and affixed to the arm 3 by a hinge 84 which rotates 180 degrees to a closed position shown in FIG. 44. With reference to FIG. 36, the enlarged opening 35 is encircled by a ledge 36. On one side of the enlarged opening 35, a cutout section 37 accommodates a hinge 84 which ideally is a living hinge and on the other side a recess 38 is configured to receive the handle 87 of the cover as is visible in FIG. 44.

Figure 42:
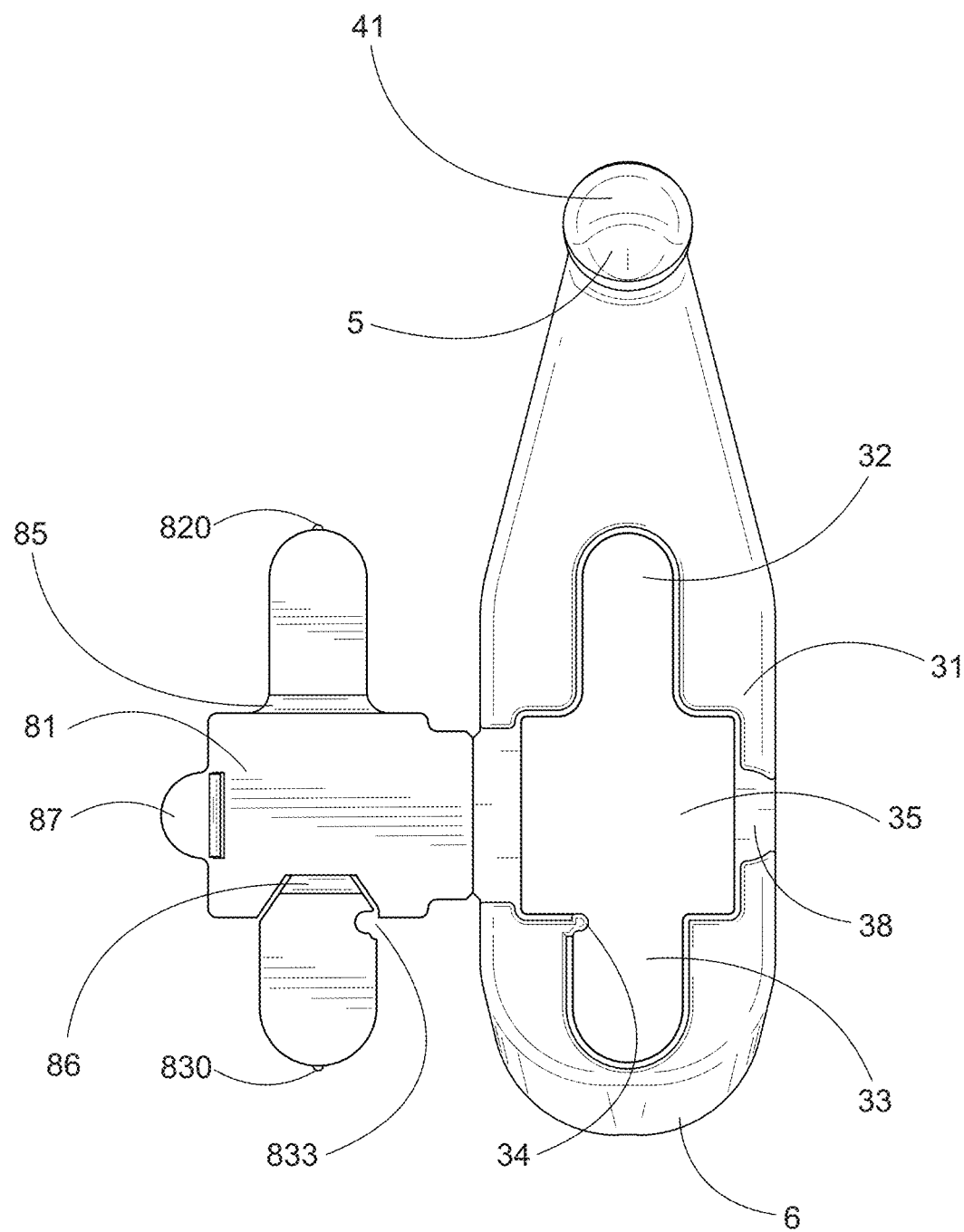
FIG. 42 is a top view of the holder shown in FIG. 36.
Figure 43:
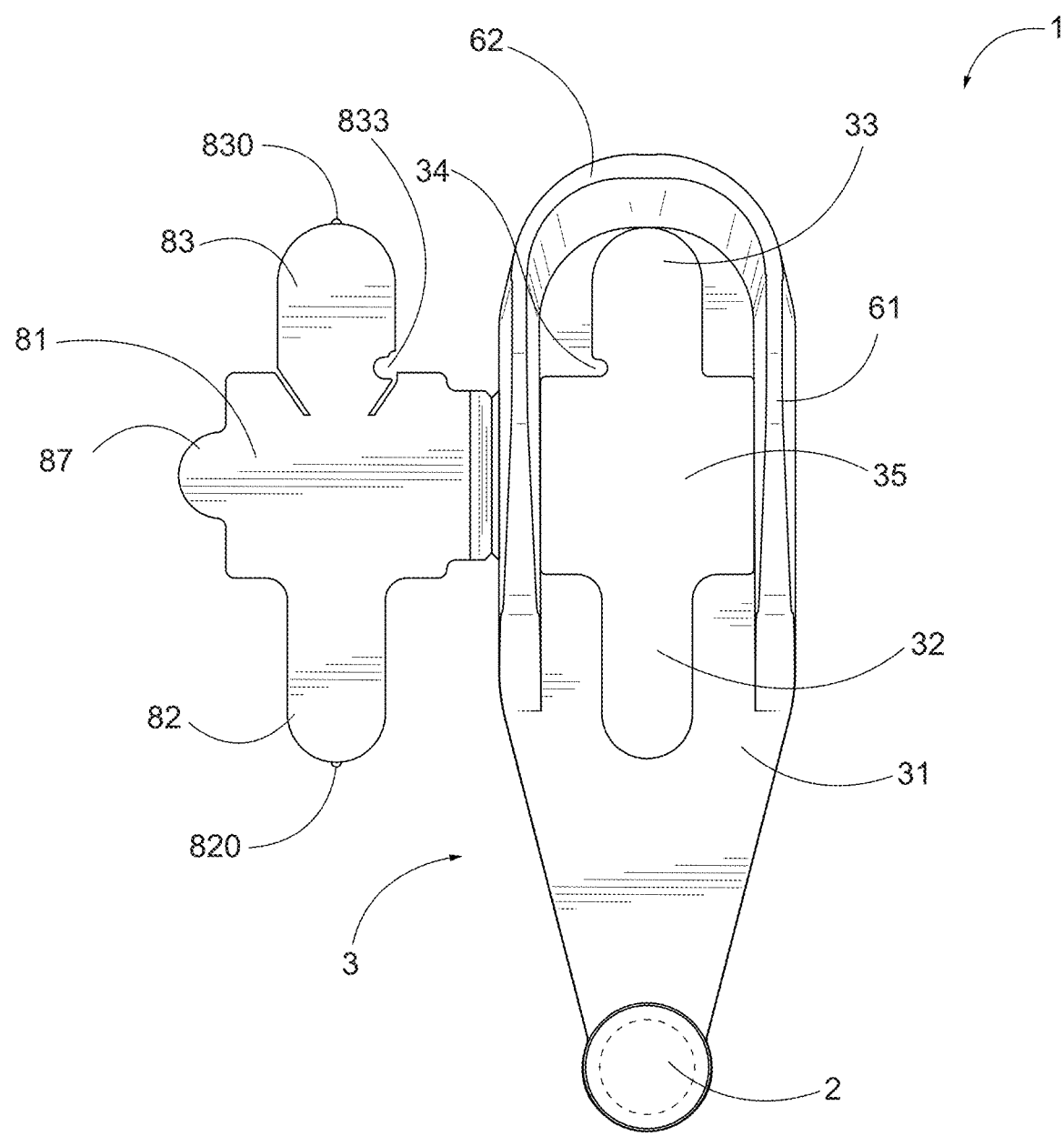
FIG. 43 is a bottom view of the holder shown in FIG. 36.
Figure 44:
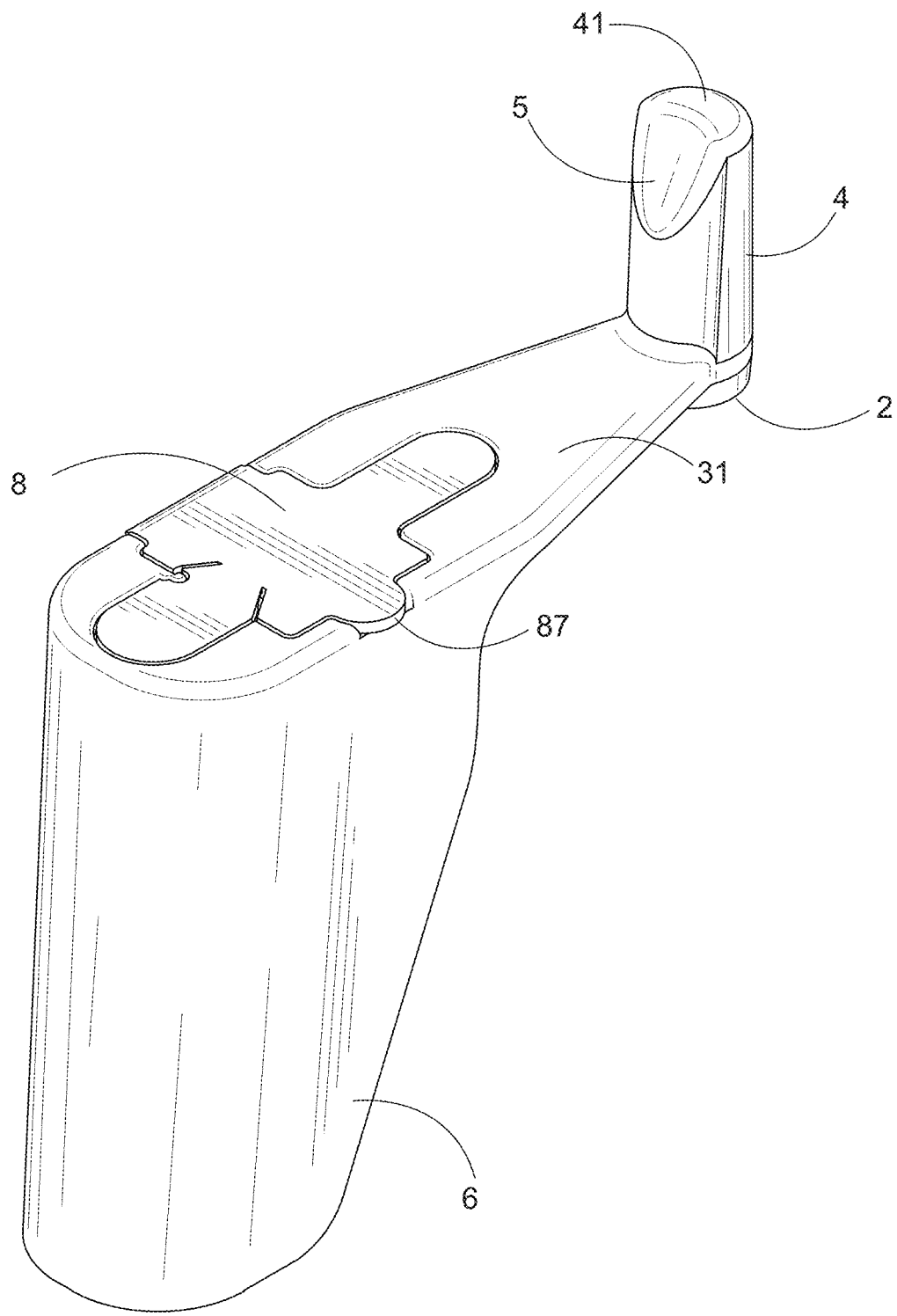
FIG. 44 is a top front perspective view of the holder shown in FIG. 36 with the hinged cover shown in the closed position.

With continuing reference to FIG. 36, a cutout section 37 occurs for the cover 8 to rest on the arm 3 and recess 38 to receive the handle 87 of the cover. The depth of the ledge 36, and cutout section 37 and recess 38 match the thickness of the cover 8 so that, when closed, the cover is fully seated within the arm 3, as shown in FIG. 44. The cover 8 consists of three parts, a main body 81 to cover the enlarged opening 35, a first flap 82 to cover the first receiving slot 32, and a second flap 83 to cover the second receiving slot 33. FIGS. 36-43 show further details of the cover 8 which are particularly visible when the cover 8 is open. The main body 81 includes a latch 810. The first flap 82 includes a retainer ball clip 820. The second flap 83 includes a retainer ball clip 830. The first retainer ball clip 820 is particularly visible in FIG. 39. The second retainer ball clip 830 is particularly visible in FIG. 38. The first flap 82 moves relative to the main body 81 due to the first living hinge 85. The second flap 83 moves relative to the main body 81 due to the second living hinge 86. The second flap 83 also includes a cavity 833 to accommodate the flange 34 (see FIG. 42). FIGS. 42 and 43 illustrate creased slits 831 and 832 on the second flap 83 to permit wider movement of the flap relative to the main body 81.

Figure 37:
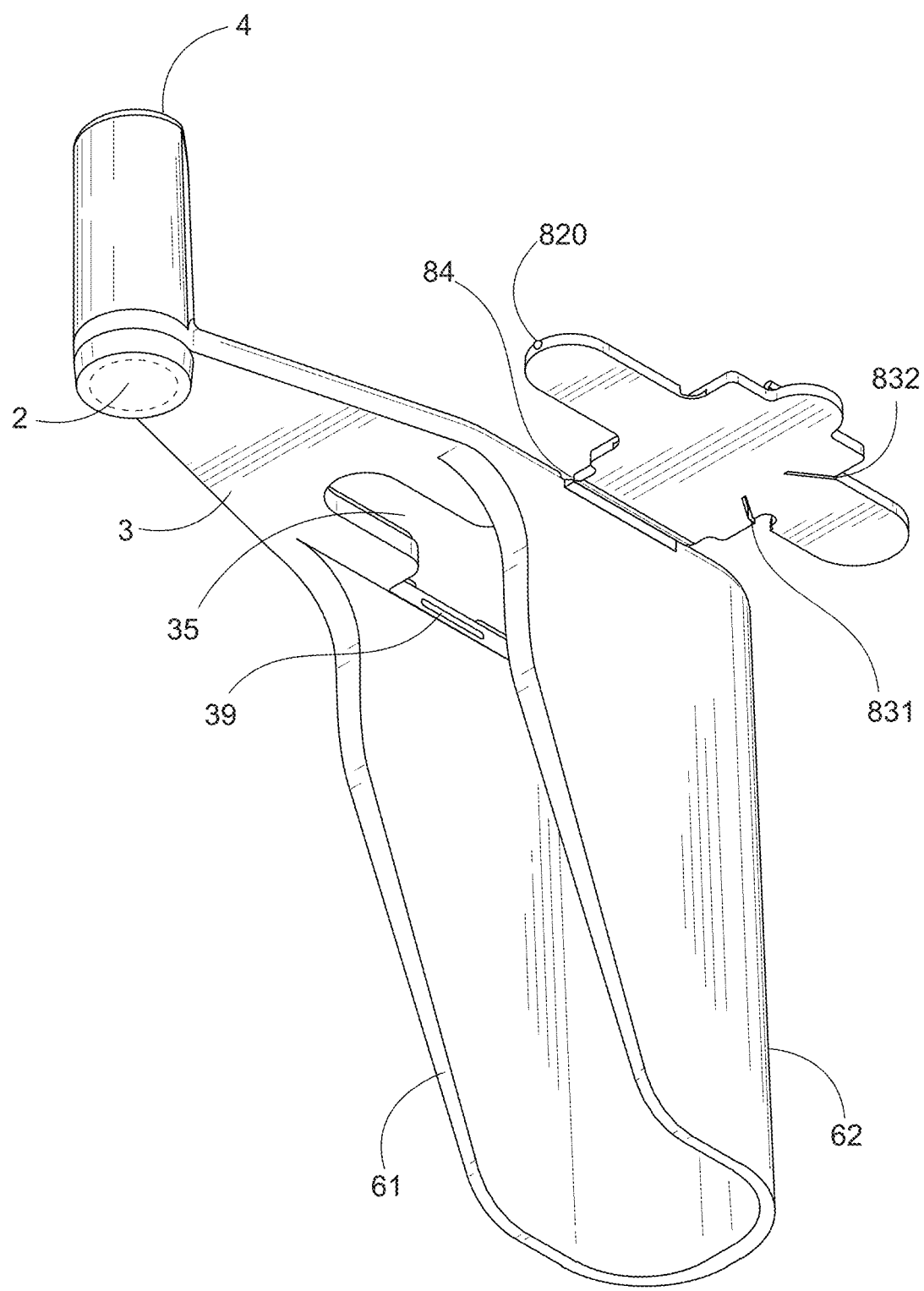
FIG. 37 is a bottom rear perspective view of the exemplary embodiment shown in FIG. 36.
Figure 38:
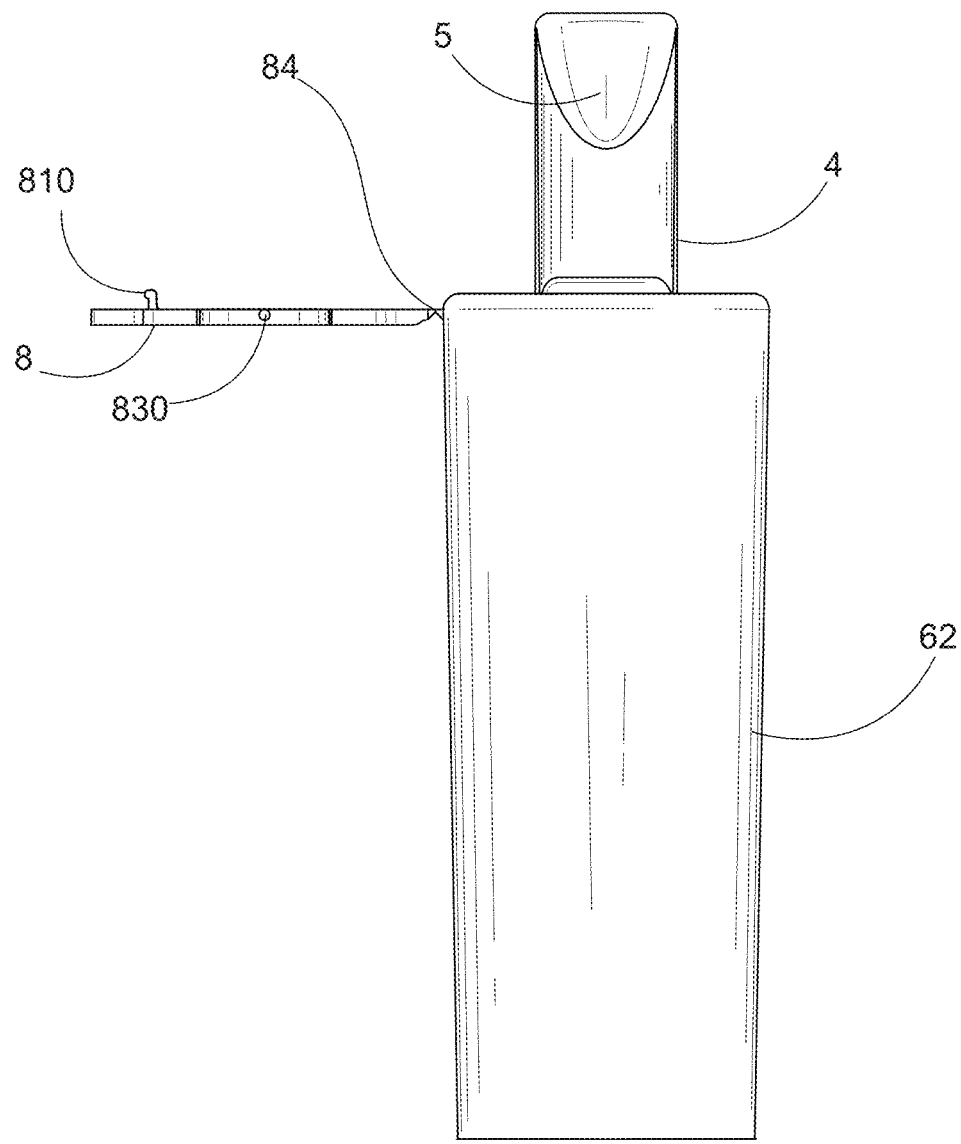
FIG. 38 is a front view of the holder shown in FIG. 36.
Figure 39:
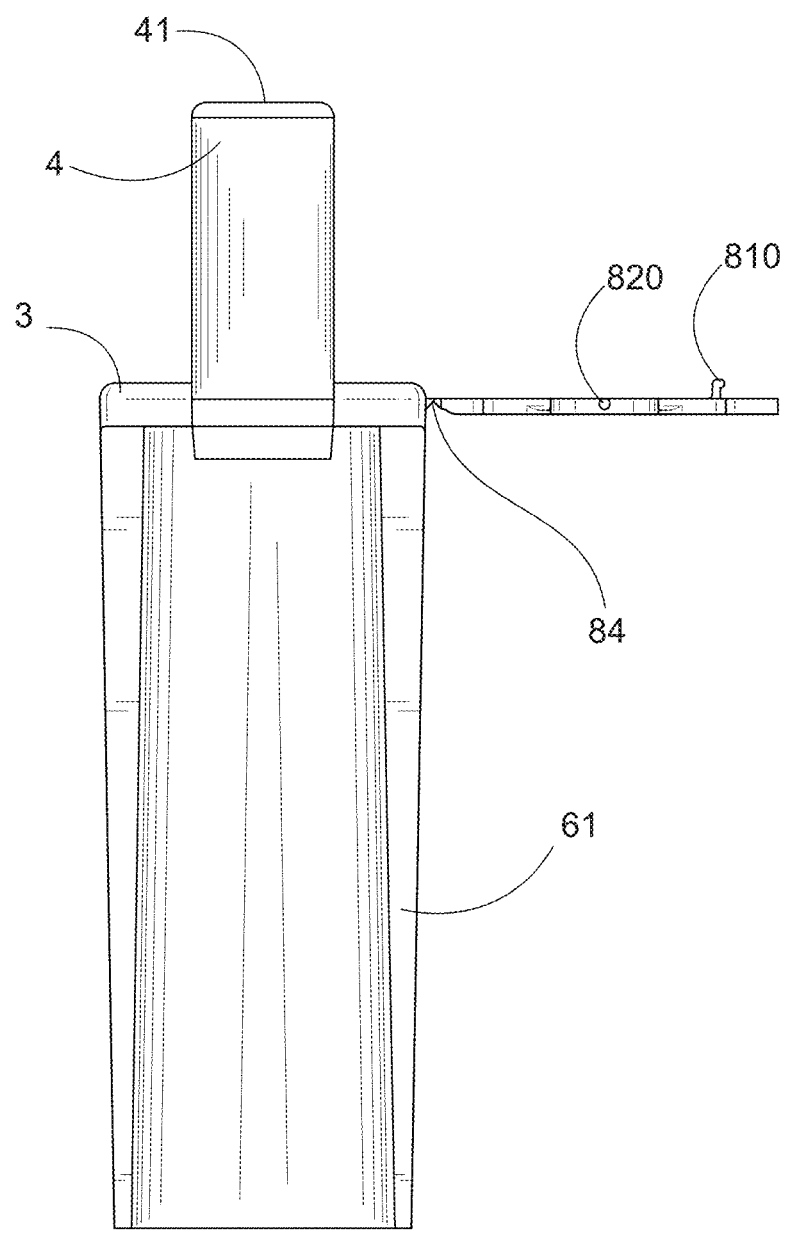
FIG. 39 is a rear view of the holder shown in FIG. 36.
Figure 40:
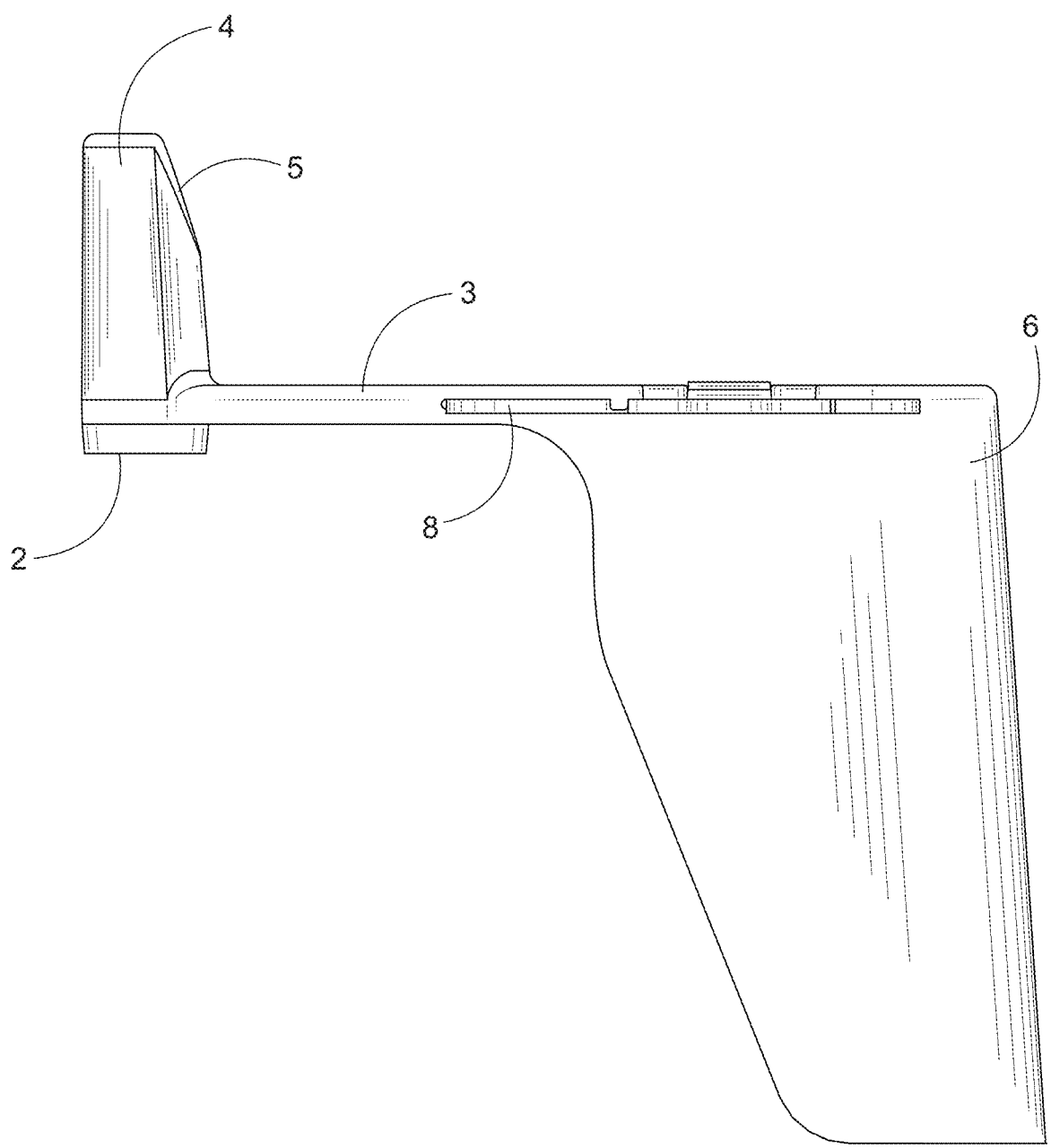
FIG. 40 is a first side view of the holder shown in FIG. 36.
Figure 41:
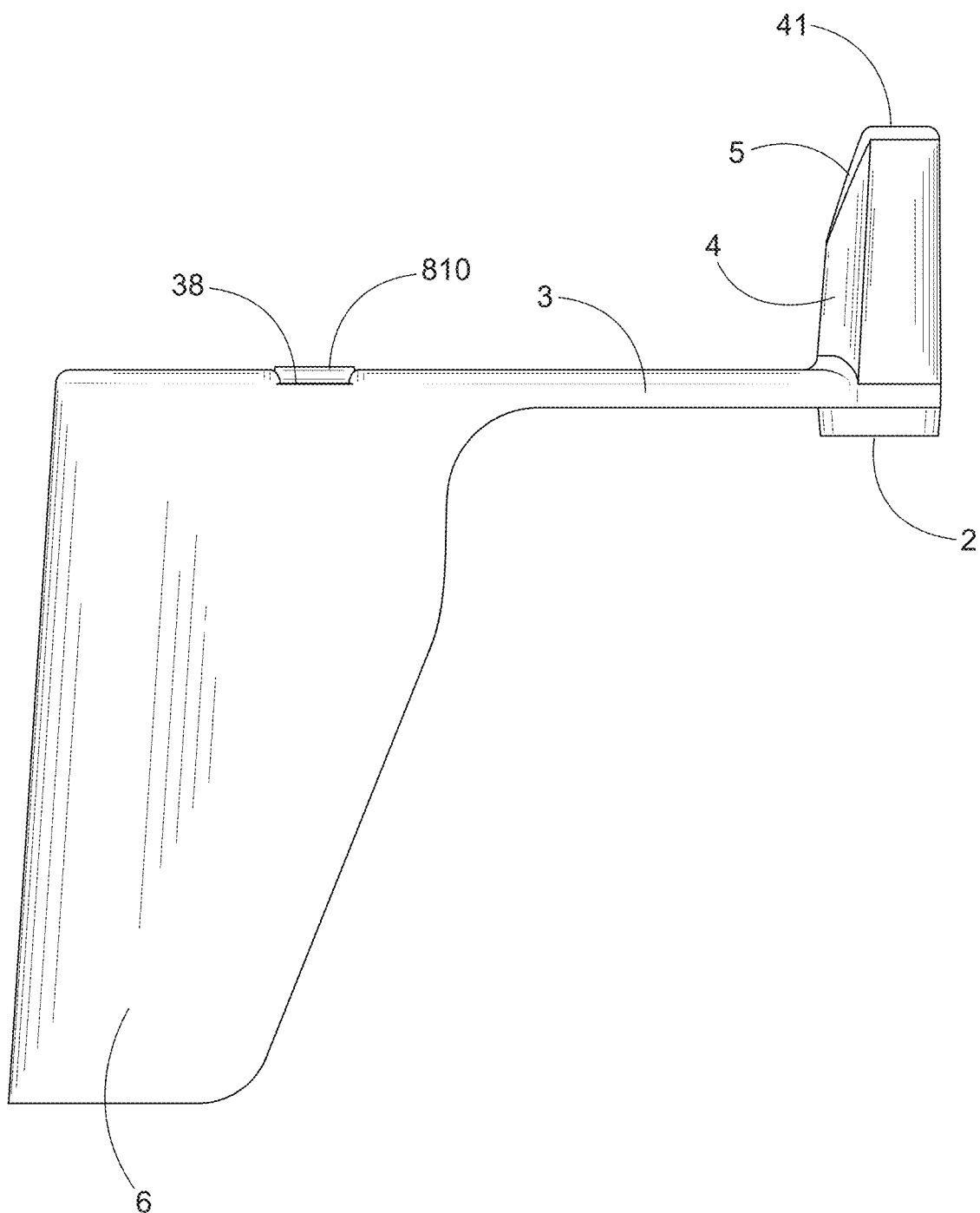
FIG. 41 is a second side view of the holder shown in FIG. 36.

From the bottom views of FIGS. 37 and 43, the base 2 is appreciated as being able to accommodate an attachment mechanism. The simplest attachment for the base 2 is the insertion of a removable suction cup 21 (see, e.g., FIG. 5). This form of attachment is preferred for easy installation, removal, and cleaning purposes. The suction cup 21 is schematically represented within FIGS. 47-48 on the sink ledge 201. FIGS. 37 and 43 also show the aspects of the shield 6 including the thin wall 61 tapered for the slope of the sink basin and the curve 62 which have been further described above. FIGS. 37 and 39 further demonstrate the thickness of the shield wall 61 being thickest at the top where the shield 6 connects with the arm 3 and getting thinner as it descends according to one embodiment of the present invention.

FIG. 44 shows an exemplary cover in a closed position without any hygiene tools installed. The cover 8 is seated on the ledge 36 to align the top of the cover with the top wall 31 of the arm 3. The connection of the cover 8 to the ledge 36 creates a barrier to prevent water or particles getting into the protected area. When closed, the cover 8 is secured to the arm 3 in up to three locations. The primary and first securing option is a main latch 810 inserted into a latch receiving slot 39 within the arm 3. See FIG. 37. The latch 810 and slot 39 are shown in greater detail within FIGS. 49, 52, and 53. The second securing option is found at the end of first flap 82. The retainer ball clip 820 aligns and is received by a first niche 320 located within the wall of the first tool receiving section 32. See FIG. 36. The third securing option can be found on the second flap 83 which also has a retainer ball clip 830 that aligns and is received in a second niche 330 located within the second tool receiving section 33. The retainer clips 820, 830 and the recess openings 320, 330 are shown more closely in FIGS. 49-52.

Figure 45:
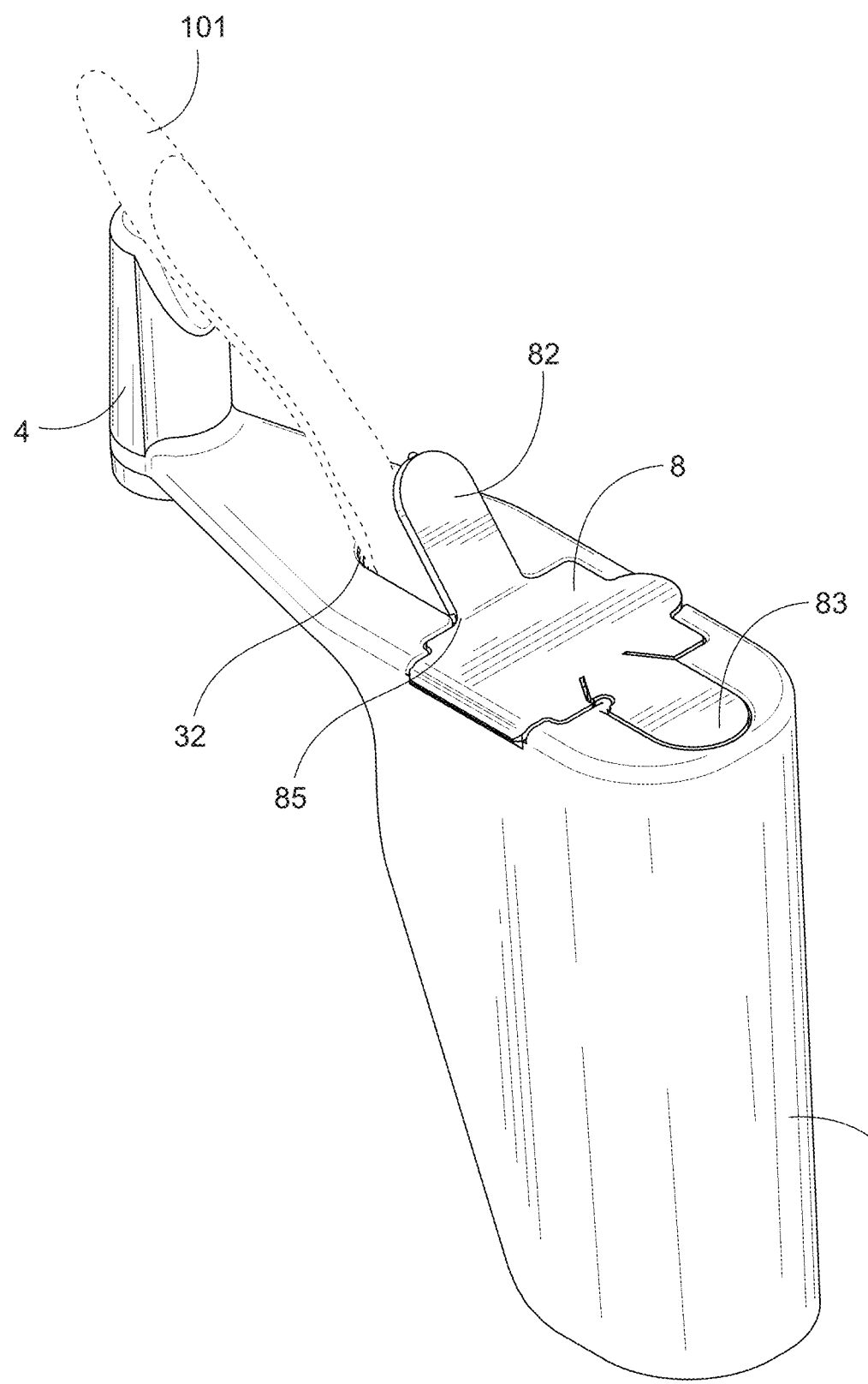
FIG. 45 is a top front perspective view of the holder shown in FIG. 44 with a sample manual toothbrush inserted.
Figure 46:
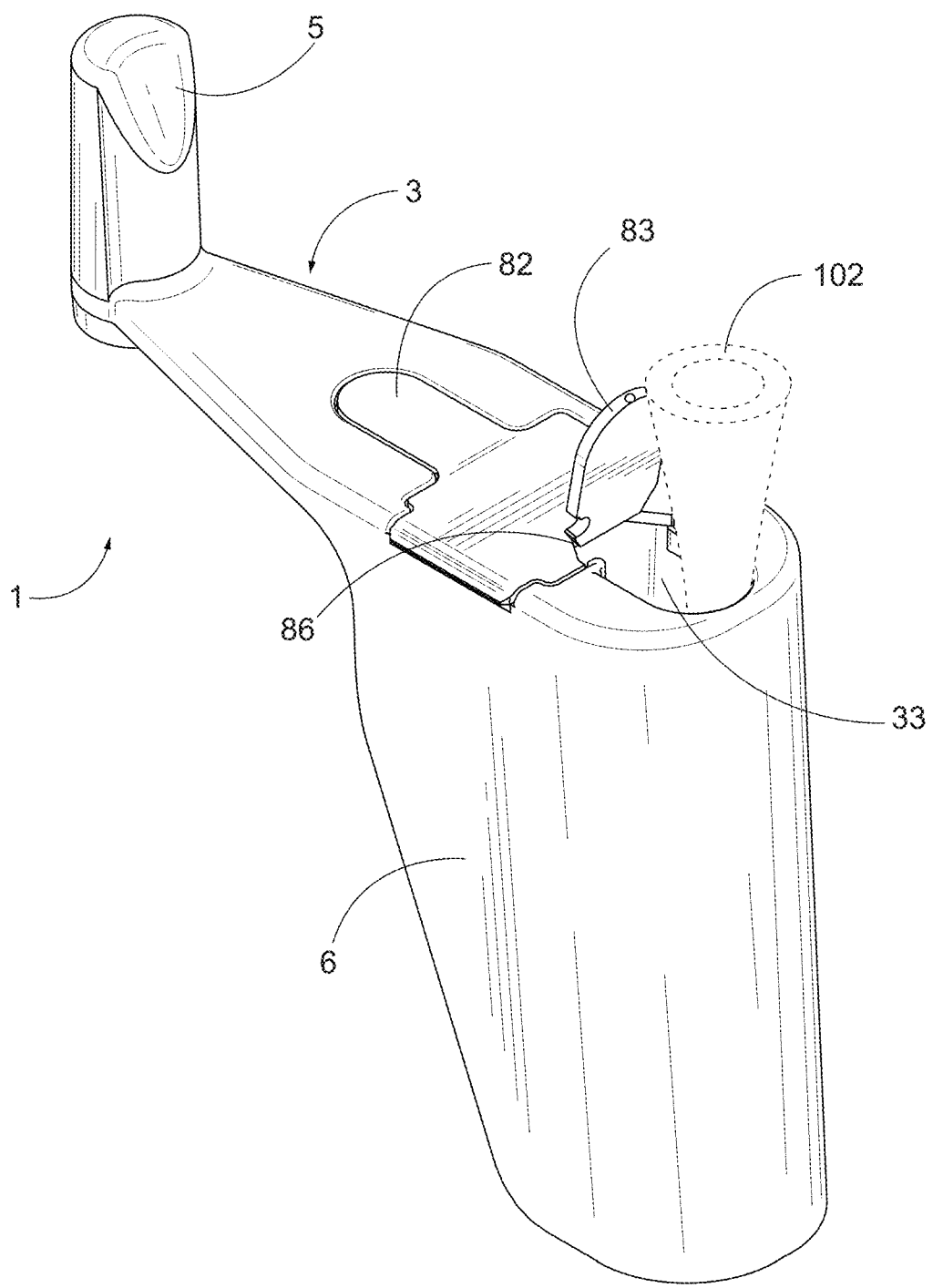
FIG. 46 is a top front perspective view of the holder shown in FIG. 44 with a sample electric toothbrush head inserted.
Figure 47:
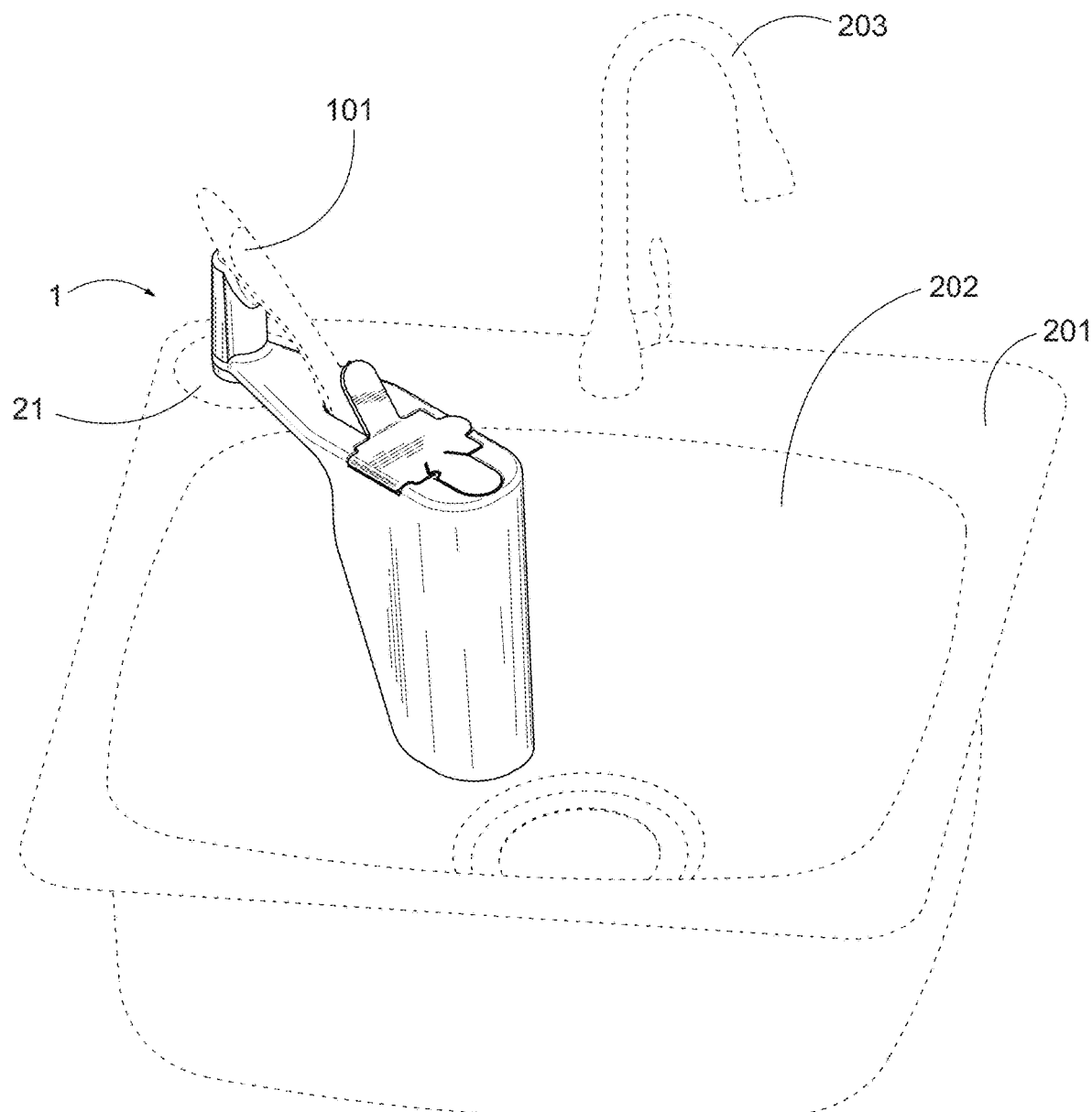
FIG. 47 is a top front perspective view of the holder shown in FIG. 45 with a sample manual toothbrush inserted and shown installed on a sink ledge.

FIGS. 45-48 demonstratively show the exemplary embodiment in use. Consistent with the cross sectional views in FIGS. 13, 17, and 30-31, the respective hygiene implements hang and are protected by the shield. In FIGS. 45 and 47 a manual toothbrush 101 is inserted into the first tool receiving section 32, resting against the notch 5 of the post 4. The cover 8 is closed by the living hinge 84 and secured by the latch 810 in the slot 39 but the first flap 82 allows the toothbrush 101 to protrude through the opening as part of the flap 82 remains partially open by the living hinge 85. As used in this instance, the cover 8 is secured through the main latch 810 and the second retainer clip 830 and the head of the toothbrush 101 is securely stored beneath the cover 8 and surrounded by the shield 6. Similarly, when storing an electric toothbrush head 102 as shown in FIGS. 46 and 48, the second flap 83 is partially open by the second living hinge 86 and the second flap 83 rests against the toothbrush head 102. The electric toothbrush head 102 is installed in the second tool receiving section 33, partially held by the flange 34, the cover 8 is closed with the main body 81 secured by latch 810 and first flap 82 secured to the arm 3 by the first retainer clip 820. The second flap 83 has two relief points which appear to be creases or slits 831, 832 that extend into the main cover body 81 until reaching the living hinge 86, these two slits allow the second flap 83 to accommodate the flange section and also allow the flap to move unimpeded from a position parallel to the main cover 81 to an open or more perpendicular position when holding the electric toothbrush head. As installed and shown in FIGS. 46 and 48 the electric toothbrush head is protected by the surrounding shield 6 and cover 8. In addition to covering the tool receiving section 32, 33, the flaps 82, 83 may also aid in holding the tools within the designated space.

The holder is desirably constructed of inexpensive, durable material such as plastic or recycled material. As one example, a living hinge may comprise a thin flexible hinge (flexure bearing) made from the same material as the two pieces it connects wherein the two pieces are typically of more rigid construction than the hinge area. The living hinge is able to rotate about one axis 180 degrees or more—repetitively without breaking. The material should be easy to clean and enable a simple hygienic way to store a toothbrush after cleaning. The holder is further sized to permit easy packing for traveling and when in use does not require a great deal of counterspace. The holder should be sufficiently sized to accommodate most toothbrush brands and styles. The features of the preferred embodiment permit full use of the holder when located on almost all sinks on the market and desirably do not adversely impact or restrict regular use of the sink space. While in the holder the tool is protected from sink use and debris by a shield. In the preferred embodiment the attachment is removably provided by the use of a suction cup. Examples of surfaces that may receive the suction cup in an attachably removable manner by using the negative fluid pressure of air or water to adhere to nonporous surfaces, creating a partial vacuum, include the countertop alongside of the sink basin or shelf located above the sink bowl.

The holder may rest, be attached, or be affixed to the edge of a sink. The holder is formed to receive a hygiene implement such as a toothbrush, razor, or any similar tool used for human hygiene. Examples of surfaces that may receive the suction cup in an attachably removable manner include the countertop alongside of the sink bowl or shelf located above the sink bowl.

The holder will find additional utility in the kitchen setting where bottle brushes and kitchen utensils or cleaning implements may have storage requirements similar to those required by a toothbrush. Therefore, the present invention may find utility around a kitchen sink.

It is further intended that any other embodiments of the present invention which result from any changes in application or method of use or operation, method of manufacture, shape, size, or material which are not specified within the detailed written description or illustrations contained herein, yet are considered apparent or obvious to one skilled in the art, are within the scope of the present invention.

We claim:

1. A hygiene implement holder for placing near a sink comprising:
    an arm extending over a sink basin, the arm having an opening configured to receive a hygiene implement,
    wherein the hygiene implement traverses the opening so that a work end of the hygiene implement extends below the arm and a handle of the hygiene implement extends above the arm, whereby the arm holds the hygiene implement at a substantially inverted angle by contact proximate to the work end of the hygiene implement, and
    the opening further having a top cover.

2. The holder of claim 1, further comprising a protective shield configured to substantially surround the work end of the hygiene implement below the arm.

3. The holder of claim 1, wherein the top cover further comprises at least one living hinge.

4. The holder of claim 1, wherein the holder further comprises a wall extending into the sink basin.

5. The holder of claim 4, wherein the wall partially encloses an area below the arm and surrounds three sides of the work end.

6. The holder of claim 4, wherein the wall surrounds the work end below the arm.

7. A hygiene implement holder comprising:
    an arm attachable to a ledge surrounding a sink basin,
        the arm projecting horizontally over the sink basin and having an opening configured to receive a hygiene implement such that a work end of the hygiene implement extends below the arm and a handle of the hygiene implement extends above the arm,
    a wall extending from the arm toward the sink basin and around the hygiene implement,
    wherein the hygiene implement holder is arranged to allow the hygiene implement to drain over the sink basin.

8. The holder of claim 7, wherein the hygiene implement rests with the handle portion at a height above a work end.

9. The holder of claim 7, wherein the arm further comprises a cover.

10. The holder of claim 9, wherein the cover is located on a portion of the arm that extends horizontally over the sink basin.

11. A hygiene implement holder comprising:
    a base member configured to cooperate with a sink ledge,
    an arm projecting from the base member over a sink basin,
    a wall extending down from the arm into the sink basin and substantially surrounding a work end of at least one hygiene implement,
    wherein the arm further comprises an opening below which the work end is suspended while a handle end of the at least one hygiene implement remains above the opening.

12. The holder of claim 11, wherein the at least one hygiene implement rests with the handle end at a height above the work end.

13. The holder of claim 11, wherein the at least one hygiene implement rests in a position with the hygiene implement draining over the sink basin such that the work end is below the handle end.

14. The holder of claim 11, wherein the at least one hygiene implement is selected from a group consisting of a manual toothbrush, an electric toothbrush head, tongue scraper, razor, or a combination thereof.

15. The holder of claim 11, wherein the arm further comprises a top cover.

16. The holder of claim 15, wherein the top cover utilizes at least one living hinge.

17. The holder of claim 11, further comprising:
    the base member terminating at a first height,
        the base member configured to receive the handle end of the at least one hygiene implement,
    the arm projecting orthogonally from the base member at a second height below the first height,
        the arm configured to receive the at least one hygiene implement along a handle length near the work end.

18. The holder of claim 17, wherein the at least one hygiene implement rests in a position with the handle end disposed near the first height and the handle length descending to the second height to drain over the sink basin such that the work end is below the handle end.

19. The holder of claim 17, wherein a notch is provided at the first height.

20. The holder of claim 17, wherein a vertical post defines the first height.

* * * * *